(12) United States Patent
Hsu et al.

(10) Patent No.: US 12,174,524 B2
(45) Date of Patent: Dec. 24, 2024

(54) CAMERA MODULE AND ELECTRONIC DEVICE

(71) Applicant: HUAWEI TECHNOLOGIES CO., LTD., Guangdong (CN)

(72) Inventors: Yun Chiang Hsu, Dongguan (CN); Yuanlin Jia, Shenzhen (CN); Rongkai Feng, Shenzhen (CN); Shaopan Zhou, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 44 days.

(21) Appl. No.: 17/955,686

(22) Filed: Sep. 29, 2022

(65) Prior Publication Data

US 2023/0034285 A1 Feb. 2, 2023

Related U.S. Application Data

(63) Continuation of application No. PCT/CN2021/084783, filed on Mar. 31, 2021.

(30) Foreign Application Priority Data

Mar. 31, 2020 (CN) .......................... 202010246620.9

(51) Int. Cl.
*G03B 7/095* (2021.01)
*G02B 7/34* (2021.01)
(Continued)

(52) U.S. Cl.
CPC ............. *G03B 7/095* (2013.01); *G02B 7/346* (2013.01); *G02B 13/0045* (2013.01); *H04N 23/55* (2023.01)

(58) Field of Classification Search
CPC ........ G03B 7/095; G03B 30/00; G02B 7/346; H04N 23/55
See application file for complete search history.

(56) References Cited

U.S. PATENT DOCUMENTS 11,231,565 B2 * 1/2022 Chen ........................ G02B 9/64
2007/0096010 A1 5/2007 Pallaro et al.
(Continued)

FOREIGN PATENT DOCUMENTS

CN 1937236 A 3/2007
CN 202153662 U 2/2012
(Continued)

OTHER PUBLICATIONS

Extended European Search Report dated Aug. 8, 2023 issued for European Application No. 21779945.1 (12 pages).
(Continued)

*Primary Examiner* — Christopher E Mahoney

(57) ABSTRACT

A camera module, which may be included in an electronic device includes a camera lens, a variable aperture, and a photosensitive element. A quantity of apertures of the camera lens is F1 when a clear aperture of the variable aperture is adjusted to a first clear aperture, and the photosensitive element is configured to: enable the camera lens to perform imaging in a full area of a photosensitive area, and adjust angular resolution of the full area to δ. A quantity of apertures of the camera lens is F2 when a clear aperture of the variable aperture is adjusted to a second clear aperture, where F1≥F2, and the photosensitive element is configured to: enable the camera lens to perform imaging in a partial area of the photosensitive area, and adjust angular resolution of the partial area to nδ, where 1≤n≤3.

25 Claims, 49 Drawing Sheets

(51) Int. Cl.
  *G02B 13/00* (2006.01)
  *H04N 23/55* (2023.01)

(56) References Cited

U.S. PATENT DOCUMENTS

| | | |
|---|---|---|
| 2016/0342874 A1 | 11/2016 | Powell et al. |
| 2018/0048820 A1 | 2/2018 | Hinkel et al. |
| 2020/0012078 A1 | 1/2020 | Kuo |

FOREIGN PATENT DOCUMENTS

| | | |
|---|---|---|
| CN | 103698878 A | 4/2014 |
| CN | 104362703 A | 2/2015 |
| CN | 104377741 A | 2/2015 |
| CN | 105005053 A | 10/2015 |
| CN | 106443987 A | 2/2017 |
| CN | 206440879 U | 8/2017 |
| CN | 107678140 A | 2/2018 |
| CN | 207301466 U | 5/2018 |
| CN | 207601747 U | 7/2018 |
| CN | 108873272 A | 11/2018 |
| CN | 109061838 A | 12/2018 |
| CN | 208353009 U | 1/2019 |
| CN | 208548739 U | 2/2019 |
| CN | 109417309 A | 3/2019 |
| CN | 208571661 U | 3/2019 |
| CN | 208656473 U | 3/2019 |
| CN | 109683284 A | 4/2019 |
| CN | 109742824 A | 5/2019 |
| CN | 109752823 A | 5/2019 |
| CN | 109888881 A | 6/2019 |
| CN | 110073264 A | 7/2019 |
| CN | 110073286 A | 7/2019 |
| CN | 110346999 A | 10/2019 |
| CN | 209690597 U | 11/2019 |
| CN | 110769310 A | 2/2020 |
| CN | 210041439 U | 2/2020 |
| CN | 110927929 A | 3/2020 |
| EP | 2133724 B1 | 2/2017 |
| JP | H1152240 A | 2/1999 |
| JP | 2003198923 A | 7/2003 |
| JP | 2006115117 A | 4/2006 |
| JP | 2009260462 A | 11/2009 |
| JP | 2012147054 A | 8/2012 |
| JP | 2015040906 A | 3/2015 |
| JP | 2019197088 A | 11/2019 |
| KR | 20190052590 A | 5/2019 |

OTHER PUBLICATIONS

Big lock, Chapter 10: Seven ways to achieve optical zoom in mobile phone cameras, Posted at May 3, 2018, with the English Translation, 6 pages.
International Search Report dated Jul. 12, 2021 issued for International Application No. PCT/CN2021/084783 (14 pages).
Office Action Dated Mar. 22, 2022 issued for Chinese Application No. 202010246620.9 (5 pages).
Notice of Reasons for Rejection dated Oct. 2, 2023 issued for Japanese Application No. 2022-559720 (5 pages) and Translation (7 pages).
Office Action dated Oct. 16, 2024, issued for Korean Application No. 2022-7037617 (6 pages) and Translation (9 pages).

* cited by examiner

CAMERA MODULE AND ELECTRONIC DEVICE

CROSS-REFERENCE TO RELATED APPLICATIONS

This application is a continuation of International Application No. PCT/CN2021/084783, filed on Mar. 31, 2021, which claims priority to Chinese Patent Application No. 202010246620.9, filed on Mar. 31, 2020. The disclosures of the aforementioned applications are hereby incorporated by reference in their entireties.

TECHNICAL FIELD

This disclosure relates to the field of electronic device technologies, and in particular, to a camera module and an electronic device.

BACKGROUND

To improve product competitiveness of a mobile phone, an integrated high-performance camera lens has become an important development trend of a current mobile phone, and aspects such as a photographing focal segment, resolution, and imaging quality of the camera lens of the mobile phone all need to be further improved. Therefore, a camera lens with a single focal segment and a digital zoom manner cannot meet a requirement of a consumer. Currently, high-magnification optical zoom of a camera lens of a mobile phone released in the market is basically "jump-type" zoom. To be specific, a plurality of camera lenses with different focal lengths are separately mounted, and cooperate with algorithm-based digital zoom, to implement hybrid optical zoom. Consequently, a quantity of camera lenses of the mobile phone becomes larger, thereby occupying more space, and affecting appearance quality of the mobile phone.

SUMMARY

This disclosure provides a camera module and an electronic device, to implement a hybrid zoom photographing effect by using one camera lens, and further improve imaging quality.

According to a first aspect, this disclosure provides a camera module. The camera module may include a camera lens, a variable aperture, and a photosensitive element. The camera lens may include a plurality of lenses arranged along a direction from an object side to an image side. The variable aperture may be located on an object side of one of the lenses, a clear aperture of the variable aperture may be adjusted to a first clear aperture and a second clear aperture, and a quantity of apertures of the camera lens may be adjusted to F1 when the clear aperture of the variable aperture is the first clear aperture, or a quantity of apertures of the camera lens may be adjusted to F2 when the clear aperture of the variable aperture is the second clear aperture, where F1 and F2 meet a condition F1≥F2. The photosensitive element is disposed on an imaging surface of the camera lens, and the photosensitive element includes a photosensitive area. The camera module may include two imaging modes, and the two imaging modes are respectively a first imaging mode and a second imaging mode. In the first imaging mode, the quantity of apertures of the camera lens is F1, and the photosensitive element may be configured to: enable the camera lens to perform imaging in a full area of the photosensitive area, and adjust angular resolution of the full area of the photosensitive area to δ; and in the second imaging mode, the quantity of apertures of the camera lens is F2, and the photosensitive element may be configured to: enable the camera lens to perform imaging in a partial area of the photosensitive area, and adjust angular resolution of the partial area of the photosensitive area to nδ, where n is a natural number greater than or equal to 1 and less than or equal to 3.

In the foregoing solution, when the camera module is in the first imaging mode, full-pixel imaging with angular resolution of δ may be implemented in the photosensitive area, and in the second imaging mode, partial-pixel imaging with angular resolution of 2×δ or 3×δ may be implemented in the photosensitive area. In addition, when the camera module is switched between the two imaging modes, an effective focal length of the camera lens remains unchanged. To be specific, full-pixel 1× imaging and partial-pixel 2× or 3× imaging are simultaneously implemented by using one camera lens, and a main camera lens and a 2× or 3× telephoto lens are integrated into one. In addition, in the second imaging mode, the clear aperture of the variable aperture is changed, to switch the quantity F of apertures of the camera lens from F1 to F2, so that a camera lens that performs central-pixel imaging has a larger aperture and higher optical quality than a common 2× or 3× camera lens.

In some possible implementations, a diffraction limit of performing imaging by the camera lens in the full area of the photosensitive area is MTF1L at 100 lp/mm, and a diffraction limit of performing imaging by the camera lens in the partial area of the photosensitive area is MTF2L at 100 lp/mm, where MTF1L and MTF2L meet a condition 1≤|MTF2L/MTF1L|≤3.

In some possible implementations, a quantity N of lenses included in the camera lens meets a condition 5≤N≤9.

In some possible implementations, when the clear aperture of the variable aperture is the first clear aperture, the quantity F1 of apertures of the camera lens meets a condition 1.2≤F1≤8; and when the clear aperture of the variable aperture is the second clear aperture, the quantity F2 of apertures of the camera lens meets a condition 1.1≤F2≤4.

In some possible implementations, a half-image height of the camera lens is Y1 when the camera lens performs imaging in the full area of the photosensitive area, and a half-image height of the camera lens is Y2 when the camera lens performs imaging in the partial area of the photosensitive area, where Y1 and Y2 meet a condition 1≤|Y1/Y2|≤3.

In some possible implementations, a size of a cell output by the photosensitive element is P1 when the camera lens performs imaging in the full area of the photosensitive area, and a size of a cell output by the photosensitive element is P2 when the camera lens performs imaging in the partial area of the photosensitive area; and when n=1, P1 and P2 meet a condition P1/P2=1;
when n=2, P1 and P2 meet a condition P1/P2=4; or
when n=3, P1 and P2 meet a condition P1/P2=9.

In some possible implementations, when the camera lens performs imaging in the full area of the photosensitive area, the half-image height Y1 of the camera lens and a total length (TTL) of the camera lens meet a condition 0.5≤|Y1/TTL|≤1.5.

In some possible implementations, a distance l between the variable aperture and the imaging surface of the camera lens and the total length (TTL) of the camera lens meet a condition 0.5≤|l/TTL|≤1.2. To be specific, the variable aperture may be disposed on an object side of a lens closest to a to-be-photographed object, or may be disposed between other two adjacent lenses.

In some possible implementations, pixels of an image output when the camera lens performs imaging with the angular resolution of nδ in the partial area of the photosensitive area are 8M to 32M pixels, thereby effectively ensuring imaging quality.

In some possible implementations, an entrance pupil diameter is EPD1 when the camera lens performs imaging in the full area of the photosensitive area, and an entrance pupil diameter is EPD2 when the camera lens performs imaging in the partial area of the photosensitive area, where EPD1 and EPD2 meet a condition 0.25≤|EPD1/EPD2|≤1.

In some possible implementations, a focal length EFL of the camera lens and the total length (TTL) of the camera lens meet a condition 0.5≤|EFL/TTL|≤1.2.

In some possible implementations, the camera lens may include eight lenses arranged along the direction from the object side to the image side, and the eight lenses are respectively a first lens, a second lens, a third lens, a fourth lens, a fifth lens, a sixth lens, a seventh lens, and an eighth lens. The second lens has negative focal power. The fifth lens has positive focal power, and a focal length f5 of the fifth lens and the focal length EFL of the camera lens meet a condition 0.5≤|f5/EFL|≤1.2. The sixth lens has negative focal power, and a focal length f6 of the sixth lens and the focal length EFL of the camera lens meet a condition 1≤|f6/EFL|≤100. An area that is on an object-side surface of the eighth lens and that is close to an optical axis is a concave surface, and an area that is on an image-side surface and that is close to the optical axis is a concave surface.

In some possible implementations, the eight lenses each may be an aspheric lens, to eliminate an optical aberration and improve imaging quality. In this case, each lens may be made of a resin material, to reduce a manufacturing process difficulty and manufacturing costs of the camera lens.

When the camera lens includes eight lenses, the camera lens may have the following several specific structural forms:

The second lens has negative focal power, and a ratio of a focal length f2 of the second lens to the focal length EFL of the camera lens is |f2/EFL|=1.70. The fifth lens has positive focal power, and a ratio of the focal length f5 of the fifth lens to the focal length EFL of the camera lens is |f5/EFL|=1.01. The sixth lens has negative focal power, and a ratio of the focal length f6 of the sixth lens to the focal length EFL of the camera lens is |f6/EFL|=1.09. A ratio of the focal length EFL of the camera lens to the total length (TTL) of the camera lens is |EFL/TTL|=0.8307. When the clear aperture of the variable aperture is the first clear aperture, the quantity F1 of apertures of the camera lens is 2.074, or when the clear aperture of the variable aperture is the second clear aperture, the quantity F2 of apertures of the camera lens is 1.4758.

Alternatively, the second lens has negative focal power, and a ratio of a focal length f2 of the second lens to the focal length EFL of the camera lens is |f2/EFL|=1.71. The fifth lens has positive focal power, and a ratio of the focal length f5 of the fifth lens to the focal length EFL of the camera lens is |f5/EFL|=1.07. The sixth lens has negative focal power, and a ratio of the focal length f6 of the sixth lens to the focal length EFL of the camera lens is |f6/EFL|=1.14. A ratio of the focal length EFL of the camera lens to the total length (TTL) of the camera lens is |EFL/TTL|=0.830. When the clear aperture of the variable aperture is the first clear aperture, the quantity F1 of apertures of the camera lens is 2.075, or when the clear aperture of the variable aperture is the second clear aperture, the quantity F2 of apertures of the camera lens is 1.461.

Alternatively, the second lens has negative focal power, and a ratio of a focal length f2 of the second lens to the focal length EFL of the camera lens is |f2/EFL|=2.452. The fifth lens has positive focal power, and a ratio of the focal length f5 of the fifth lens to the focal length EFL of the camera lens is |f5/EFL|=1.49. The sixth lens has negative focal power, and a ratio of the focal length f6 of the sixth lens to the focal length EFL of the camera lens is |f6/EFL|=4.052. A ratio of the focal length EFL of the camera lens to the total length (TTL) of the camera lens is |EFL/TTL|=0.7269. When the clear aperture of the variable aperture is the first clear aperture, the quantity F1 of apertures of the camera lens is 1.99, or when the clear aperture of the variable aperture is the second clear aperture, the quantity F2 of apertures of the camera lens is 1.15.

Alternatively, the second lens has negative focal power, and a ratio of a focal length f2 of the second lens to the focal length EFL of the camera lens is |f2/EFL|=1.99. The fifth lens has positive focal power, and a ratio of the focal length f5 of the fifth lens to the focal length EFL of the camera lens is |f5/EFL|=1.14. The sixth lens has negative focal power, and a ratio of the focal length f6 of the sixth lens to the focal length EFL of the camera lens is |f6/EFL|=1.22. A ratio of the focal length EFL of the camera lens to the total length (TTL) of the camera lens is |EFL/TTL|=0.802. When the clear aperture of the variable aperture is the first clear aperture, the quantity F1 of apertures of the camera lens is 1.65, or when the clear aperture of the variable aperture is the second clear aperture, the quantity F2 of apertures of the camera lens is 1.58.

Alternatively, the second lens has negative focal power, and a ratio of a focal length f2 of the second lens to the focal length EFL of the camera lens is |f2/EFL|=2.42. The fifth lens has positive focal power, and a ratio of the focal length f5 of the fifth lens to the focal length EFL of the camera lens is |f5/EFL|=1.49. The sixth lens has negative focal power, and a ratio of the focal length f6 of the sixth lens to the focal length EFL of the camera lens is |f6/EFL|=4.01. A ratio of the focal length EFL of the camera lens to the total length (TTL) of the camera lens is |EFL/TTL|=0.731. When the clear aperture of the variable aperture is the first clear aperture, the quantity F1 of apertures of the camera lens is 3.97, or when the clear aperture of the variable aperture is the second clear aperture, the quantity F2 of apertures of the camera lens is 1.14.

In some possible implementations, the camera lens may include nine lenses arranged along the direction from the object side to the image side, and the nine lenses are respectively a first lens, a second lens, a third lens, a fourth lens, a fifth lens, a sixth lens, a seventh lens, an eighth lens, and a ninth lens. The second lens has negative focal power, and a ratio of a focal length f2 of the second lens to the focal length EFL of the camera lens is |f2/EFL|=2.11. The fifth lens has positive focal power, and a ratio of a focal length f5 of the fifth lens to the focal length EFL of the camera lens is |f5/EFL|=1.37. The sixth lens has negative focal power, and a ratio of a focal length f6 of the sixth lens to the focal length EFL of the camera lens is |f6/EFL|=3.33. A ratio of the focal length EFL of the camera lens to the total length (TTL) of the camera lens is |EFL/TTL|=0.788. When the clear aperture of the variable aperture is a first clear aperture, the quantity F1 of apertures of the camera lens is 2.36, or when the clear aperture of the variable aperture is the second clear aperture, the quantity F2 of apertures of the camera lens is 1.42.

In some possible implementations, the camera lens may include six lenses arranged along the direction from the object side to the image side, and the six lenses are respectively a first lens, a second lens, a third lens, a fourth lens, a fifth lens, and a sixth lens. The second lens has negative focal power, and a ratio of a focal length f2 of the second lens to the focal length EFL of the camera lens is |f2/EFL|=5.23. The third lens has negative focal power, and a ratio of a focal length f3 of the third lens to the focal length EFL of the camera lens is |f3/EFL|=2.87. The fourth lens has positive focal power, and a ratio of a focal length f4 of the fourth lens to the focal length EFL of the camera lens is |f4/EFL|=12.04. A ratio of the focal length EFL of the camera lens to the total length (TTL) of the camera lens is |EFL/TTL|=0.81. When the clear aperture of the variable aperture is a first clear aperture, the quantity F1 of apertures of the camera lens is 1.79, or when the clear aperture of the variable aperture is the second clear aperture, the quantity F2 of apertures of the camera lens is 1.41.

In some possible implementations, the camera lens may include five lenses arranged along the direction from the object side to the image side, and the five lenses are respectively a first lens, a second lens, a third lens, a fourth lens, and a fifth lens. The second lens has negative focal power, and a ratio of a focal length f2 of the second lens to the focal length EFL of the camera lens is |f2/EFL|=1.97. The third lens has positive focal power, and a ratio of a focal length f3 of the third lens to the focal length EFL of the camera lens is |f3/EFL|=3.41. The fourth lens has positive focal power, and a ratio of a focal length f4 of the fourth lens to the focal length EFL of the camera lens is |f4/EFL|=1.20. A ratio of the focal length EFL of the camera lens to the total length (TTL) of the camera lens is |EFL/TTL|=0.74. When the clear aperture of the variable aperture is a first clear aperture, the quantity F1 of apertures of the camera lens is 1.94, or when the clear aperture of the variable aperture is the second clear aperture, the quantity F2 of apertures of the camera lens is 1.45.

In some possible implementations, the camera lens may include seven lenses arranged along the direction from the object side to the image side, and the seven lenses are respectively a first lens, a second lens, a third lens, a fourth lens, a fifth lens, a sixth lens, and a seventh lens. The second lens has negative focal power, and a ratio of a focal length f2 of the second lens to the focal length EFL of the camera lens is |f2/EFL|=2.51. The fifth lens has negative focal power, and a ratio of a focal length f5 of the fifth lens to the focal length EFL of the camera lens is |f5/EFL|=1.81. The sixth lens has negative focal power, and a ratio of a focal length f6 of the sixth lens to the focal length EFL of the camera lens is |f6/EFL|=2.31. A ratio of the focal length EFL of the camera lens to the total length (TTL) of the camera lens is |EFL/TTL|=0.814. When the clear aperture of the variable aperture is a first clear aperture, the quantity F1 of apertures of the camera lens is 2.31, or when the clear aperture of the variable aperture is the second clear aperture, the quantity F2 of apertures of the camera lens is 1.59.

According to a second aspect, this disclosure further provides an electronic device. The electronic device includes a housing and the camera module in any one of the foregoing possible implementations. The camera module may be specifically disposed inside the housing. The camera module of the electronic device may simultaneously implement full-pixel 1× imaging and central-pixel 2× or 3× imaging by using one camera lens, so that the camera module occupies less space in the electronic device and appearance quality of the electronic device is improved.

BRIEF DESCRIPTION OF DRAWINGS

FIG. 4a is a curve diagram of an axial chromatic aberration of a camera module in FIG. 3a;

FIG. 5a is a curve diagram of a lateral chromatic aberration of a camera module in FIG. 3a;

FIG. 6a is a curve diagram of optical distortion of a camera module in FIG. 3a;

FIG. 8a is a curve diagram of an axial chromatic aberration of a camera module in FIG. 7a;

FIG. 9a is a curve diagram of a lateral chromatic aberration of a camera module in FIG. 7a;

FIG. 10a is a curve diagram of optical distortion of a camera module in FIG. 7a;

FIG. 12a is a curve diagram of an axial chromatic aberration of a camera module in FIG. 11a;

FIG. 13a is a curve diagram of a lateral chromatic aberration of a camera module in FIG. 11a;

FIG. 14a is a curve diagram of optical distortion of a camera module in FIG. 11a;

FIG. 16a is a curve diagram of an axial chromatic aberration of a camera module in FIG. 15a;

FIG. 17a is a curve diagram of a lateral chromatic aberration of a camera module in FIG. 15a;

FIG. 18a is a curve diagram of optical distortion of a camera module in FIG. 15a;

FIG. 20a is a curve diagram of an axial chromatic aberration of a camera module in FIG. 19a;

FIG. 21a is a curve diagram of a lateral chromatic aberration of a camera module in FIG. 19a;

FIG. 22a is a curve diagram of optical distortion of a camera module in FIG. 19a;

FIG. 24a is a curve diagram of an axial chromatic aberration of a camera module in FIG. 23a;

FIG. 25a is a curve diagram of a lateral chromatic aberration of a camera module in FIG. 23a;

FIG. 26a is a curve diagram of optical distortion of a camera module in FIG. 23a;

FIG. 28a is a curve diagram of an axial chromatic aberration of a camera module in FIG. 27a;

FIG. 29a is a curve diagram of a lateral chromatic aberration of a camera module in FIG. 27a;

FIG. 30a is a curve diagram of optical distortion of a camera module in FIG. 27a;

FIG. 32a is a curve diagram of an axial chromatic aberration of a camera module in FIG. 31a;

FIG. 33a is a curve diagram of a lateral chromatic aberration of a camera module in FIG. 31a;

FIG. 34a is a curve diagram of optical distortion of a camera module in FIG. 31a;

FIG. 36a is a curve diagram of an axial chromatic aberration of a camera module in FIG. 35a;

FIG. 37a is a curve diagram of a lateral chromatic aberration of a camera module in FIG. 35a;

FIG. 38a is a curve diagram of optical distortion of a camera module in FIG. 35a;

DESCRIPTION OF EMBODIMENTS

Figure 1:
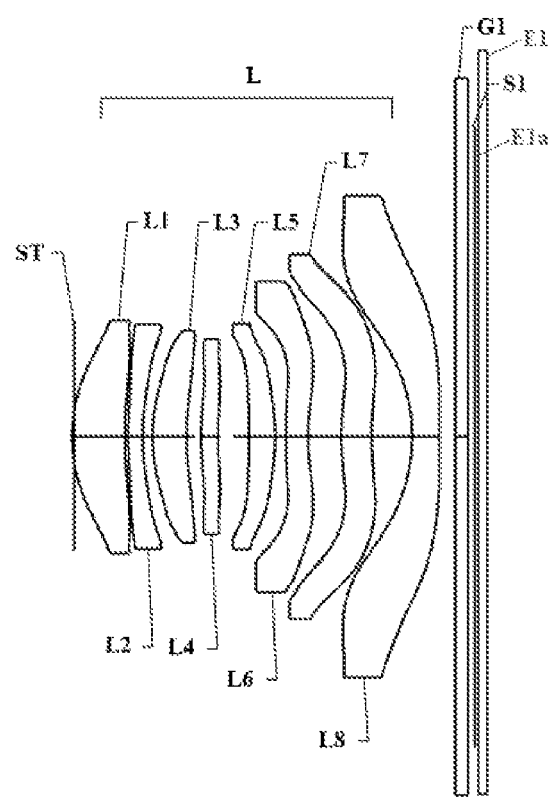
FIG. 1 is a schematic diagram of a structure of a camera module according to an embodiment of this disclosure.

To facilitate understanding of a camera module provided in embodiments of this disclosure, related English abbreviations and noun concepts used in this disclosure are first briefly described:

F-number (F #) is a quantity F of apertures, and is a relative value obtained by dividing a focal length of a camera lens by an entrance pupil diameter of the camera lens (a reciprocal of a relative aperture). A smaller value of a quantity F of apertures leads to a larger quantity of incident light rays in a same unit time, and a larger value of a quantity F of apertures leads to a smaller depth of field. Background content of photographing is blurred, similar to an effect of a telephoto lens.

An effect focal length (EFL) is an effective focal length of a camera lens.

A field of view (FOV) is a field of view.

A total track length (TTL) is a total length of a camera lens, and is specifically a distance between an imaging surface and a surface that is of the camera lens and that is closest to a to-be-photographed object.

A back focal length (BFL) is a back focal length of a camera lens, and is defined as a distance between a photosensitive element and a lens that is of the camera lens and that is closest to an imaging surface.

A modulation transfer function (MTF) is a modulation transfer function.

An entrance pupil diameter (EPD) is an entrance pupil diameter.

δ is angular resolution, and is defined as a reciprocal of a minimum angle that can be distinguished by an optical system. A minimum distinguished angle is equal to a result obtained by dividing a side length of a cell by a focal length of a camera lens.

Focal power is equal to a difference between an image-side beam convergence degree and an object-side beam convergence degree. A lens with positive focal power has a positive focal length and may converge light rays, and a lens with negative focal power has a negative focal length and may diverge light rays.

An object side may be understood as a side close to a to-be-photographed object, and an image side may be understood as a side close to an imaging surface.

An object-side surface of a lens is a surface that is of the lens and that is close to a to-be-photographed object, and an image-side surface of the lens is a surface that is of the lens and that is close to an imaging surface.

An area close to an optical axis may be understood as an area that is on a surface of a lens and that is close to the optical axis.

To facilitate understanding of a camera module provided in the embodiments of this disclosure, an application scenario of the camera module is first described. The camera module provided in the embodiments of this disclosure may be applied to an electronic device, so that the electronic device implements functions such as image acquisition and video capture. The electronic device may be a common terminal such as a mobile phone, a tablet computer, or a notebook computer in the conventional technology. The mobile phone is used as an example. Currently, in a zoom manner commonly used for many models of mobile phones, a plurality of camera lenses with different focal lengths are mounted, and cooperate with algorithm-based digital zoom, to implement hybrid optical zoom. In this zoom manner, a zoom range of the camera module can be extended. However, a size of the camera module is excessively large due to an increase in a quantity of camera lenses. Consequently, more body space is occupied, and appearance quality of the mobile phone is affected.

Based on this, the embodiments of this disclosure provide a camera module and an electronic device to which the camera module is applied. The camera module may use a single camera lens, to integrate a main camera lens and a 2× or 3× telephoto lens into one. In addition, a variable aperture can be further used, so that there is a larger aperture during 2× or 3× imaging, to improve imaging quality.

FIG. 1 is a schematic diagram of a structure of a camera module according to an embodiment of this disclosure. The camera module may include a camera lens L, a variable aperture ST, a photosensitive element E1, and an optical filter G1. The camera lens L may include a plurality of lenses having focal power, and the lenses may be specifically arranged sequentially along a direction from an object side to an image side. The variable aperture ST is disposed on an object side of one lens, and a clear aperture of the variable aperture ST may be changed to adjust an aperture value of the camera lens L. During specific implementation, the variable aperture ST may be located on an object side of a lens closest to a to-be-photographed object, or may be located between any two adjacent lenses. This is not specifically limited in this disclosure. For example, a distance 1 between the variable aperture ST and an imaging surface S1 of the camera lens L and a total length (TTL) of the camera lens meet a condition $0.5 \leq |1/TTL| \leq 1.2$. The optical filter G1 is disposed on an image side of a lens closest to the imaging surface S1, that is, between the lens and the imaging surface S1, and may be used to filter infrared light in a light ray, to improve effective resolution and color reproducibility of the camera lens L, so that imaging is clearer and more stable. The photosensitive element is disposed on the imaging surface S1 of the camera lens L, and may be configured to perform optical-to-electrical conversion and A/D (analog/digital, analog signal/digital signal) conversion on an optical signal of an incident light ray, to transmit, by using a base board, an electrical signal obtained through conversion to a graphics processing unit or a central processing unit of an electronic device, thereby implementing functions such as obtaining, converting, and processing an optical image.

With continued reference to FIG. 1, a quantity N of lenses included in the camera lens L in this embodiment of this disclosure meets a condition $5 \leq N \leq 9$. For example, N may be 5, 6, 7, 8, or 9. These lenses each may be an aspheric lens, to eliminate an optical aberration, and improve imaging quality. In this case, each lens may be made of a resin material, to reduce a manufacturing process difficulty and manufacturing costs of the camera lens. Certainly, in another embodiment of this disclosure, some lens close to the to-be-photographed object may alternatively be made of a glass material, and some lens close to the imaging surface may be made of a resin material. This is not specifically limited in this disclosure. FIG. 1 specifically shows a structure of a camera module for which an eight-lens camera lens is used. Along the direction from the object side to the image side, the camera lens L sequentially includes a first lens L1, a second lens L2, a third lens L3, a fourth lens L4, a fifth lens L5, a sixth lens L6, a seventh lens L7, and an eighth lens L8. The second lens L2 has negative focal power. The fifth lens L5 has positive focal power, and a focal length f5 of the fifth lens L5 and a focal length EFL of the camera lens meet a condition $0.5 \leq |f5/EFL| \leq 1.2$. The sixth lens L6 has negative focal power, and a focal length f6 of the sixth lens L6 and the focal length EFL of the camera lens meet a condition $1 \leq |f6/EFL| \leq 100$. An area that is on an object-side surface of the eighth lens L8 and that is close to an optical axis is a concave surface, and an area that is on an image-side surface and that is close to the optical axis is a concave surface.

In addition, the variable aperture ST may be of a variable aperture structure in the conventional technology, and a principle of adjusting the clear aperture of the variable aperture ST may also be the same as that in the conventional technology. Details are not described herein. In this embodiment of this disclosure, the clear aperture of the variable aperture ST may be adjusted to a first clear aperture and a second clear aperture. When the clear aperture of the variable aperture ST is the first clear aperture, a quantity F of apertures of the camera lens L may be adjusted to F1 accordingly, or when the clear aperture of the variable aperture ST is the second clear aperture, a quantity F of apertures of the camera lens L may be adjusted to F2 accordingly. Herein, F1 and F2 meet a condition $F1 \geq F2$. For example, F1 meets a condition $1.2 \leq F1 \leq 8$, and F2 meets a condition $1.1 \leq F2 \leq 4$.

Figure 2A:
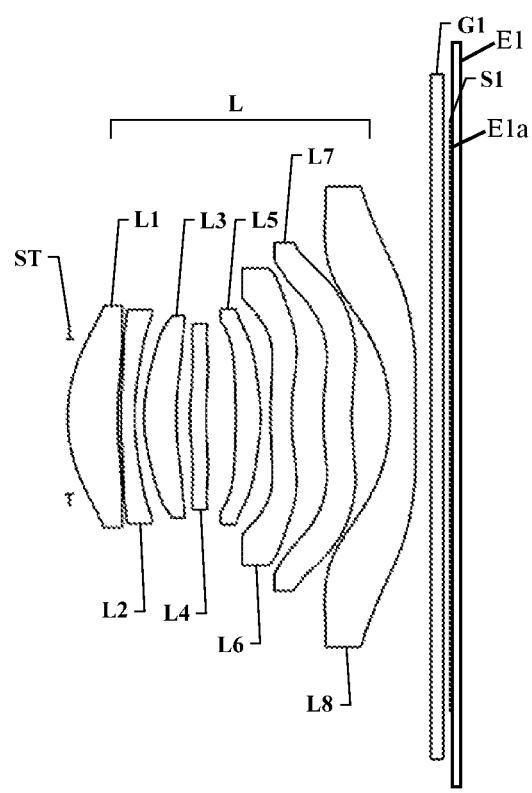
FIG. 2a is a schematic diagram of a structure of a camera module in FIG. 1 in a first imaging mode.
Figure 2B:
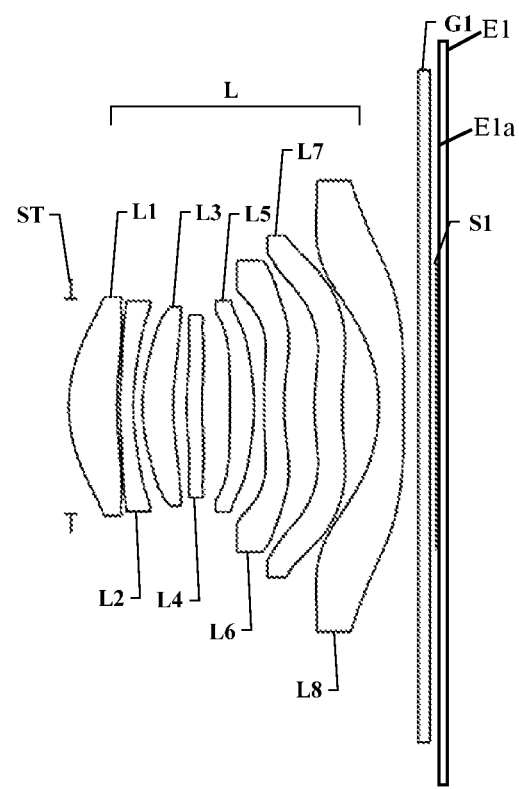
FIG. 2b is a schematic diagram of a structure of a camera module in FIG. 1 in a second imaging mode.

The camera module provided in this embodiment of this disclosure may include two imaging modes. Referring to both FIG. 2a and FIG. 2b, FIG. 2a is a schematic diagram of a structure of the camera module in a first imaging mode, and FIG. 2b is a schematic diagram of a structure of the camera module in a second imaging mode. When the camera module is in a first imaging mode, the clear aperture of the variable aperture may be adjusted to adjust the quantity F of apertures of the camera lens to F1. The photosensitive element is configured to: enable the camera lens L to perform imaging in a full area of a photosensitive area E1a of the photosensitive element E1, and adjust angular resolution of the full area of the photosensitive area to δ; or when the camera module is in a second imaging mode, the clear aperture of the variable aperture may be adjusted to adjust the quantity F of apertures of the camera lens to F2. The photosensitive element is configured to: enable the camera lens L to perform imaging in a partial area of a photosensitive area E1a of the photosensitive element E1, and adjust angular resolution of the partial area of the photosensitive area to nδ. It should be noted that, in the first imaging mode, it may be specifically understood that imaging in the full area of the photosensitive area is performing imaging by using all pixels in the photosensitive area, namely, full-pixel imaging; and in the second imaging mode, it may be specifically understood that imaging in the partial area of the photosensitive area is performing imaging by using pixels in the partial area of the photosensitive area. The partial area may be a central area or any other area of the photosensitive area. This is not specifically limited in this disclosure. When the camera lens L performs imaging in the partial area of the photosensitive area, it is equivalent to reducing a field of view of the camera lens. Therefore, a telephoto-like photographing effect can be achieved.

In the foregoing embodiment, a value of n may be 1, 2, or 3, and a value change of the angular resolution may be specifically implemented by controlling a size of a cell output by the photosensitive element. For example, a size of a cell output by the photosensitive element in the first imaging mode is P1, and a size of a cell output by the photosensitive element in the second imaging mode is P2. When P1 and P2 meet a condition P1/P2=1, the camera lens may perform imaging with same angular resolution in the two imaging modes, where n=1. When P1 and P2 meet a condition P1/P2=4, the camera lens may implement imaging with angular resolution of 2×δ in the second imaging mode. When P1 and P2 meet a condition P1/P2=9, the camera lens may implement imaging with angular resolution of 3×δ in the second imaging mode. It should be noted that a specific manner of controlling the size of the cell output by the photosensitive element in this embodiment is the same as that in the conventional technology. Details are not described herein.

In a specific embodiment of this disclosure, the camera module may output an image of 8M to 32M pixels in the second imaging mode, thereby effectively ensuring imaging quality.

When the foregoing structure is used, a half-image height of the camera lens is Y1 when the camera module is in the first imaging mode, and a half-image height of the camera lens is Y2 when the camera module is in the second imaging mode, where Y1 and Y2 meet a condition 1≤|Y1/Y2|≤3; and an entrance pupil diameter of the camera lens is EPD1 when the camera module is in the first imaging mode, and an entrance pupil diameter of the camera lens is EPD2 when the camera module is in the second imaging mode, where EPD1 and EPD2 meet a condition 0.25≤|EPD1/EPD2|≤1.

In addition, the focal length EFL of the camera lens and the total length (TTL) of the camera lens may meet a condition 0.5≤|EFL/TTL|≤1.2. The half-image height Y1 that is of the camera lens and that exists when the camera module is in the first imaging mode and the total length (TTL) of the camera lens may meet a condition 0.5≤|Y1/TTL|≤1.5.

It can be learned from the foregoing description that, when the camera module provided in this embodiment of this disclosure is in the first imaging mode, full-pixel imaging with angular resolution of δ may be implemented in the photosensitive area, and in the second imaging mode, central-pixel imaging with angular resolution of 2×δ or 3×δ may be implemented in the photosensitive area. In addition, when the camera module is switched between the two imaging modes, an effective focal length of the camera lens remains unchanged. To be specific, full-pixel 1× imaging and central-pixel 2× or 3× imaging are simultaneously implemented by using one camera lens, and a main camera lens and a 2× or 3× telephoto lens are integrated into one. In addition, in the second imaging mode, the clear aperture of the variable aperture is changed, to switch the quantity F of apertures of the camera lens from F1 to F2, so that a camera lens that performs central-pixel imaging has a larger aperture and higher optical quality than a common 2× or 3× camera lens. A diffraction limit MTF2L of central-pixel imaging at 100 lp/mm and a diffraction limit MTF1L of full-pixel imaging at 100 lp/mm may meet a condition 1≤|MTF2L/MTF1L|≤3.

To facilitate understanding of an effect of a camera lens provided in this embodiment of this disclosure, the following describes an imaging effect of the camera module in detail with reference to a specific embodiment.

Figure 3A:
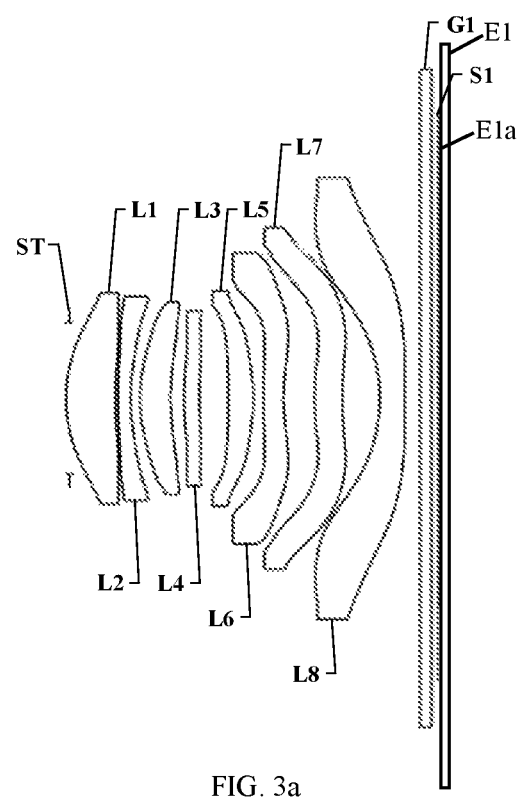
FIG. 3a is a schematic diagram of a structure of a first specific camera module in a first imaging mode.
Figure 3B:
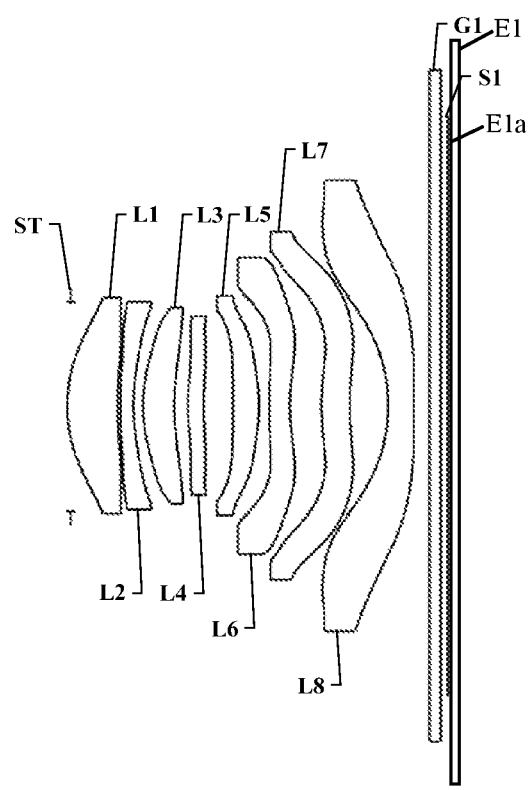
FIG. 3b is a schematic diagram of a structure of a first specific camera module in a second imaging mode.

FIG. 3a and FIG. 3b show a first specific camera module. FIG. 3a is a schematic diagram of a structure of the camera module in a first imaging mode. FIG. 3b is a schematic diagram of a structure of the camera module in a second imaging mode. A camera lens of the camera module includes eight lenses having focal power, and the eight lenses are sequentially a first lens L1, a second lens L2, a third lens L3, a fourth lens L4, a fifth lens L5, a sixth lens L6, a seventh lens L7, and an eighth lens L8 from an object side. A variable aperture ST may be specifically located on an object side of the first lens L1, and an optical filter G1 may be located on an image side of the eighth lens L8.

In this embodiment of this disclosure, each lens of the camera lens may be an aspheric lens. In other words, the camera lens includes 16 aspheric surfaces in total. Referring to both Table 1a and Table 1b, Table 1a shows a curvature radius, a thickness, a refractive index, and an Abbe number of each lens of the camera lens, and Table 1b shows an aspheric coefficient of each lens.

TABLE 1a

| | Description | Curvature radius | | Thickness | Refractive index | | Abbe number | |
|---|---|---|---|---|---|---|---|---|
| ST | Variable aperture | Infinite | d0 | −0.067 | — | — | — | — |
| R1 | First | 2.921 | d1 | 0.992 | n1 | 1.54 | v1 | 56.0 |
| R2 | lens | 8.009 | a1 | 0.058 | | | | |
| R3 | Second | 9.830 | d2 | 0.258 | n2 | 1.68 | v2 | 18.4 |
| R4 | lens | 4.106 | a2 | 0.188 | | | | |
| R5 | Third | 3.069 | d3 | 0.620 | n3 | 1.54 | v3 | 56.0 |
| R6 | lens | 5.447 | a3 | 0.269 | | | | |
| R7 | Fourth | 4.760 | d4 | 0.306 | n4 | 1.68 | v4 | 18.4 |
| R8 | lens | 5.799 | a4 | 0.588 | | | | |
| R9 | Fifth | −14.906 | d5 | 0.510 | n5 | 1.54 | v5 | 56.0 |
| R10 | lens | −2.836 | a5 | 0.202 | | | | |
| R11 | Sixth | 37.864 | d6 | 0.405 | n6 | 1.64 | v6 | 23.5 |
| R12 | lens | 3.898 | a6 | 0.625 | | | | |
| R13 | Seventh | 4.815 | d7 | 0.562 | n7 | 1.68 | v7 | 18.4 |
| R14 | lens | 6.973 | a7 | 0.758 | | | | |
| R15 | Eighth | −3.402 | d8 | 0.502 | n8 | 1.54 | v8 | 56.0 |
| R16 | lens | 24.685 | a8 | 0.310 | | | | |
| R17 | Optical filter | Infinite | d9 | 0.225 | n9 | 1.52 | v9 | 64.2 |

TABLE 1b

| | Type | K | R | A2 | A3 | A4 | A5 | A6 | A7 |
|---|---|---|---|---|---|---|---|---|---|
| R1 | Extended aspheric surface | 0.001 | 2.152 | −3.30E−02 | −4.45E−01 | 2.11E+00 | −6.41E+00 | 9.52E+00 | −5.64E+00 |
| R2 | Extended aspheric surface | −0.281 | 2.099 | 3.49E−01 | −6.92E+00 | 4.16E+01 | −1.51E+02 | 3.38E+02 | −4.66E+02 |

TABLE 1b-continued

| R1 | Type | K | R | | | | | | |
|---|---|---|---|---|---|---|---|---|---|
| R3 | Extended aspheric surface | −0.891 | 2.074 | 3.03E−02 | −4.45E+00 | 2.89E+01 | −1.04E+02 | 2.32E+02 | −3.22E+02 |
| R4 | Extended aspheric surface | −0.044 | 1.998 | −4.90E−01 | 4.89E−01 | −9.71E−01 | 4.45E+00 | −1.23E+01 | 2.06E+01 |
| R5 | Extended aspheric surface | 0.019 | 1.953 | −3.50E−01 | 2.89E−01 | −1.29E−01 | −3.89E+00 | 1.21E+01 | −1.45E+01 |
| R6 | Extended aspheric surface | 0.155 | 1.873 | −2.75E−01 | 7.62E−01 | −1.56E+00 | −4.85E−01 | 4.18E+00 | −4.41E+00 |
| R7 | Extended aspheric surface | 0.101 | 1.790 | −7.50E−01 | 1.57E+00 | −4.61E+00 | 1.09E+01 | −1.89E+01 | 2.21E+01 |
| R8 | Extended aspheric surface | 1.278 | 1.715 | −5.82E−01 | 1.34E+00 | −5.52E+00 | 1.70E+01 | −3.44E+01 | 4.48E+01 |
| R9 | Extended aspheric surface | 3.518 | 1.920 | 1.26E−01 | 4.37E−01 | −2.20E+00 | −6.15E+00 | 4.06E+01 | −8.88E+01 |
| R10 | Extended aspheric surface | 0.014 | 2.190 | 3.03E+00 | −9.62E+00 | 2.32E+01 | −5.86E+01 | 1.22E+02 | −1.71E+02 |
| R11 | Extended aspheric surface | −81.111 | 2.402 | 2.40E+00 | −1.93E+01 | 7.63E+01 | −2.20E+02 | 4.12E+02 | −4.60E+02 |
| R12 | Extended aspheric surface | −0.108 | 2.965 | −3.35E+00 | −4.41E+00 | 5.25E+01 | −2.61E+02 | 7.61E+02 | −1.28E+03 |
| R13 | Extended aspheric surface | −0.165 | 3.106 | −2.23E+00 | −1.27E+01 | 1.69E+01 | 1.43E+02 | −6.01E+02 | 1.01E+03 |
| R14 | Extended aspheric surface | 0.568 | 3.468 | −7.92E−02 | −3.81E+01 | 1.57E+02 | −2.80E+02 | 1.68E+02 | 1.62E+02 |
| R15 | Extended aspheric surface | −0.978 | 4.295 | −3.14E+00 | 1.41E+01 | −1.32E+02 | 7.79E+02 | −2.15E+03 | 3.20E+03 |
| R16 | Extended aspheric surface | 3.190 | 4.500 | −1.40E+01 | 7.98E+01 | −2.75E+02 | 4.93E+02 | −3.80E+02 | −1.19E+01 |

| R1 | Type | K | R | A8 | A9 | A10 | A11 | A12 | A13 |
|---|---|---|---|---|---|---|---|---|---|
| R2 | Extended aspheric surface | 0.001 | 2.152 | −2.92E+00 | 6.24E+00 | −3.14E+00 | 4.81E−01 | 0.00E+00 | 0.00E+00 |
| R3 | Extended aspheric surface | −0.281 | 2.099 | 3.88E+02 | −1.78E+02 | 3.49E+01 | 0.00E+00 | 0.00E+00 | 0.00E+00 |
| R4 | Extended aspheric surface | −0.891 | 2.074 | 2.69E+02 | −1.25E+02 | 2.48E+01 | 0.00E+00 | 0.00E+00 | 0.00E+00 |
| R5 | Extended aspheric surface | −0.044 | 1.998 | −2.00E+01 | 1.00E+01 | −2.02E+00 | 0.00E+00 | 0.00E+00 | 0.00E+00 |
| R6 | Extended aspheric surface | 0.019 | 1.953 | 8.00E+00 | −1.62E+00 | −1.18E−01 | 0.00E+00 | 0.00E+00 | 0.00E+00 |
| R7 | Extended aspheric surface | 0.155 | 1.873 | 3.15E+00 | −2.53E+00 | 9.99E−01 | 0.00E+00 | 0.00E+00 | 0.00E+00 |
| R8 | Extended aspheric surface | 0.101 | 1.790 | −1.45E+01 | 3.97E+00 | −4.39E−02 | 0.00E+00 | 0.00E+00 | 0.00E+00 |
| R9 | Extended aspheric surface | 1.278 | 1.715 | −3.54E+01 | 1.53E+01 | −2.76E+00 | 0.00E+00 | 0.00E+00 | 0.00E+00 |
| R10 | Extended aspheric surface | 3.518 | 1.920 | 1.01E+02 | −5.82E+01 | 1.30E+01 | 4.52E−01 | 0.00E+00 | 0.00E+00 |
| R11 | Extended aspheric surface | 0.014 | 2.190 | 1.45E+02 | −6.36E+01 | 8.31E+00 | 2.75E−01 | 9.79E−01 | 0.00E+00 |
| R12 | Extended aspheric surface | −81.111 | 2.402 | 2.82E+02 | −7.81E+01 | 5.31E+00 | 6.56E−01 | −9.08E−01 | 0.00E+00 |
| R13 | Extended aspheric surface | −0.108 | 2.965 | 1.22E+03 | −6.09E+02 | 1.18E+02 | 3.14E+00 | 4.33E−01 | 0.00E+00 |
| R14 | Extended aspheric surface | −0.165 | 3.106 | −8.57E+02 | 3.51E+02 | −6.05E+01 | 1.33E+01 | −6.09E+00 | 0.00E+00 |
| R15 | Extended aspheric surface | 0.568 | 3.468 | −3.17E+02 | 1.72E+02 | −1.33E+01 | −1.69E+01 | 6.06E+00 | −1.70E+00 |
| R16 | Extended aspheric surface | −0.978 | 4.295 | −2.67E+03 | 1.17E+03 | −1.86E+02 | −1.76E+01 | 5.35E+00 | −1.82E+00 |
| | Extended aspheric surface | 3.190 | 4.500 | 1.01E+02 | 1.31E+02 | −1.83E+02 | 5.69E+01 | 0.00E+00 | 0.00E+00 |

In the 16 aspheric surfaces of the camera lens shown in Table 1b, surface types z of all the extended aspheric surfaces may be defined by using but not limited to the following aspheric surface formula:

$$z = \frac{cr^2}{1+\sqrt{1-Kc^2r^2}} + A_2r^4 + A_3r^6 + A_4r^8 + A_5r^{10} + A_6r^{12} + A_7r^{14} + A_8r^{16} + A_9r^{18} + A_{10}r^{20} + A_{11}r^{22} + A_{12}r^{24} + A_{13}r^{26}$$

Herein, z represents a rise of an aspheric surface, r represents a normalized radial coordinate of the aspheric surface, r is equal to a result obtained by dividing an actual radial coordinate of the aspheric surface by a normalized radius R, c represents spherical curvature of a vertex of the aspheric surface, K represents a quadric surface constant, and $A_2$, $A_3$, $A_4$, $A_5$, $A_6$, $A_7$, $A_8$, $A_9$, $A_{10}$, $A_{11}$, $A_{12}$, and $A_{13}$ represent aspheric coefficients.

In this embodiment of this disclosure, the second lens L2 has negative focal power, and a ratio of a focal length f2 of the second lens L2 to a focal length EFL of the camera lens is |f2/EFL|=1.70. The fifth lens L5 has positive focal power, and a ratio of a focal length f5 of the fifth lens to the focal length EFL of the camera lens is |f5/EFL|=1.01. The sixth lens L6 has negative focal power, and a ratio of a focal length f6 of the sixth lens to the focal length EFL of the camera lens is |f6/EFL|=1.09. A ratio of the focal length EFL of the camera lens to a total length (TTL) of the camera lens is |EFL/TTL|=0.8307.

With continued reference to FIG. 3a, when the camera module is in the first imaging mode, the camera lens performs imaging in a full area of a photosensitive area, a half-image height Y1 of the camera lens is 5.8 mm, an entrance pupil diameter EPD1 is 3.0467 mm, and a quantity F of apertures is 2.074. Referring-Referring to FIG. 3b, when the camera module is switched to the second imaging mode, the camera lens performs imaging in a partial area of a photosensitive area, a half-image height Y2 of the camera lens is 2.86 mm, an entrance pupil diameter EPD2 is 4.31 mm, and a quantity F of apertures is 1.4758. A ratio of EPD1 to EPD2 is |EPD1/EPD2|=0.708, and a ratio of Y1 to Y2 is |Y1/Y2|=2.028. In addition, when a camera module is in the first imaging mode, a ratio of the half-image height Y1 of the camera lens to the total length (TTL) of the camera lens is |Y1/TTL|=0.77, and a ratio of the entrance pupil diameter EPD1 to the total length (TTL) of the camera lens is |EPD1/TTL|=0.4056. For each basic parameter of the camera lens, refer to Table 2.

TABLE 2

| | Object distance | Infinite far |
|---|---|---|
| | Focal length EFL (mm) | 6.24 |
| First imaging mode | Value of F | 2.07 |
| | Half-image height Y1 (mm) | 5.80 |
| | Half FOV (°) | 41.969 |
| Second imaging mode | Value of F | 1.48 |
| | Half-image height Y2 (mm) | 2.86 |
| | Half FOV (°) | 23.938 |
| | BFL (mm) | 0.667 |
| | TTL (mm) | 7.51 |
| | Designed wavelength | 650 nm, 610 nm, 555 nm, 510 nm, 470 nm |

The camera module shown in FIG. 3a and FIG. 3b is simulated. A simulation result of the camera module is described in detail below with reference to accompanying drawings.

Figure 4A:
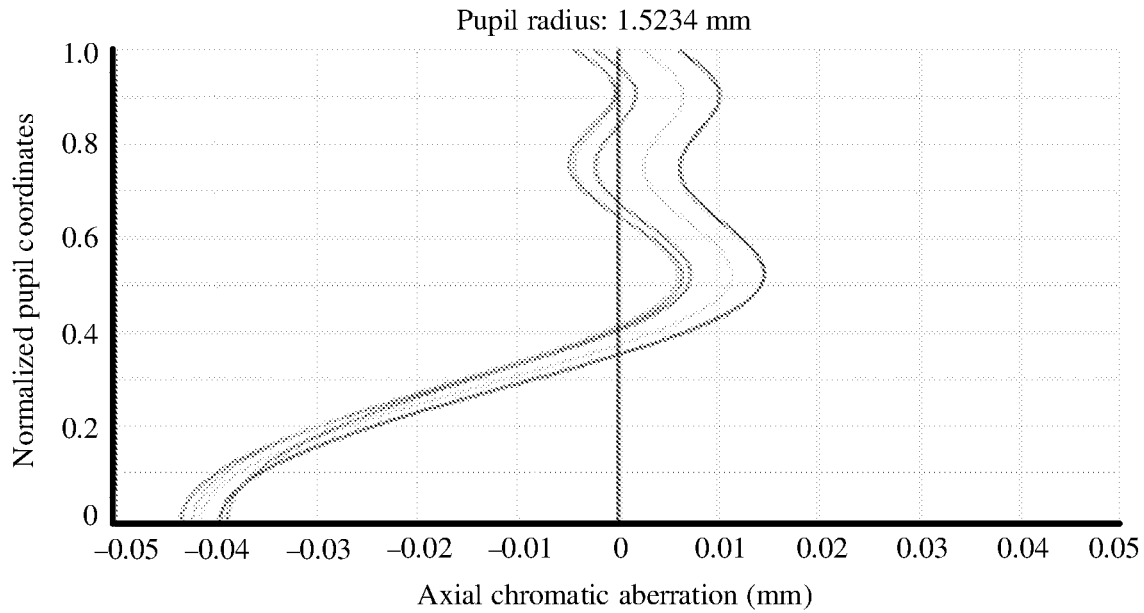

FIG. 4a is a curve diagram of an axial chromatic aberration of a camera module in a first imaging mode. Simulation results of a depth of focus location of colorful light rays on wavelengths of 650 nm, 610 nm, 555 nm, 510 nm, and 470 nm are separately shown in the figure. It can be learned that the axial chromatic aberration of a camera lens in the first imaging mode is controlled to fall within a very small range.

Figure 4B:
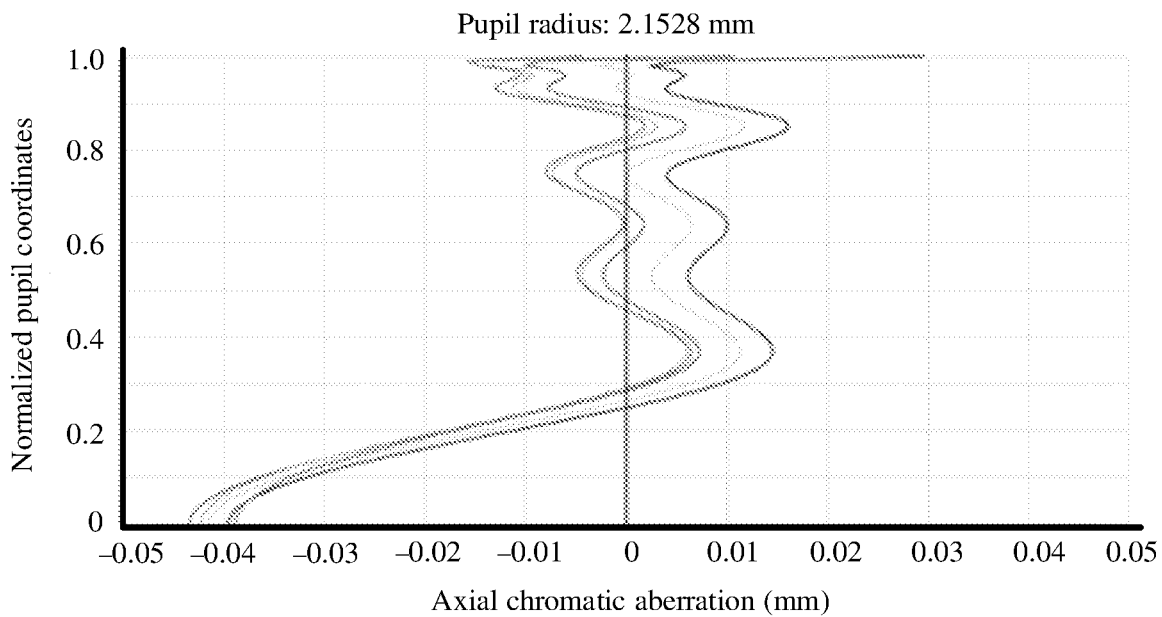
FIG. 4b is a curve diagram of an axial chromatic aberration of a camera module in FIG. 3b.

FIG. 4b is a curve diagram of an axial chromatic aberration of a camera module in a second imaging mode. Simulation results of a depth of focus location of colorful light rays on wavelengths of 650 nm, 610 nm, 555 nm, 510 nm, and 470 nm are separately shown in the figure. It can be learned that the axial chromatic aberration of a camera lens in the second imaging mode is controlled to fall within a very small range.

Figure 5A:
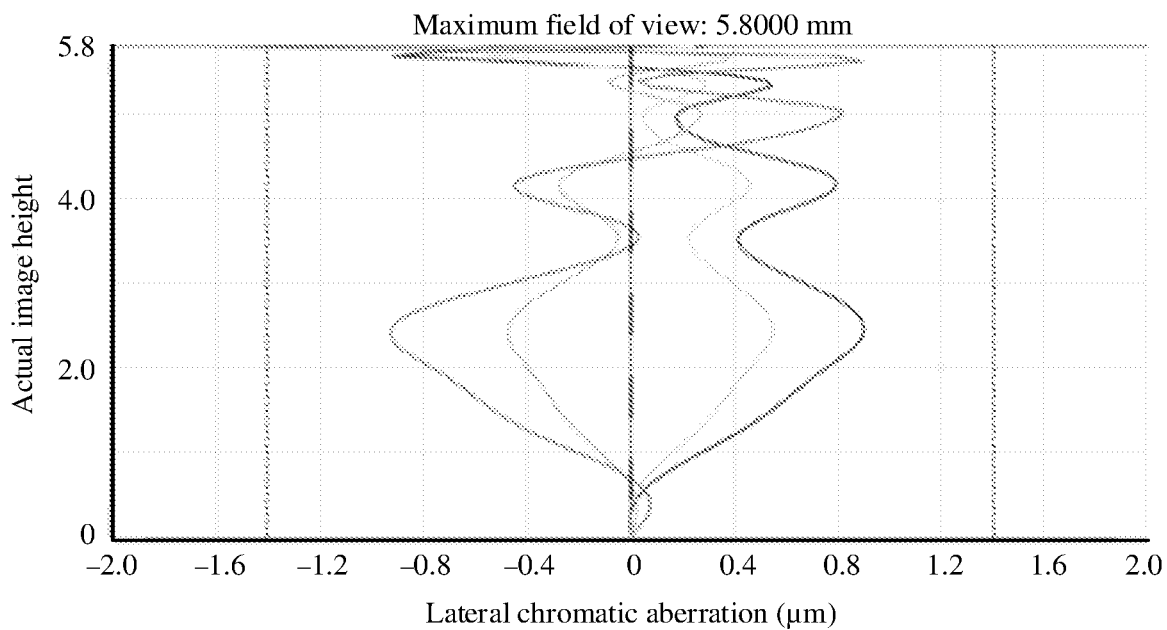

FIG. 5a is a curve diagram of a lateral chromatic aberration of a camera module in a first imaging mode. In the figure, five solid curves are respectively colorful light rays on wavelengths of 650 nm, 610 nm, 555 nm, 510 nm, and 470 nm, and dotted lines indicate that a diffraction limit range is from −1.4 μm to 1.4 μm, and it can be learned that all lateral chromatic aberrations of the five light rays fall within the diffraction limit range.

Figure 5B:
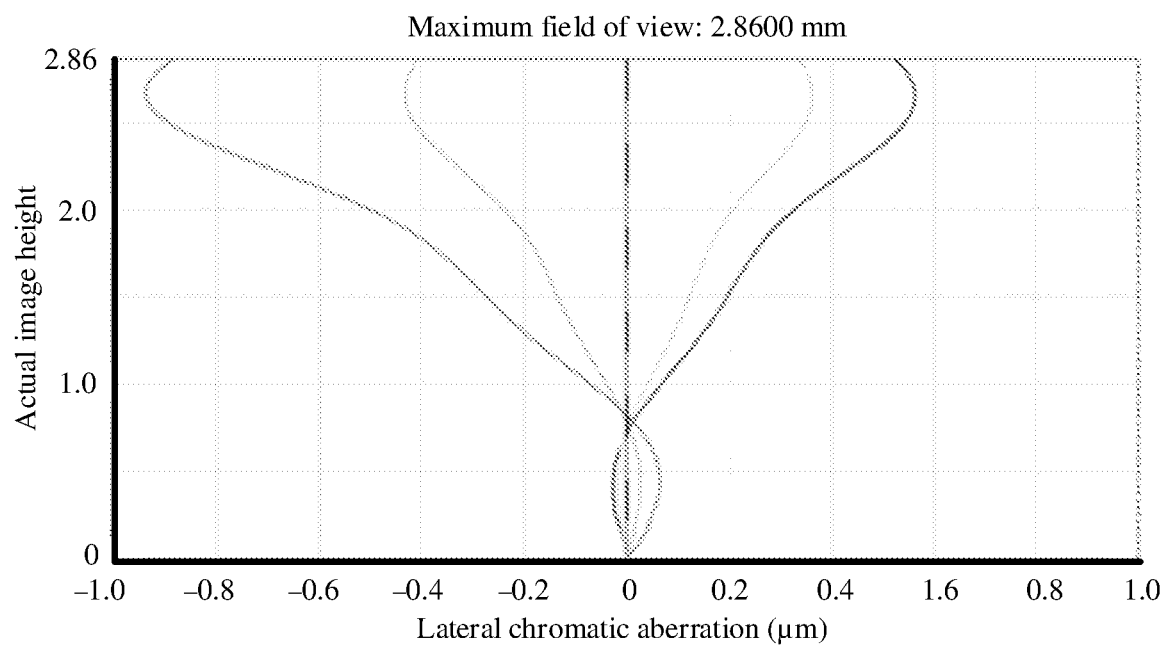
FIG. 5b is a curve diagram of a lateral chromatic aberration of a camera module in FIG. 3b.

FIG. 5b is a curve diagram of a lateral chromatic aberration of a camera module in a second imaging mode. In the figure, five solid curves are respectively colorful light rays on wavelengths of 650 nm, 610 nm, 555 nm, 510 nm, and 470 nm, and dotted lines indicate that a diffraction limit range is from −1.0 μm to 1.0 μm, and it can be learned that all lateral chromatic aberrations of the five light rays fall within the diffraction limit range.

Figure 6A:
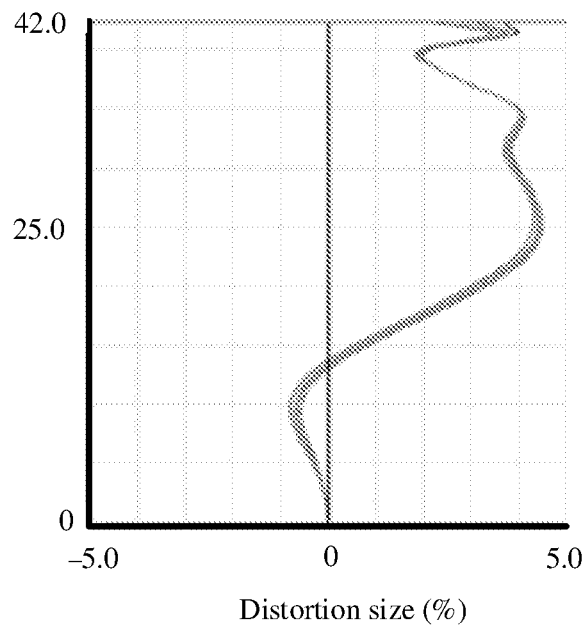

FIG. 6a is a curve diagram of optical distortion of a camera module in a first imaging mode, showing a difference between imaging deformation and an ideal shape. In the figure, five solid curves are respectively colorful light rays on wavelengths of 650 nm, 610 nm, 555 nm, 510 nm, and 470 nm. It can be learned that, in this mode, the optical distortion may be controlled to fall within a range less than 2%.

Figure 6B:
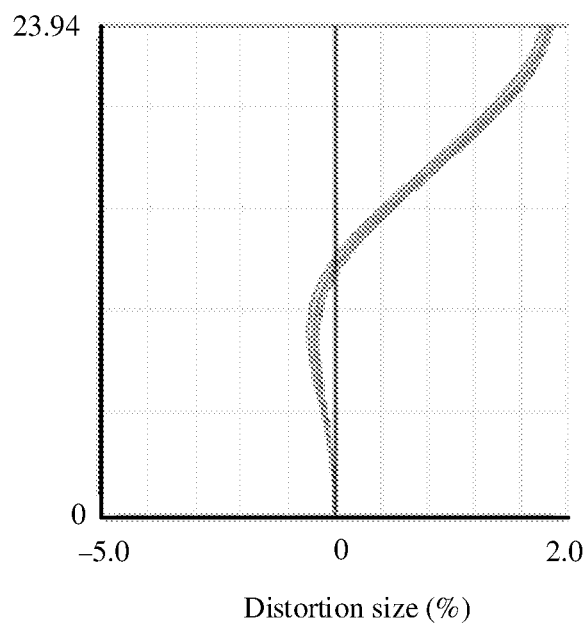
FIG. 6b is a curve diagram of optical distortion of a camera module in FIG. 3b.

FIG. 6b is a curve diagram of optical distortion of a camera module in a second imaging mode, showing a difference between imaging deformation and an ideal shape. In the figure, five solid curves are respectively colorful light rays on wavelengths of 650 nm, 610 nm, 555 nm, 510 nm, and 470 nm. It can be learned that, in this mode, the optical distortion may be controlled to fall within a range less than 2%.

Figure 7A:
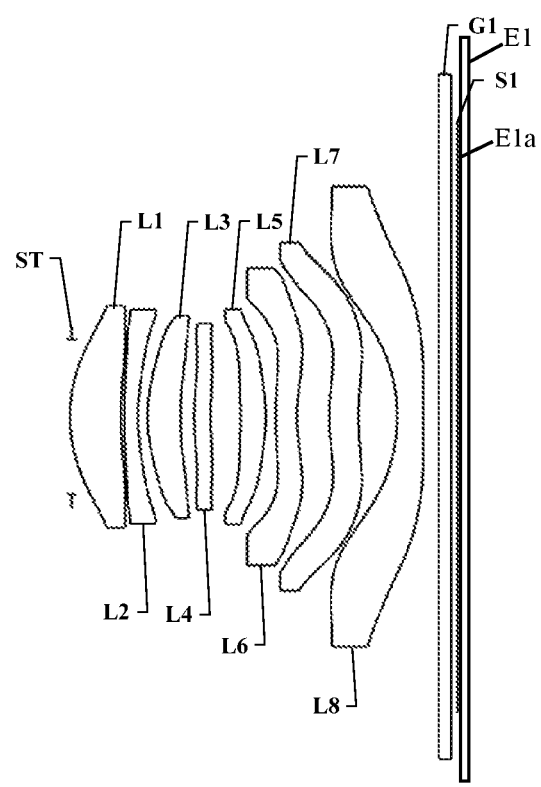
FIG. 7a is a schematic diagram of a structure of a second specific camera module in a first imaging mode.
Figure 7B:
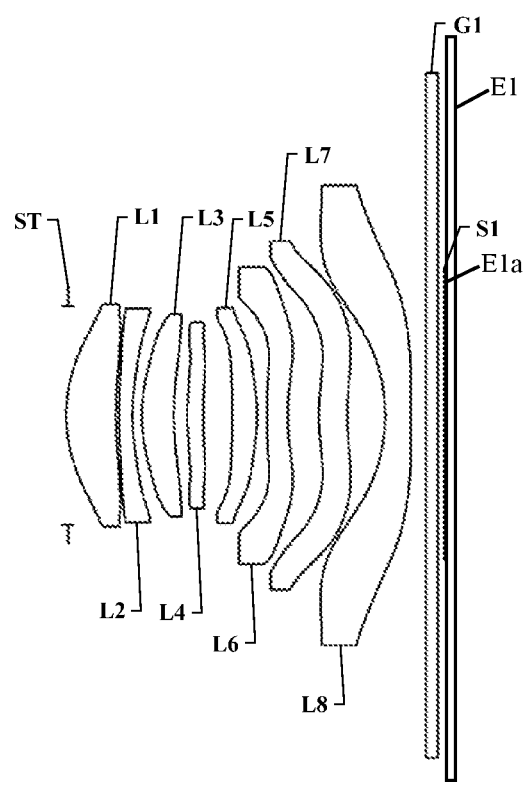
FIG. 7b is a schematic diagram of a structure of a second specific camera module in a second imaging mode.

FIG. 7a and FIG. 7b show a second specific camera module. FIG. 7a is a schematic diagram of a structure of the camera module in a first imaging mode. FIG. 7b is a schematic diagram of a structure of the camera module in a second imaging mode. A camera lens of the camera module includes eight lenses having focal power, and the eight lenses are sequentially a first lens L1, a second lens L2, a third lens L3, a fourth lens L4, a fifth lens L5, a sixth lens L6, a seventh lens L7, and an eighth lens L8 from an object side. A variable aperture ST may be specifically located on an object side of the first lens L1, and an optical filter G1 may be located on an image side of the eighth lens L8.

In this embodiment of this disclosure, each lens of the camera lens may be an aspheric lens. In other words, the camera lens includes 16 aspheric surfaces in total. Referring to both Table 3a and Table 3b, Table 3a shows a curvature radius, a thickness, a refractive index, and an Abbe number of each lens of the camera lens, and Table 3b shows an aspheric coefficient of each lens.

TABLE 3a

| | Description | Curvature radius | | Thickness | Refractive index | | Abbe number | |
|---|---|---|---|---|---|---|---|---|
| ST | Variable aperture | Infinite | d0 | −0.039 | — | — | — | — |
| R1 | First | 2.908 | d1 | 0.983 | n1 | 1.54 | v1 | 56.0 |
| R2 | lens | 7.801 | a1 | 0.065 | | | | |
| R3 | Second | 9.996 | d2 | 0.265 | n2 | 1.67 | v2 | 19.2 |
| R4 | lens | 4.144 | a2 | 0.186 | | | | |
| R5 | Third | 3.091 | d3 | 0.635 | n3 | 1.54 | v3 | 56.0 |
| R6 | lens | 5.663 | a3 | 0.269 | | | | |
| R7 | Fourth | 5.018 | d4 | 0.313 | n4 | 1.66 | v4 | 20.4 |
| R8 | lens | 6.307 | a4 | 0.580 | | | | |
| R9 | Fifth | −13.762 | d5 | 0.491 | n5 | 1.54 | v5 | 56.0 |
| R10 | lens | −2.918 | a5 | 0.197 | | | | |
| R11 | Sixth | 25.721 | d6 | 0.407 | n6 | 1.64 | v6 | 23.5 |
| R12 | lens | 3.852 | a6 | 0.624 | | | | |
| R13 | Seventh | 4.824 | d7 | 0.566 | n7 | 1.66 | v7 | 20.4 |
| R14 | lens | 6.929 | a7 | 0.749 | | | | |

TABLE 3a-continued

| | Description | Curvature radius | Thickness | | Refractive index | | Abbe number | |
|---|---|---|---|---|---|---|---|---|
| R15 | Eighth lens | −3.428 | d8 | 0.502 | n8 | 1.54 | v8 | 56.0 |
| R16 | | 19.767 | a8 | 0.301 | | | | |
| R17 | Optical filter | Infinite | d9 | 0.237 | n9 | 1.52 | v9 | 64.2 |
| R18 | | Infinite | a9 | 0.124 | | | | |

TABLE 3b

| | Type | K | R | A2 | A3 | A4 | A5 | A6 | A7 |
|---|---|---|---|---|---|---|---|---|---|
| R1 | Extended aspheric surface | 0.000 | 2.172 | −8.31E−02 | 2.50E−01 | −2.35E+00 | 8.86E+00 | −2.08E+01 | 2.97E+01 |
| R2 | Extended aspheric surface | −0.185 | 2.120 | 2.75E−01 | −5.76E+00 | 3.35E+01 | −1.21E+02 | 2.74E+02 | −3.86E+02 |
| R3 | Extended aspheric surface | −1.051 | 2.098 | 3.72E−02 | −4.85E+00 | 3.22E+01 | −1.19E+02 | 2.70E+02 | −3.80E+02 |
| R4 | Extended aspheric surface | −0.053 | 2.027 | −4.36E−01 | −1.01E+00 | 1.02E+01 | −3.88E+01 | 8.66E+01 | −1.17E+02 |
| R5 | Extended aspheric surface | 0.022 | 1.976 | −3.90E−01 | 7.77E−01 | −4.16E+00 | 1.42E+01 | −3.58E+01 | 6.21E+01 |
| R6 | Extended aspheric surface | 0.137 | 1.900 | −2.97E−01 | 1.21E+00 | −5.87E+00 | 1.97E+01 | −4.98E+01 | 8.16E+01 |
| R7 | Extended aspheric surface | 0.083 | 1.818 | −8.20E−01 | 2.13E+00 | −8.41E+00 | 2.60E+01 | −5.52E+01 | 7.52E+01 |
| R8 | Extended aspheric surface | 1.298 | 1.715 | −5.70E−01 | 1.15E+00 | −4.12E+00 | 1.14E+01 | −2.07E+01 | 2.41E+01 |
| R9 | Extended aspheric surface | −0.275 | 1.874 | 7.70E−02 | 1.03E+00 | −6.24E+00 | 1.25E+01 | −1.18E+01 | 1.08E+00 |
| R10 | Extended aspheric surface | 0.025 | 2.106 | 2.56E+00 | −7.31E+00 | 1.59E+01 | −3.83E+01 | 7.79E+01 | −1.05E+02 |
| R11 | Extended aspheric surface | −69.062 | 2.317 | 2.09E+00 | −1.59E+01 | 5.99E+01 | −1.63E+02 | 2.84E+02 | −2.98E+02 |
| R12 | Extended aspheric surface | −0.119 | 2.909 | −3.08E+00 | −4.89E+00 | 5.36E+01 | −2.53E+02 | 6.98E+02 | −1.11E+03 |
| R13 | Extended aspheric surface | −0.107 | 3.047 | −2.08E+00 | −1.12E+00 | 1.13E+01 | 1.38E+02 | −5.36E+02 | 8.72E+02 |
| R14 | Extended aspheric surface | 0.493 | 3.407 | −1.49E−01 | −3.40E+01 | 1.37E+02 | −2.43E+02 | 1.65E+02 | 7.42E+01 |
| R15 | Extended aspheric surface | −0.972 | 4.270 | −2.97E+00 | 1.19E+01 | −1.15E+02 | 6.90E+02 | −1.90E+03 | 2.79E+03 |
| R16 | Extended aspheric surface | 1.000 | 4.270 | −1.17E+01 | 6.25E+01 | −2.08E+02 | 3.90E+02 | −4.16E+02 | 2.78E+02 |

| | Type | K | R | A8 | A9 | A10 | A11 | A12 | A13 |
|---|---|---|---|---|---|---|---|---|---|
| R1 | Extended aspheric surface | 0.000 | 2.172 | −2.65E+01 | 1.45E+01 | −4.44E+00 | 5.90E−01 | 0.00E+00 | 0.00E+00 |
| R2 | Extended aspheric surface | −0.185 | 2.120 | 3.29E+02 | −1.55E+02 | 3.13E+01 | 0.00E+00 | 0.00E+00 | 0.00E+00 |
| R3 | Extended aspheric surface | −1.051 | 2.098 | 3.24E+02 | −1.53E+02 | 3.09E+01 | 0.00E+00 | 0.00E+00 | 0.00E+00 |
| R4 | Extended aspheric surface | −0.053 | 2.027 | 9.45E+01 | −4.25E+01 | 8.19E+00 | 0.00E+00 | 0.00E+00 | 0.00E+00 |
| R5 | Extended aspheric surface | 0.022 | 1.976 | −6.44E+01 | 3.57E+01 | −8.19E+00 | 0.00E+00 | 0.00E+00 | 0.00E+00 |
| R6 | Extended aspheric surface | 0.137 | 1.900 | −7.69E+01 | 3.76E+01 | −7.32E+00 | 0.00E+00 | 0.00E+00 | 0.00E+00 |
| R7 | Extended aspheric surface | 0.083 | 1.818 | −6.02E+01 | 2.52E+01 | −4.07E+00 | 0.00E+00 | 0.00E+00 | 0.00E+00 |
| R8 | Extended aspheric surface | 1.298 | 1.715 | −1.64E+01 | 5.68E+00 | −6.85E−01 | 0.00E+00 | 0.00E+00 | 0.00E+00 |
| R9 | Extended aspheric surface | −0.275 | 1.874 | 9.06E+00 | −7.79E+00 | 1.69E+00 | 2.57E−01 | 0.00E+00 | 0.00E+00 |
| R10 | Extended aspheric surface | 0.025 | 2.106 | 8.47E+01 | −3.53E+01 | 4.65E+00 | 1.14E−01 | 3.74E−01 | 0.00E+00 |
| R11 | Extended aspheric surface | −69.062 | 2.317 | 1.73E+02 | −4.70E+01 | 3.73E+00 | 2.93E−01 | −3.77E−01 | 0.00E+00 |
| R12 | Extended aspheric surface | −0.119 | 2.909 | 1.01E+03 | −4.82E+02 | 8.96E+01 | 2.14E+00 | 2.85E−01 | 0.00E+00 |
| R13 | Extended aspheric surface | −0.107 | 3.047 | −7.20E+02 | 2.92E+02 | −5.00E+01 | 8.97E+00 | −3.96E+00 | 0.00E+00 |
| R14 | Extended aspheric surface | 0.493 | 3.407 | −1.85E+02 | 9.50E+01 | −1.90E+00 | −1.21E+01 | 4.19E+00 | −1.14E+00 |

TABLE 3b-continued

| | | | | | | | | |
|---|---|---|---|---|---|---|---|---|
| R15 | Extended aspheric surface | −0.972 | 4.270 | −2.30E+03 | 9.85E+02 | −1.52E+02 | −1.54E+01 | 4.64E+00 | −1.56E+00 |
| R16 | Extended aspheric surface | 1.000 | 4.270 | −1.78E+02 | 1.45E+02 | −8.08E+01 | 1.79E+01 | 0.00E+00 | 0.00E+00 |

In the 16 aspheric surfaces of the camera lens shown in Table 3b, surface types z of all the extended aspheric surfaces may be defined by using but not limited to the following aspheric surface formula:

$$z = \frac{cr^2}{1+\sqrt{1-Kc^2r^2}} + A_2r^4 + A_3r^6 + A_4r^8 + A_5r^{10} + A_6r^{12} + A_7r^{14} + A_8r^{16} + A_9r^{18} + A_{10}r^{20} + A_{11}r^{22} + A_{12}r^{24} + A_{13}r^{26}$$

Herein, z represents a rise of an aspheric surface, r represents a normalized radial coordinate of the aspheric surface, r is equal to a result obtained by dividing an actual radial coordinate of the aspheric surface by a normalized radius R, c represents spherical curvature of a vertex of the aspheric surface, K represents a quadric surface constant, and A2, A3, A4, A5, A6, A7, A8, A9, A10, A11, A12, and A13 represent aspheric coefficients.

In this embodiment of this disclosure, the second lens L2 has negative focal power, and a ratio of a focal length f2 of the second lens L2 to a focal length EFL of the camera lens is |f2/EFL|=1.71. The fifth lens L5 has positive focal power, and a ratio of a focal length f5 of the fifth lens to the focal length EFL of the camera lens is |f5/EFL|=1.07. The sixth lens L6 has negative focal power, and a ratio of a focal length f6 of the sixth lens to the focal length EFL of the camera lens is |f6/EFL|=1.14. A ratio of the focal length EFL of the camera lens to a total length (TTL) of the camera lens is |EFL/TTL|=0.830.

With continued reference to FIG. 7a, wherein the camera module is in the first imaging mode, the camera lens performs imaging in a full area of a photosensitive area, a half-image height Y1 of the camera lens is 5.8 mm, an entrance pupil diameter EPD1 is 3.037 mm, and a quantity F of apertures is 2.075. Referring to FIG. 7b, when the camera module is switched to the second imaging mode, the camera lens performs imaging in a partial area of a photosensitive area, a half-image height Y2 of the camera lens is 2.86 mm, an entrance pupil diameter EPD2 is 4.29 mm, and a quantity F of apertures is 1.461. A ratio of EPD1 to EPD2 is |EPD1/EPD2|=0.708, and a ratio of Y1 to Y2 is |Y1/Y2|=2.028. In addition, when a camera module is in the first imaging mode, a ratio of the half-image height Y1 of the camera lens to the total length (TTL) of the camera lens is |Y1/TTL|=0.77, and a ratio of the entrance pupil diameter EPD1 to the total length (TTL) of the camera lens is |EPD1/TTL|=0.4053. For each basic parameter of the camera lens, refer to Table 4.

TABLE 4

| | Object distance | Infinite far |
|---|---|---|
| | Focal length EFL (mm) | 6.22 |
| First imaging mode | Value of F | 2.08 |
| | Half-image height Y1 (mm) | 5.80 |
| | Half FOV (°) | 42.304 |
| Second | Value of F | 1.46 |

TABLE 4-continued

| | Object distance | Infinite far |
|---|---|---|
| imaging mode | Half-image height Y2 (mm) | 2.86 |
| | Half FOV (°) | 24.058 |
| | BFL (mm) | 0.662 |
| | TTL (mm) | 7.49 |
| | Designed wavelength | 650 nm, 610 nm, 555 nm, 510 nm, 470 nm |

The camera module shown in FIG. 7a and FIG. 7b is simulated. A simulation result of the camera module is described in detail below with reference to accompanying drawings.

Figure 8A:
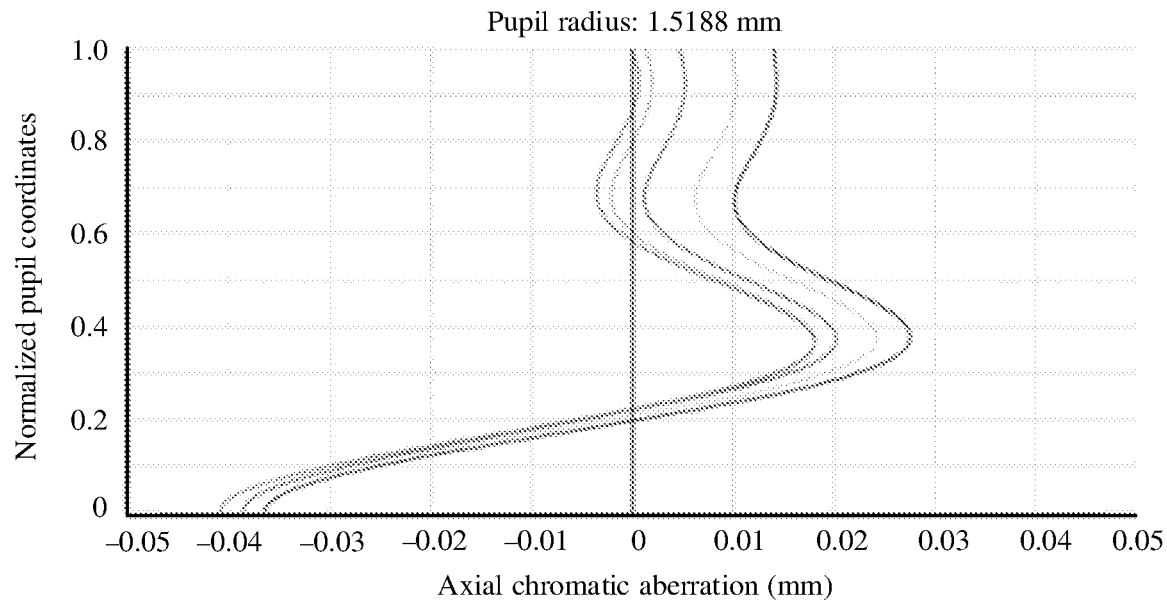

FIG. 8a is a curve diagram of an axial chromatic aberration of a camera module in a first imaging mode. Simulation results of a depth of focus location of colorful light rays on wavelengths of 650 nm, 610 nm, 555 nm, 510 nm, and 470 nm are separately shown in the figure. It can be learned that the axial chromatic aberration of a camera lens in the first imaging mode is controlled to fall within a very small range.

Figure 8B:
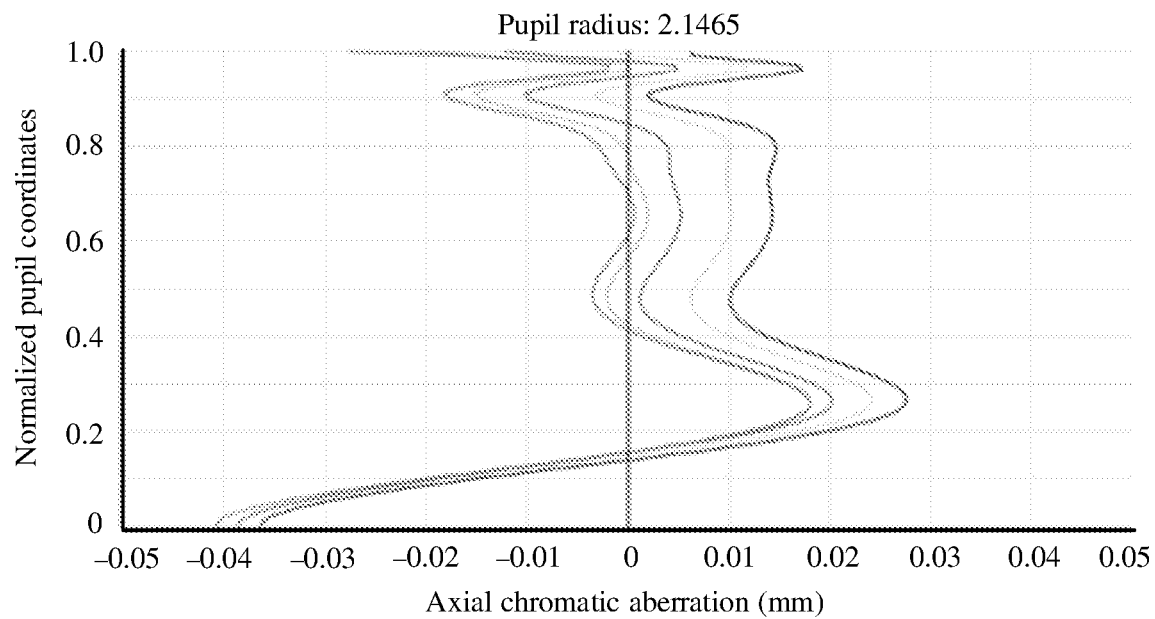
FIG. 8b is a curve diagram of an axial chromatic aberration of a camera module in FIG. 7b.

FIG. 8b is a curve diagram of an axial chromatic aberration of a camera module in a second imaging mode. Simulation results of a depth of focus location of colorful light rays on wavelengths of 650 nm, 610 nm, 555 nm, 510 nm, and 470 nm are separately shown in the figure. It can be learned that the axial chromatic aberration of a camera lens in the second imaging mode is controlled to fall within a very small range.

Figure 9A:
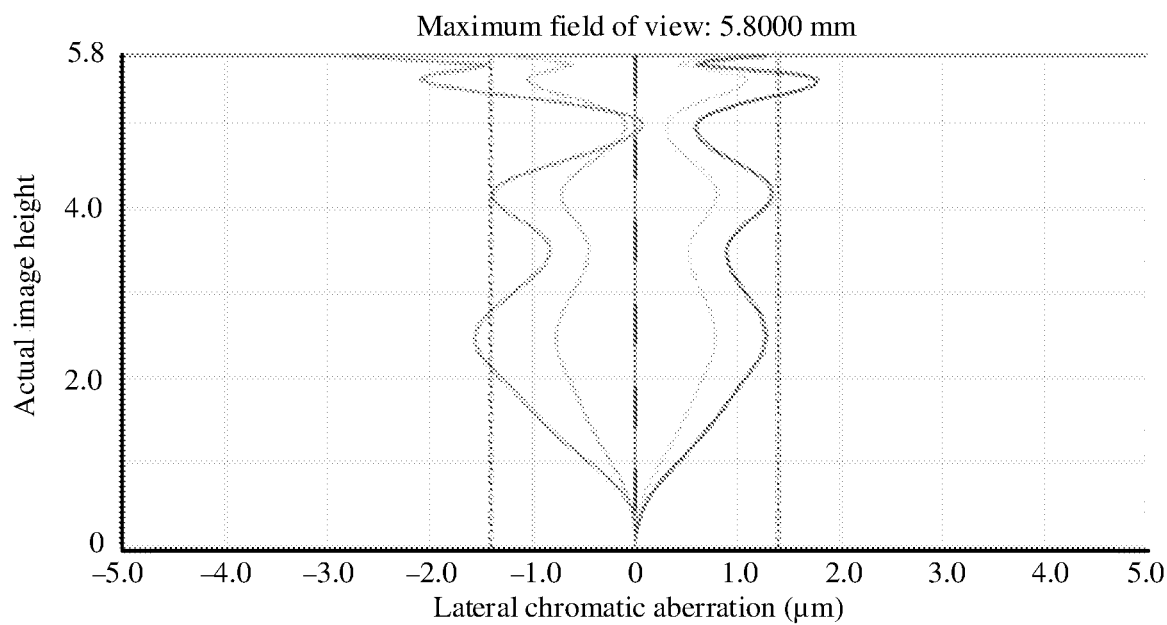

FIG. 9a is a curve diagram of a lateral chromatic aberration of a camera module in a first imaging mode. In the figure, five solid curves are respectively colorful light rays on wavelengths of 650 nm, 610 nm, 555 nm, 510 nm, and 470 nm, and dotted lines indicate that a diffraction limit range is from −1.4 μm to 1.4 μm, and it can be learned that lateral chromatic aberrations of the five light rays basically fall within the diffraction limit range.

Figure 9B:
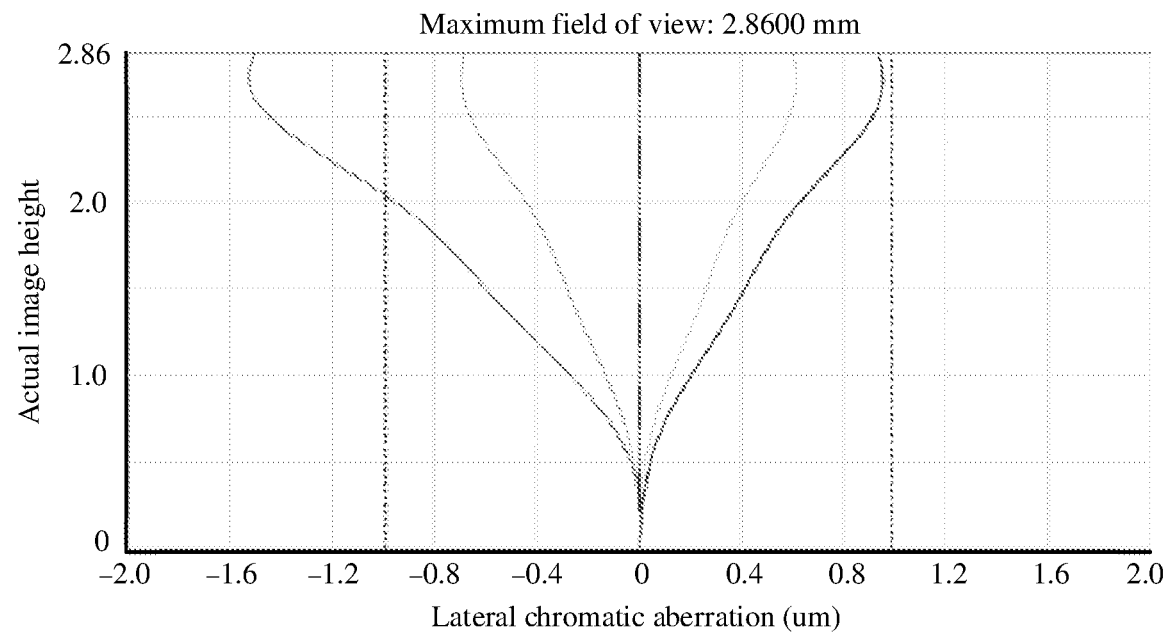
FIG. 9b is a curve diagram of a lateral chromatic aberration of a camera module in FIG. 7b.

FIG. 9b is a curve diagram of a lateral chromatic aberration of a camera module in a second imaging mode. In the figure, five solid curves are respectively colorful light rays on wavelengths of 650 nm, 610 nm, 555 nm, 510 nm, and 470 nm, and dotted lines indicate that a diffraction limit range is from −1.0 μm to 1.0 μm, and it can be learned that lateral chromatic aberrations of the five light rays basically fall within the diffraction limit range.

Figure 10A:
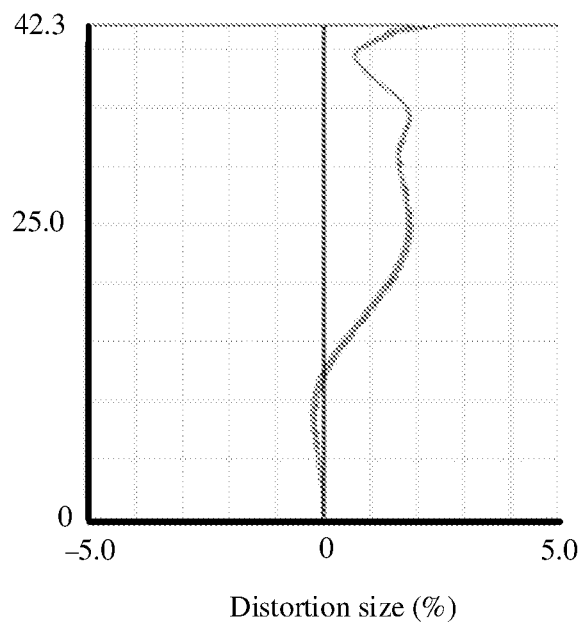

FIG. 10a is a curve diagram of optical distortion of a camera module in a first imaging mode, showing a difference between imaging deformation and an ideal shape. In the figure, five solid curves are respectively colorful light rays on wavelengths of 650 nm, 610 nm, 555 nm, 510 nm, and 470 nm. It can be learned that, in this mode, the optical distortion may be controlled to fall within a range less than 2%.

Figure 10B:
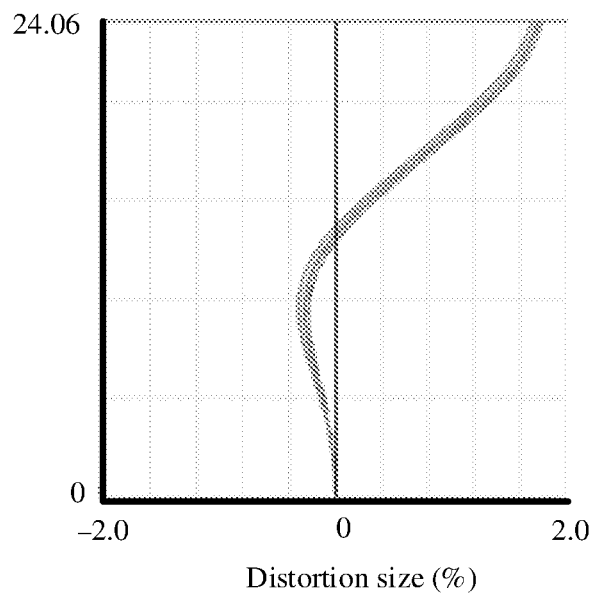
FIG. 10b is a curve diagram of optical distortion of a camera module in FIG. 7b.

FIG. 10b is a curve diagram of optical distortion of a camera module in a second imaging mode, showing a difference between imaging deformation and an ideal shape. In the figure, five solid curves are respectively colorful light rays on wavelengths of 650 nm, 610 nm, 555 nm, 510 nm, and 470 nm. It can be learned that, in this mode, the optical distortion may be controlled to fall within a range less than 2%.

Figure 11A:
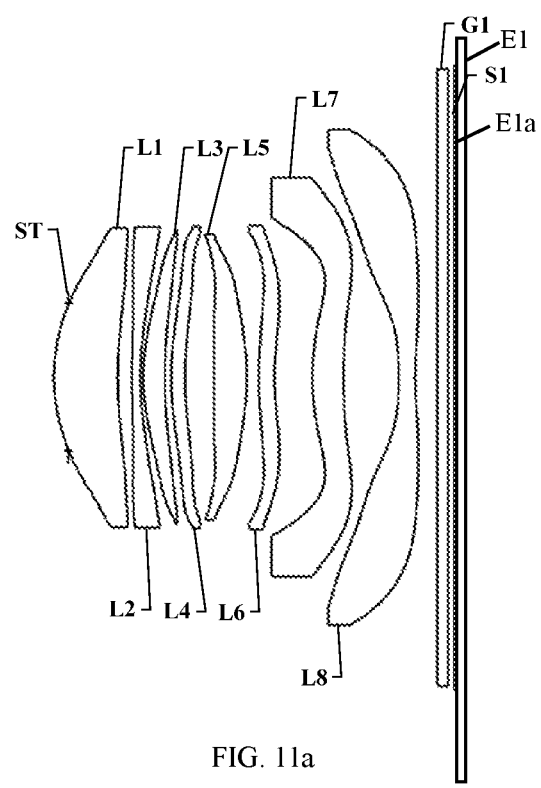
FIG. 11a is a schematic diagram of a structure of a third specific camera module in a first imaging mode.
Figure 11B:
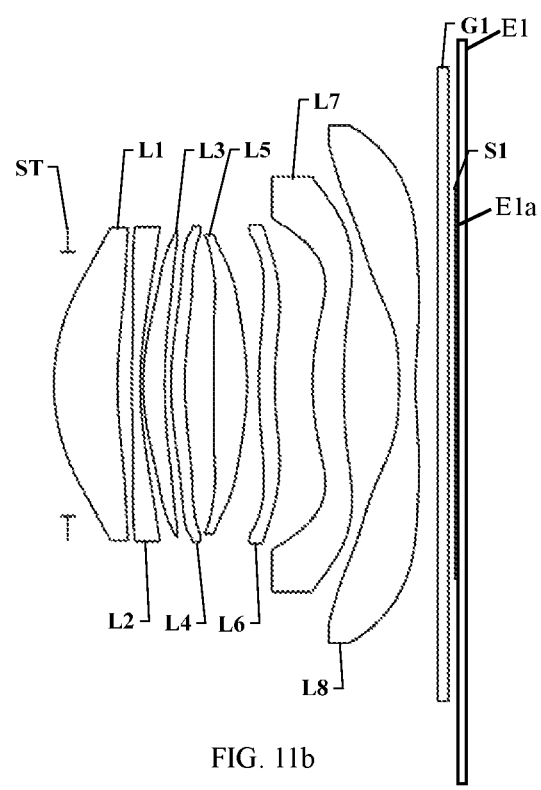
FIG. 11b is a schematic diagram of a structure of a third specific camera module in a second imaging mode.

FIG. 11a and FIG. 11b show a third specific camera module. FIG. 11a is a schematic diagram of a structure of the camera module in a first imaging mode. FIG. 11b is a schematic diagram of a structure of the camera module in a second imaging mode. A camera lens of the camera module includes eight lenses having focal power, and the eight lenses are sequentially a first lens L1, a second lens L2, a third lens L3, a fourth lens L4, a fifth lens L5, a sixth lens L6, a seventh lens L7, and an eighth lens L8 from an object side. A variable aperture ST may be specifically located on an object side of the first lens L1, and an optical filter G1 may be located on an image side of the eighth lens L8.

In this embodiment of this disclosure, each lens of the camera lens may be an aspheric lens. In other words, the camera lens includes 16 aspheric surfaces in total. Referring to both Table 5a and Table 5b, Table 5a shows a curvature radius, a thickness, a refractive index, and an Abbe number of each lens of the camera lens, and Table 5b shows an aspheric coefficient of each lens.

TABLE 5a

|  | Description | Curvature radius | Thickness | | Refractive index | | Abbe number | |
| --- | --- | --- | --- | --- | --- | --- | --- | --- |
| ST | Variable aperture | Infinite | d0 | −0.270 | — | — | — | — |
| R1 | First | 3.530 | d1 | 1.217 | n1 | 1.55 | v1 | 71.7 |
| R2 | lens | 8.789 | a1 | 0.273 | | | | |
| R3 | Second | 24.967 | d2 | 0.161 | n2 | 1.68 | v2 | 18.4 |
| R4 | lens | 6.799 | a2 | 0.056 | | | | |
| R5 | Third | 4.598 | d3 | 0.409 | n3 | 1.54 | v3 | 56.0 |
| R6 | lens | 9.333 | a3 | 0.123 | | | | |
| R7 | Fourth | 5.398 | d4 | 0.265 | n4 | 1.54 | v4 | 56.0 |
| R8 | lens | 6.598 | a4 | 0.551 | | | | |
| R9 | Fifth | −112.991 | d5 | 0.636 | n5 | 1.51 | v5 | 56.5 |
| R10 | lens | −4.081 | a5 | 0.229 | | | | |
| R11 | Sixth | 15.595 | d6 | 0.299 | n6 | 1.54 | v6 | 55.9 |
| R12 | lens | 6.840 | a6 | 0.724 | | | | |
| R13 | Seventh | 5.316 | d7 | 0.596 | n7 | 1.54 | v7 | 56.0 |
| R14 | lens | 14.302 | a7 | 1.053 | | | | |
| R15 | Eighth | −12.023 | d8 | 0.316 | n8 | 1.54 | v8 | 55.7 |
| R16 | lens | 6.797 | a8 | 0.418 | | | | |
| R17 | Optical | Infinite | d9 | 0.210 | n9 | 1.52 | v9 | 64.2 |
| R18 | filter | Infinite | a9 | 0.123 | | | | |

TABLE 5b

| | Type | K | R | A2 | A3 | A4 | A5 | A6 | A7 |
| --- | --- | --- | --- | --- | --- | --- | --- | --- | --- |
| R1 | Extended aspheric surface | −0.567 | 2.851 | 1.55E−01 | −1.21E+00 | 6.66E+00 | −3.05E+01 | 1.05E+02 | −2.29E+02 |
| R2 | Extended aspheric surface | −4.735 | 2.862 | 4.70E−01 | −6.92E+00 | 3.09E+01 | −8.03E+01 | 1.23E+02 | −1.09E+02 |
| R3 | Extended aspheric surface | 5.328 | 2.870 | −1.41E−02 | −3.12E+00 | 1.31E+01 | −3.74E+01 | 8.40E+01 | −1.24E+02 |
| R4 | Extended aspheric surface | −0.828 | 2.860 | 1.07E+00 | −1.38E+01 | 5.86E+01 | −1.39E+02 | 2.10E+02 | −2.11E+02 |
| R5 | Extended aspheric surface | −0.479 | 2.800 | 1.35E+00 | −1.47E+01 | 5.99E+01 | −1.49E+02 | 2.27E+02 | −1.99E+02 |
| R6 | Extended aspheric surface | 1.913 | 2.800 | −4.31E−01 | 4.23E+00 | −2.05E+01 | 4.17E+01 | −3.64E+01 | 3.89E−02 |
| R7 | Extended aspheric surface | 0.153 | 2.886 | −1.18E+00 | 2.50E+00 | −1.57E+01 | 8.48E+01 | −2.94E+02 | 6.13E+02 |
| R8 | Extended aspheric surface | 1.272 | 2.752 | −7.59E−01 | 1.13E+00 | −8.38E+00 | 5.83E+01 | −2.51E+02 | 5.86E+02 |
| R9 | Extended aspheric surface | 112.283 | 2.727 | 4.66E−01 | −2.93E+00 | 2.43E+01 | −9.17E+01 | 1.63E+02 | −1.41E+02 |
| R10 | Extended aspheric surface | −0.686 | 2.728 | 3.13E+00 | −2.13E+01 | 1.04E+02 | −3.08E+02 | 5.57E+02 | −6.59E+02 |
| R11 | Extended aspheric surface | −19.855 | 2.771 | 3.44E+00 | −3.14E+01 | 1.31E+02 | −3.19E+02 | 4.79E+02 | −4.55E+02 |
| R12 | Extended aspheric surface | 0.843 | 2.909 | 1.34E+00 | −2.33E+01 | 9.15E+01 | −2.04E+02 | 2.87E+02 | −2.65E+02 |
| R13 | Extended aspheric surface | −4.226 | 3.031 | 1.50E+00 | −6.88E+00 | 6.24E+00 | −6.26E+00 | 9.32E+00 | −9.08E+00 |
| R14 | Extended aspheric surface | 7.126 | 3.795 | 1.14E+00 | 1.23E+01 | −1.60E+02 | 6.63E+02 | −1.56E+03 | 2.32E+03 |
| R15 | Extended aspheric surface | −0.811 | 4.364 | −3.07E+01 | 1.90E+02 | −4.99E+02 | 5.29E+02 | 3.08E+02 | −1.64E+03 |
| R16 | Extended aspheric surface | −11.111 | 4.733 | −1.25E+01 | 5.03E+01 | −8.96E+01 | 2.48E+01 | 1.55E+02 | −2.70E+02 |

| | Type | K | R | A8 | A9 | A10 | A11 | A12 | A13 |
| --- | --- | --- | --- | --- | --- | --- | --- | --- | --- |
| R1 | Extended aspheric surface | −0.567 | 2.851 | 2.96E+02 | −2.18E+02 | 8.50E+01 | −1.35E+01 | 0.00E+00 | 0.00E+00 |
| R2 | Extended aspheric surface | −4.735 | 2.862 | 5.30E+01 | −1.21E+01 | 7.88E−01 | 0.00E+00 | 0.00E+00 | 0.00E+00 |
| R3 | Extended aspheric surface | 5.328 | 2.870 | 1.07E+02 | −4.88E+01 | 9.06E+00 | 0.00E+00 | 0.00E+00 | 0.00E+00 |
| R4 | Extended aspheric surface | −0.828 | 2.860 | 1.40E+02 | −5.55E+01 | 9.75E+00 | 0.00E+00 | 0.00E+00 | 0.00E+00 |

TABLE 5b-continued

| | | | | | | | | |
|---|---|---|---|---|---|---|---|---|
| R5 | Extended aspheric surface | −0.479 | 2.800 | 9.05E+01 | −1.52E+01 | −8.43E−01 | 0.00E+00 | 0.00E+00 | 0.00E+00 |
| R6 | Extended aspheric surface | 1.913 | 2.800 | 2.78E+01 | −2.30E+01 | 6.49E+00 | 0.00E+00 | 0.00E+00 | 0.00E+00 |
| R7 | Extended aspheric surface | 0.153 | 2.886 | −7.40E+02 | 4.74E+02 | −1.24E+02 | 0.00E+00 | 0.00E+00 | 0.00E+00 |
| R8 | Extended aspheric surface | 1.272 | 2.752 | −7.34E+02 | 4.67E+02 | −1.18E+02 | 0.00E+00 | 0.00E+00 | 0.00E+00 |
| R9 | Extended aspheric surface | 112.283 | 2.727 | 4.29E+01 | 1.89E+01 | −1.79E+01 | 3.90E+00 | 0.00E+00 | 0.00E+00 |
| R10 | Extended aspheric surface | −0.686 | 2.728 | 5.30E+02 | −2.93E+02 | 1.08E+02 | −2.37E+01 | 2.36E+00 | 0.00E+00 |
| R11 | Extended aspheric surface | −19.855 | 2.771 | 2.70E+02 | −9.34E+01 | 1.53E+01 | 6.02E−02 | −2.50E−01 | 0.00E+00 |
| R12 | Extended aspheric surface | 0.843 | 2.909 | 1.62E+02 | −6.54E+01 | 1.66E+01 | −2.42E+00 | 1.54E−01 | 0.00E+00 |
| R13 | Extended aspheric surface | −4.226 | 3.031 | 4.92E+00 | −1.44E+00 | 1.91E−01 | −6.37E−04 | −1.65E−03 | 0.00E+00 |
| R14 | Extended aspheric surface | 7.126 | 3.795 | −2.30E+03 | 1.53E+03 | −6.70E+02 | 1.87E+02 | −3.00E+01 | 2.11E+00 |
| R15 | Extended aspheric surface | −0.811 | 4.364 | 2.26E+03 | −1.74E+03 | 8.21E+02 | −2.37E+02 | 3.86E+01 | −2.71E+00 |
| R16 | Extended aspheric surface | −11.111 | 4.733 | 2.11E+02 | −8.84E+01 | 1.93E+01 | −1.73E+00 | 0.00E+00 | 0.00E+00 |

In the 16 aspheric surfaces of the camera lens shown in Table 5b, surface types z of all the extended aspheric surfaces may be defined by using but not limited to the following aspheric surface formula:

$$z = \frac{cr^2}{1+\sqrt{1-Kc^2r^2}} + A_2r^4 + A_3r^6 + A_4r^8 + A_5r^{10} + A_6r^{12} + A_7r^{14} + A_8r^{16} + A_9r^{18} + A_{10}r^{20} + A_{11}r^{22} + A_{12}r^{24} + A_{13}r^{26}$$

Herein, z represents a rise of an aspheric surface, r represents a normalized radial coordinate of the aspheric surface, r is equal to a result obtained by dividing an actual radial coordinate of the aspheric surface by a normalized radius R, c represents spherical curvature of a vertex of the aspheric surface, K represents a quadric surface constant, and A2, A3, A4, A5, A6, A7, A8, A9, A10, A11, A12, and A13 represent aspheric coefficients.

In this embodiment of this disclosure, the second lens L2 has negative focal power, and a ratio of a focal length f2 of the second lens L2 to a focal length EFL of the camera lens is |f2/EFL|=2.452. The fifth lens L5 has positive focal power, and a ratio of a focal length f5 of the fifth lens to the focal length EFL of the camera lens is |f5/EFL|=1.49. The sixth lens L6 has negative focal power, and a ratio of a focal length f6 of the sixth lens to the focal length EFL of the camera lens is |f6/EFL|=4.052. A ratio of the focal length EFL of the camera lens to a total length (TTL) of the camera lens is |EFL/TTL|=0.7269.

With continued reference to FIG. 11a, when the camera module is in the first imaging mode, the camera lens performs imaging in a full area of a photosensitive area, a half-image height Y1 of the camera lens is 5.8 mm, an entrance pupil diameter EPD1 is 2.8 mm, and a quantity F of apertures is 1.99. Referring to FIG. 11b, when the camera module is switched to the second imaging mode, the camera lens performs imaging in a partial area of a photosensitive area, a half-image height Y2 of the camera lens is 3.00 mm, an entrance pupil diameter EPD2 is 4.84 mm, and a quantity F of apertures is 1.15. A ratio of EPD1 to EPD2 is |EPD1/EPD2|=0.579, and a ratio of Y1 to Y2 is |Y1/Y2|=1.933. In addition, when a camera module is in the first imaging mode, a ratio of the half-image height Y1 of the camera lens to the total length (TTL) of the camera lens is |Y1/TTL|=0.757, and a ratio of the entrance pupil diameter EPD1 to the total length (TTL) of the camera lens is |EPD1/TTL|=0.3656. For each basic parameter of the camera lens, refer to Table 6.

TABLE 6

| | Object distance | Infinite far |
|---|---|---|
| | Focal length EFL (mm) | 5.57 |
| First imaging mode | Value of F | 1.99 |
| | Half-image height Y1 (mm) | 5.80 |
| | Half FOV (°) | 45.261 |
| Second imaging mode | Value of F | 1.15 |
| | Half-image height Y2 (mm) | 3.00 |
| | Half FOV (°) | 27.908 |
| | BFL (mm) | 0.750 |
| | TTL (mm) | 7.66 |
| | Designed wavelength | 650 nm, 610 nm, 555 nm, 510 nm, 470 nm |

The camera module shown in FIG. 11a and FIG. 11b is simulated. A simulation result of the camera module is described in detail below with reference to accompanying drawings.

Figure 12A:
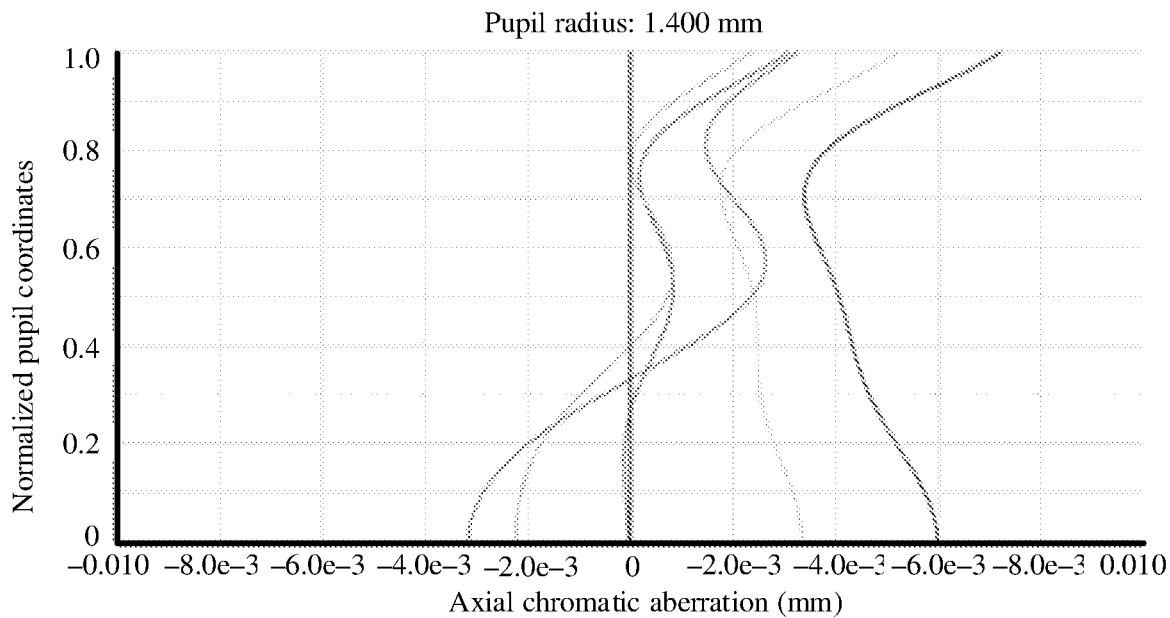

FIG. 12a is a curve diagram of an axial chromatic aberration of a camera module in a first imaging mode. Simulation results of a depth of focus location of colorful light rays on wavelengths of 650 nm, 610 nm, 555 nm, 510 nm, and 470 nm are separately shown in the figure. It can be learned that the axial chromatic aberration of a camera lens in the first imaging mode is controlled to fall within a very small range.

Figure 12B:
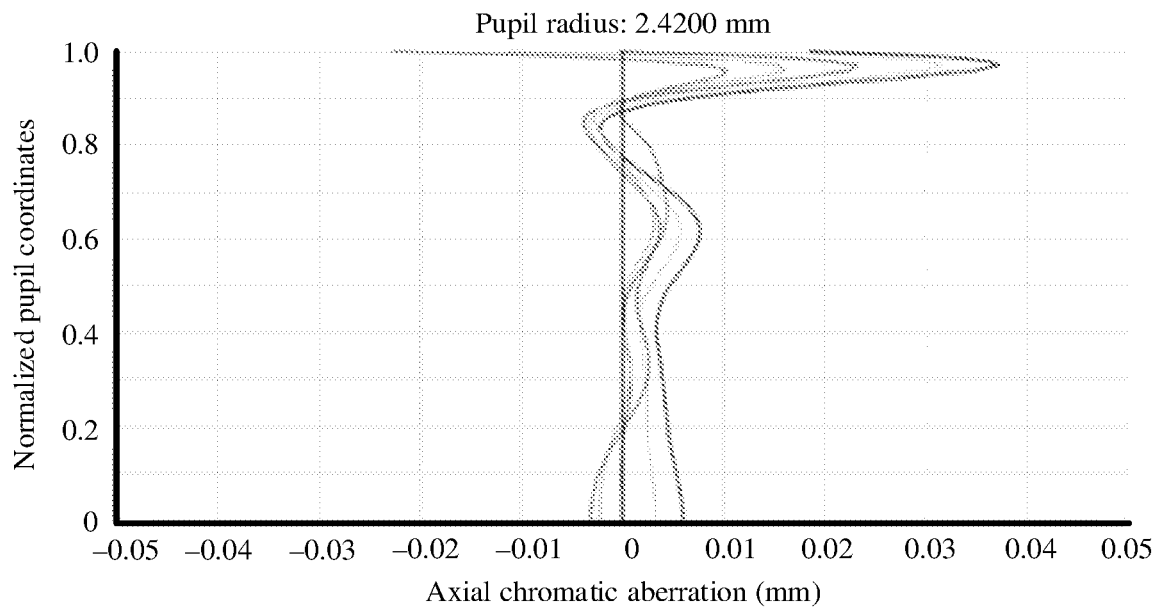
FIG. 12b is a curve diagram of an axial chromatic aberration of a camera module in FIG. 11b.

FIG. 12b is a curve diagram of an axial chromatic aberration of a camera module in a second imaging mode. Simulation results of a depth of focus location of colorful light rays on wavelengths of 650 nm, 610 nm, 555 nm, 510 nm, and 470 nm are separately shown in the figure. It can be learned that the axial chromatic aberration of a camera lens in the second imaging mode is controlled to fall within a very small range.

Figure 13A:
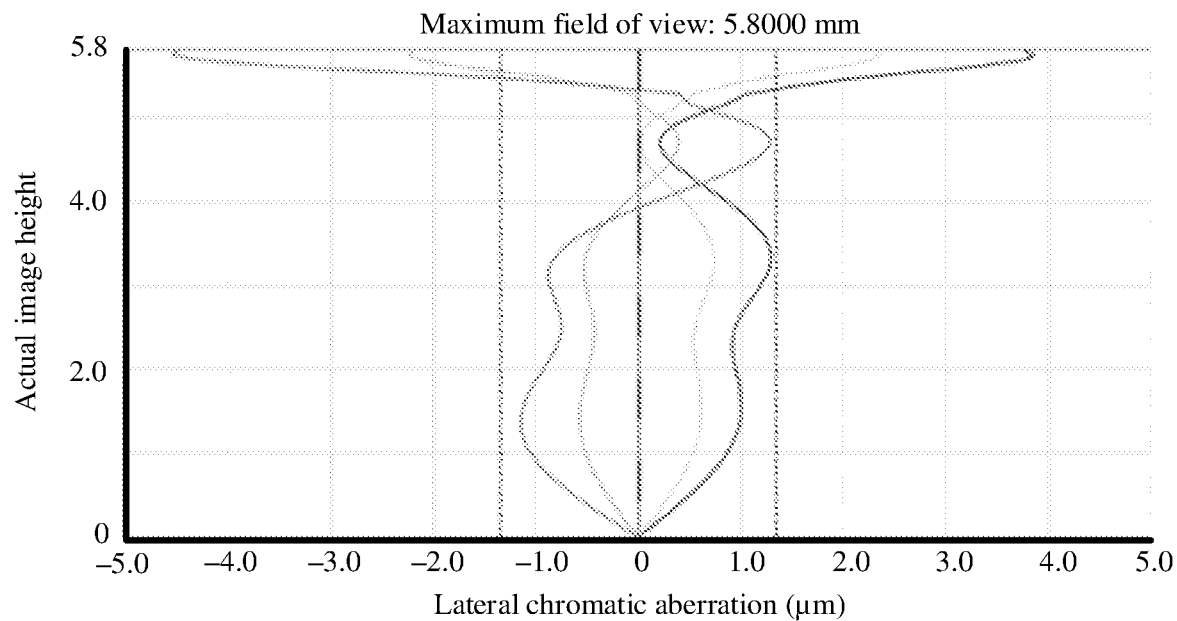

FIG. 13a is a curve diagram of a lateral chromatic aberration of a camera module in a first imaging mode. In the figure, five solid curves are respectively colorful light rays on wavelengths of 650 nm, 610 nm, 555 nm, 510 nm, and 470 nm, and dotted lines indicate that a diffraction limit range is from −1.3 μm to 1.3 μm, and it can be learned that lateral chromatic aberrations of the five light rays basically fall within the diffraction limit range.

Figure 13B:
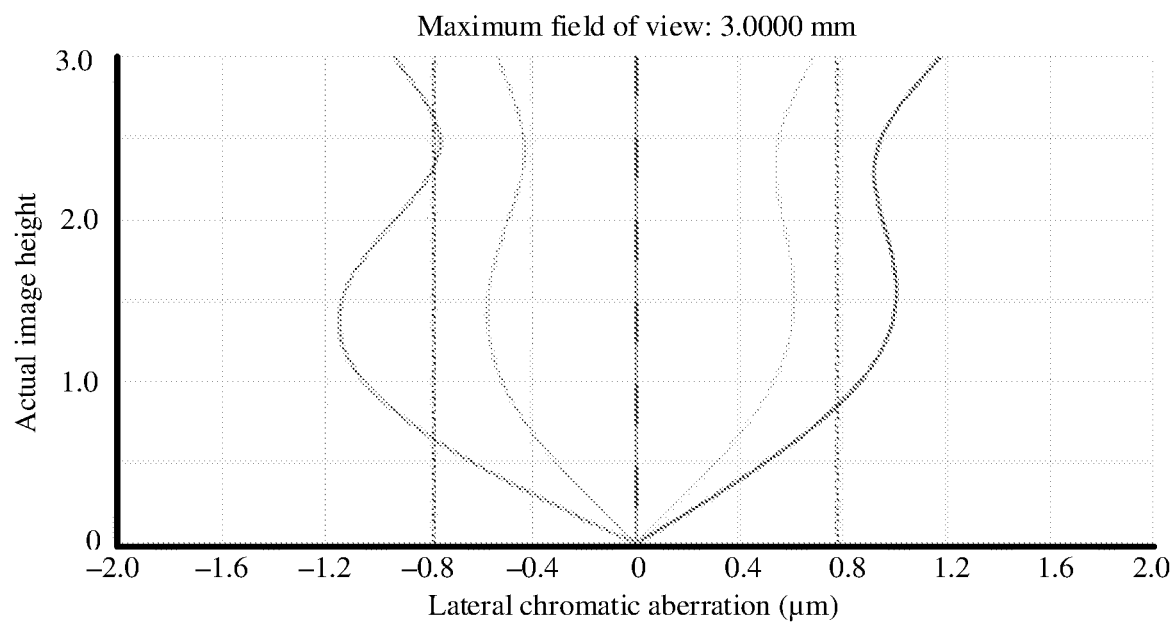
FIG. 13b is a curve diagram of a lateral chromatic aberration of a camera module in FIG. 11b.

FIG. 13b is a curve diagram of a lateral chromatic aberration of a camera module in a second imaging mode. In the figure, five solid curves are respectively colorful light rays on wavelengths of 650 nm, 610 nm, 555 nm, 510 nm, and 470 nm, and dotted lines indicate that a diffraction limit range is from −0.78 μm to 0.78 μm, and it can be learned that lateral chromatic aberrations of the five light rays basically fall within the diffraction limit range.

Figure 14A:
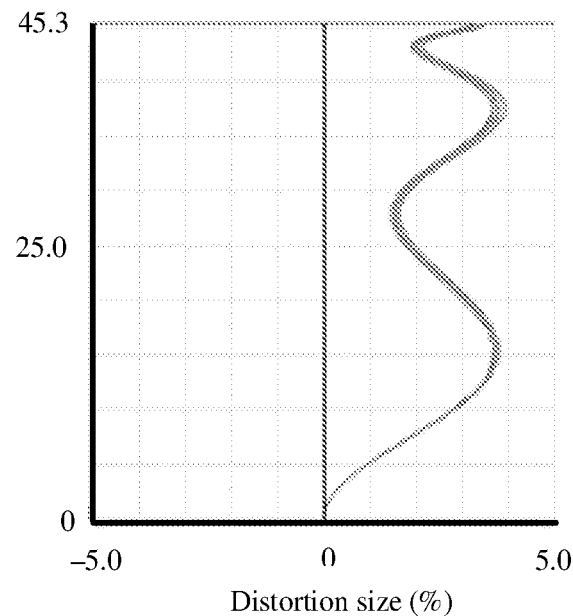

FIG. 14a is a curve diagram of optical distortion of a camera module in a first imaging mode, showing a difference between imaging deformation and an ideal shape. In the figure, five solid curves are respectively colorful light rays on wavelengths of 650 nm, 610 nm, 555 nm, 510 nm, and 470 nm. It can be learned that, in this mode, the optical distortion may be controlled to fall within a range less than 4%.

Figure 14B:
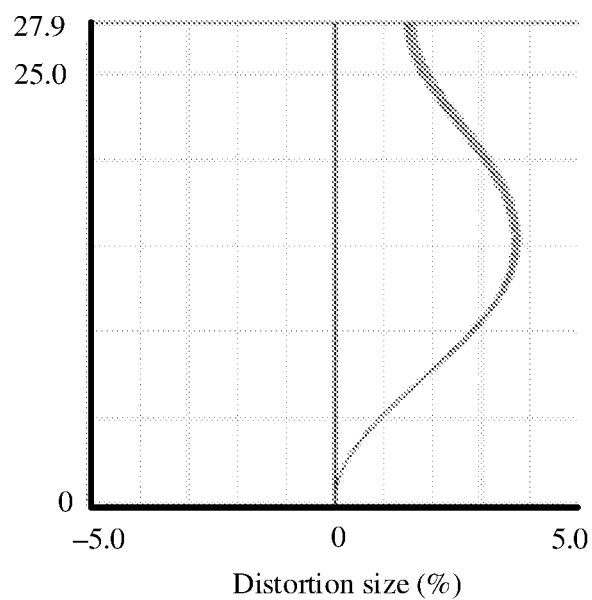
FIG. 14b is a curve diagram of optical distortion of a camera module in FIG. 11b.

FIG. 14b is a curve diagram of optical distortion of a camera module in a second imaging mode, showing a difference between imaging deformation and an ideal shape. In the figure, five solid curves are respectively colorful light rays on wavelengths of 650 nm, 610 nm, 555 nm, 510 nm, and 470 nm. It can be learned that, in this mode, the optical distortion may be controlled to fall within a range less than 4%.

Figure 15A:
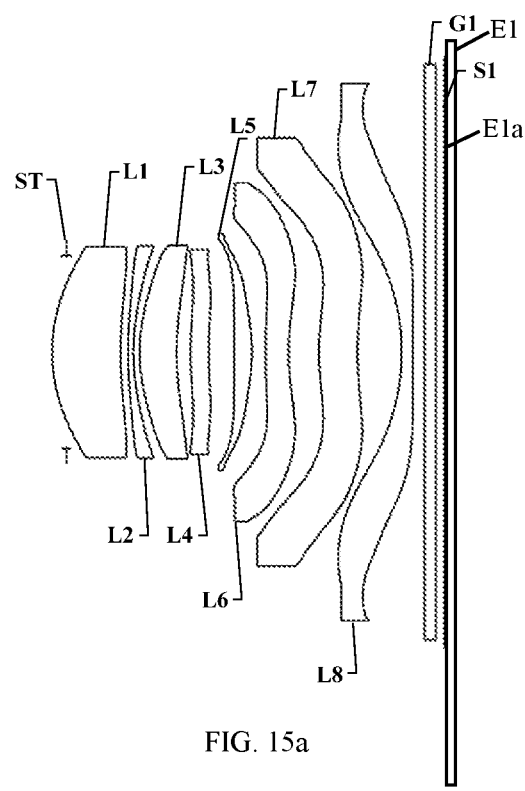
FIG. 15a is a schematic diagram of a structure of a fourth specific camera module in a first imaging mode.
Figure 15B:
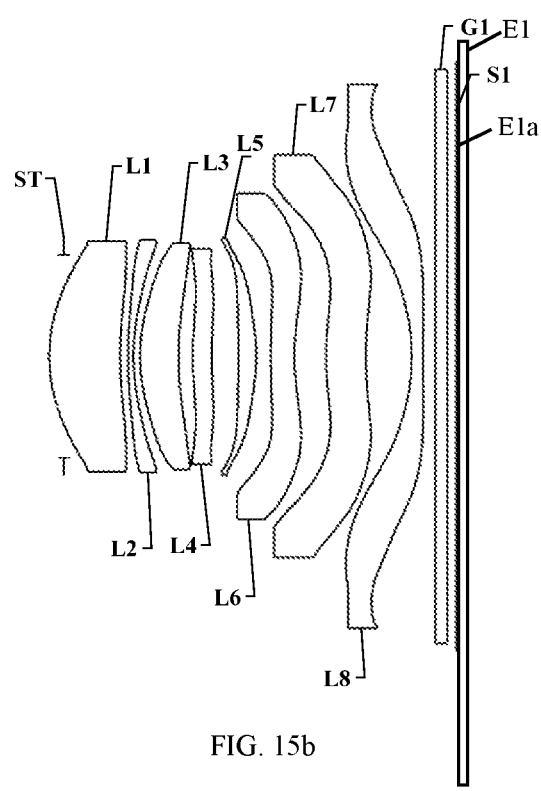
FIG. 15b is a schematic diagram of a structure of a fourth specific camera module in a second imaging mode.

FIG. 15a and FIG. 15b show a fourth specific camera module. FIG. 15a is a schematic diagram of a structure of the camera module in a first imaging mode. FIG. 15b is a schematic diagram of a structure of the camera module in a second imaging mode. A camera lens of the camera module includes eight lenses having focal power, and the eight lenses are sequentially a first lens L1, a second lens L2, a third lens L3, a fourth lens L4, a fifth lens L5, a sixth lens L6, a seventh lens L7, and an eighth lens L8 from an object side. A variable aperture ST may be specifically located on an object side of the first lens L1, and an optical filter G1 may be located on an image side of the eighth lens L8.

In this embodiment of this disclosure, each lens of the camera lens may be an aspheric lens. In other words, the camera lens includes 16 aspheric surfaces in total. Referring to both Table 7a and Table 7b, Table 7a shows a curvature radius, a thickness, a refractive index, and an Abbe number of each lens of the camera lens, and Table 7b shows an aspheric coefficient of each lens.

TABLE 7a

|  | Description | Curvature radius | | Thickness | Refractive index | | Abbe number | |
| --- | --- | --- | --- | --- | --- | --- | --- | --- |
| ST | Variable aperture | Infinite | d0 | −0.270 | — | — | — | — |
| R1 | First | 3.061 | d1 | 1.300 | n1 | 1.55 | v1 | 56.0 |
| R2 | lens | 8.023 | a1 | 0.142 | | | | |
| R3 | Second | 7.722 | d2 | 0.101 | n2 | 1.67 | v2 | 19.2 |
| R4 | lens | 3.921 | a2 | 0.119 | | | | |
| R5 | Third | 3.268 | d3 | 0.704 | n3 | 1.54 | v3 | 56.0 |
| R6 | lens | 5.629 | a3 | 0.263 | | | | |
| R7 | Fourth | 6.043 | d4 | 0.347 | n4 | 1.66 | v4 | 20.4 |
| R8 | lens | 8.019 | a4 | 0.489 | | | | |
| R9 | Fifth | −21.196 | d5 | 0.327 | n5 | 1.54 | v5 | 56.0 |
| R10 | lens | −3.186 | a5 | 0.265 | | | | |
| R11 | Sixth | 41.391 | d6 | 0.432 | n6 | 1.64 | v6 | 23.5 |
| R12 | lens | 4.197 | a6 | 0.581 | | | | |
| R13 | Seventh | 5.292 | d7 | 0.732 | n7 | 1.66 | v7 | 20.4 |
| R14 | lens | 7.825 | a7 | 0.836 | | | | |
| R15 | Eighth | −4.550 | d8 | 0.211 | n8 | 1.54 | v8 | 56.0 |
| R16 | lens | 22.654 | a8 | 0.224 | | | | |
| R17 | Optical | Infinite | d9 | 0.210 | n9 | 1.52 | v9 | 64.2 |
| R18 | filter | Infinite | a9 | 0.170 | | | | |

TABLE 7b

| | Type | K | R | A2 | A3 | A4 | A5 | A6 | A7 |
| --- | --- | --- | --- | --- | --- | --- | --- | --- | --- |
| R1 | Extended aspheric surface | 0.001 | 1.935 | −2.27E−01 | 2.59E+00 | −1.56E+01 | 5.23E+01 | −1.10E+02 | 1.54E+02 |
| R2 | Extended aspheric surface | −0.281 | 1.962 | 7.19E−02 | −3.94E−01 | −6.80E+00 | 5.48E+01 | −2.01E+02 | 4.41E+02 |
| R3 | Extended aspheric surface | −0.891 | 1.971 | 2.04E−01 | −5.76E+00 | 4.01E+01 | −1.66E+02 | 4.55E+02 | −8.64E+02 |
| R4 | Extended aspheric surface | −0.044 | 1.958 | −3.64E−01 | 1.45E+00 | −1.12E+01 | 5.57E+01 | −1.78E+02 | 3.85E+02 |
| R5 | Extended aspheric surface | 0.019 | 2.002 | −9.59E−02 | −6.42E−01 | −6.90E+00 | 8.15E+01 | −3.80E+02 | 1.03E+03 |
| R6 | Extended aspheric surface | 0.155 | 1.960 | −2.25E−01 | −1.14E+00 | 1.69E+01 | −1.14E+02 | 4.89E+02 | −1.42E+03 |
| R7 | Extended aspheric surface | 0.101 | 1.950 | −1.05E+00 | 7.59E+00 | −5.76E+01 | 2.75E+02 | −8.57E+02 | 1.80E+03 |
| R8 | Extended aspheric surface | 1.278 | 1.919 | −5.50E−01 | −3.12E−01 | 6.92E+00 | −3.57E+01 | 1.18E+02 | −2.88E+02 |
| R9 | Extended aspheric surface | 3.518 | 2.155 | 1.52E−01 | 1.55E+00 | −1.70E+01 | 1.18E+02 | −6.17E+02 | 2.11E+03 |
| R10 | Extended aspheric surface | 0.014 | 2.226 | 2.35E+00 | −9.94E+00 | 5.08E+01 | −2.42E+02 | 8.26E+02 | −1.97E+03 |
| R11 | Extended aspheric surface | −81.111 | 2.492 | 1.61E+00 | −7.28E+00 | −2.35E+01 | 3.11E+02 | −1.41E+03 | 3.68E+03 |
| R12 | Extended aspheric surface | −0.108 | 3.120 | −3.22E+00 | 3.73E+00 | −3.27E+01 | 2.73E+02 | −1.48E+03 | 5.01E+03 |
| R13 | Extended aspheric surface | −0.165 | 3.319 | −3.00E+00 | 8.26E+00 | −2.13E+02 | 1.65E+03 | −7.01E+03 | 1.92E+04 |
| R14 | Extended aspheric surface | 0.568 | 3.715 | −1.04E+00 | 2.40E+01 | −5.51E+02 | 4.05E+03 | −1.67E+04 | 4.47E+04 |
| R15 | Extended aspheric surface | −0.978 | 4.723 | −1.17E+01 | 1.69E+02 | −1.43E+03 | 6.95E+03 | −1.99E+04 | 3.37E+04 |

TABLE 7b-continued

| | | | | | | | | |
|---|---|---|---|---|---|---|---|---|
| R16 | Extended aspheric surface | 3.190 | 4.911 | −1.15E+01 | 7.16E+01 | −1.86E+02 | −8.25E+02 | 6.70E+03 | −1.90E+04 |

| | Type | K | R | A8 | A9 | A10 | A11 | A12 | A13 |
|---|---|---|---|---|---|---|---|---|---|
| R1 | Extended aspheric surface | 0.001 | 1.935 | −1.46E+02 | 9.55E+01 | −4.26E+01 | 1.26E+01 | −2.28E+00 | 1.96E−01 |
| R2 | Extended aspheric surface | −0.281 | 1.962 | −6.24E+02 | 5.88E+02 | −3.68E+02 | 1.48E+02 | −3.43E+01 | 3.53E+00 |
| R3 | Extended aspheric surface | −0.891 | 1.971 | 1.16E+03 | −1.09E+03 | 7.03E+02 | −2.96E+02 | 7.31E+01 | −8.02E+00 |
| R4 | Extended aspheric surface | −0.044 | 1.958 | −5.72E+02 | 5.86E+02 | −4.06E+02 | 1.82E+02 | −4.73E+01 | 5.45E+00 |
| R5 | Extended aspheric surface | 0.019 | 2.002 | −1.78E+03 | 2.05E+03 | −1.56E+03 | 7.64E+02 | −2.16E+02 | 2.69E+01 |
| R6 | Extended aspheric surface | 0.155 | 1.960 | 2.78E+03 | −3.67E+03 | 3.21E+03 | −1.78E+03 | 5.70E+02 | −7.98E+01 |
| R7 | Extended aspheric surface | 0.101 | 1.950 | −2.59E+03 | 2.55E+03 | −1.68E+03 | 6.90E+02 | −1.55E+02 | 1.32E+01 |
| R8 | Extended aspheric surface | 1.278 | 1.919 | 5.25E+02 | −6.93E+02 | 6.35E+02 | −3.80E+02 | 1.33E+02 | −2.08E+01 |
| R9 | Extended aspheric surface | 3.518 | 2.155 | −4.68E+03 | 6.81E+03 | −6.48E+03 | 3.91E+03 | −1.36E+03 | 2.08E+02 |
| R10 | Extended aspheric surface | 0.014 | 2.226 | 3.29E+03 | −3.82E+03 | 3.01E+03 | −1.54E+03 | 4.56E+02 | −5.97E+01 |
| R11 | Extended aspheric surface | −81.111 | 2.492 | −6.17E+03 | 6.88E+03 | −5.10E+03 | 2.43E+03 | −6.71E+02 | 8.20E+01 |
| R12 | Extended aspheric surface | −0.108 | 3.120 | −1.09E+04 | 1.53E+04 | −1.39E+04 | 7.99E+03 | −2.62E+03 | 3.75E+02 |
| R13 | Extended aspheric surface | −0.165 | 3.319 | −3.56E+04 | 4.53E+04 | −3.87E+04 | 2.12E+04 | −6.74E+03 | 9.40E+02 |
| R14 | Extended aspheric surface | 0.568 | 3.715 | −8.14E+04 | 1.02E+05 | −8.56E+04 | 4.64E+04 | −1.45E+04 | 2.01E+03 |
| R15 | Extended aspheric surface | −0.978 | 4.723 | −3.07E+04 | 5.10E+03 | 2.00E+04 | −2.24E+04 | 1.03E+04 | −1.85E+03 |
| R16 | Extended aspheric surface | 3.190 | 4.911 | 2.90E+04 | −2.58E+04 | 1.32E+04 | −3.67E+03 | 5.80E+02 | −8.13E+01 |

In the 16 aspheric surfaces of the camera lens shown in Table 7b, surface types z of all the extended aspheric surfaces may be defined by using but not limited to the following aspheric surface formula:

$$z = \frac{cr^2}{1+\sqrt{1-Kc^2r^2}} + A_2r^4 + A_3r^6 + A_4r^8 + A_5r^{10} + A_6r^{12} + A_7r^{14} + A_8r^{16} + A_9r^{18} + A_{10}r^{20} + A_{11}r^{22} + A_{12}r^{24} + A_{13}r^{26}$$

Herein, z represents a rise of an aspheric surface, r represents a normalized radial coordinate of the aspheric surface, r is equal to a result obtained by dividing an actual radial coordinate of the aspheric surface by a normalized radius R, c represents spherical curvature of a vertex of the aspheric surface, K represents a quadric surface constant, and A2, A3, A4, A5, A6, A7, A8, A9, A10, A11, A12, and A13 represent aspheric coefficients.

In this embodiment of this disclosure, the second lens L2 has negative focal power, and a ratio of a focal length f2 of the second lens L2 to a focal length EFL of the camera lens is |f2/EFL|=1.99. The fifth lens L5 has positive focal power, and a ratio of a focal length f5 of the fifth lens to the focal length EFL of the camera lens is |f5/EFL|=1.14. The sixth lens L6 has negative focal power, and a ratio of a focal length f6 of the sixth lens to the focal length EFL of the camera lens is |f6/EFL|=1.22. A ratio of the focal length EFL of the camera lens to a total length (TTL) of the camera lens is |EFL/TTL|=0.802.

With continued reference to FIG. 15a, when the camera module is in the first imaging mode, the camera lens performs imaging in a full area of a photosensitive area, a half-image height Y1 of the camera lens is 5.4 mm, an entrance pupil diameter EPD1 is 3.62 mm, and a quantity F of apertures is 1.65. Referring to FIG. 15b, the camera module is switched to the second imaging mode, the camera lens performs imaging in a partial area of a photosensitive area, a half-image height Y2 of the camera lens is 5.3 mm, an entrance pupil diameter EPD2 is 3.774 mm, and a quantity F of apertures is 1.58. A ratio of EPD1 to EPD2 is |EPD1/EPD2|=0.96, and a ratio of Y1 to Y2 is |Y1/Y2|=1.02. In addition, when a camera module is in the first imaging mode, a ratio of the half-image height Y1 of the camera lens to the total length (TTL) of the camera lens is |Y1/TTL|=0.724, and a ratio of the entrance pupil diameter EPD1 to the total length (TTL) of the camera lens is |EPD1/TTL|=0.486. For each basic parameter of the camera lens, refer to Table 8.

TABLE 8

| | Object distance | Infinite far |
|---|---|---|
| | Focal length EFL (mm) | 5.97 |
| First imaging mode | Value of F | 1.65 |
| | Half-image height Y1 (mm) | 5.40 |
| | Half FOV (°) | 41.917 |
| Second imaging mode | Value of F | 1.58 |
| | Half-image height Y2 (mm) | 5.30 |
| | Half FOV (°) | 41.492 |
| | BFL (mm) | 0.604 |
| | TTL (mm) | 7.45 |
| | Designed wavelength | 650 nm, 610 nm, 555 nm, 510 nm, 470 nm |

The camera module shown in FIG. 15a and FIG. 15b is simulated. A simulation result of the camera module is described in detail below with reference to accompanying drawings.

Figure 16A:
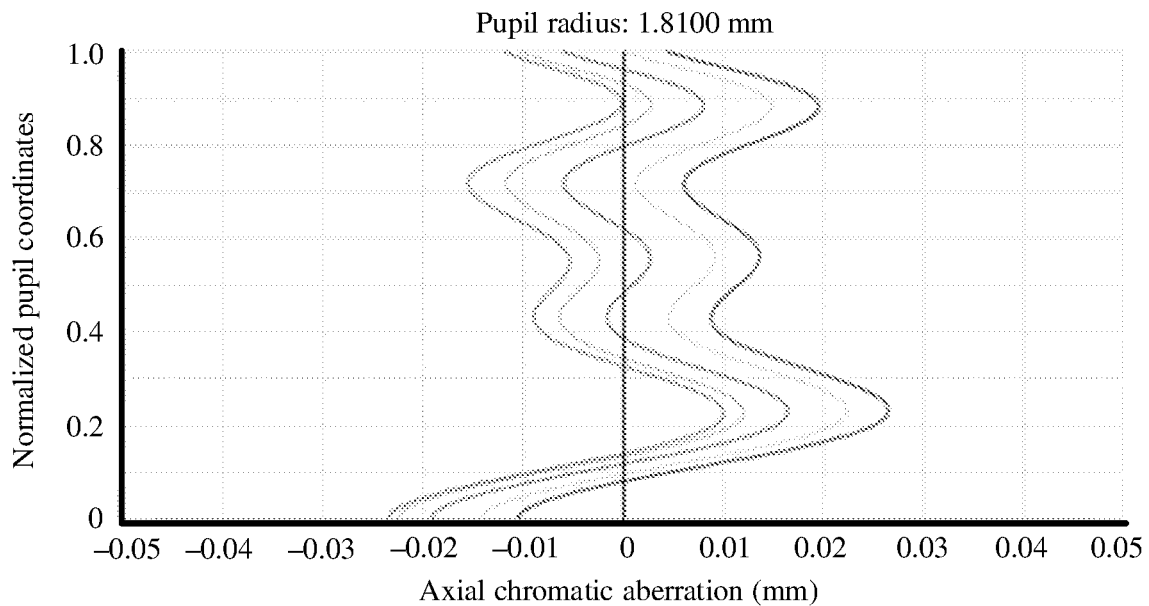

FIG. 16a is a curve diagram of an axial chromatic aberration of a camera module in a first imaging mode. Simulation results of a depth of focus location of colorful light rays on wavelengths of 650 nm, 610 nm, 555 nm, 510 nm, and 470 nm are separately shown in the figure. It can be learned that the axial chromatic aberration of a camera lens in the first imaging mode is controlled to fall within a very small range.

Figure 16B:
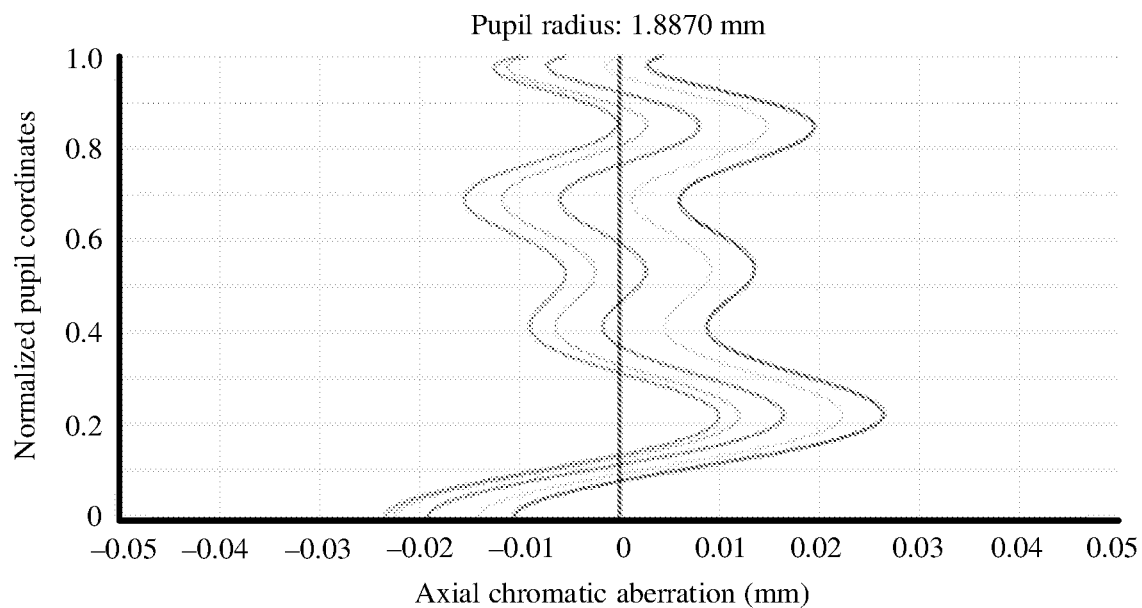
FIG. 16b is a curve diagram of an axial chromatic aberration of a camera module in FIG. 15b.

FIG. 16b is a curve diagram of an axial chromatic aberration of a camera module in a second imaging mode. Simulation results of a depth of focus location of colorful light rays on wavelengths of 650 nm, 610 nm, 555 nm, 510 nm, and 470 nm are separately shown in the figure. It can be learned that the axial chromatic aberration of a camera lens in the second imaging mode is controlled to fall within a very small range.

Figure 17A:
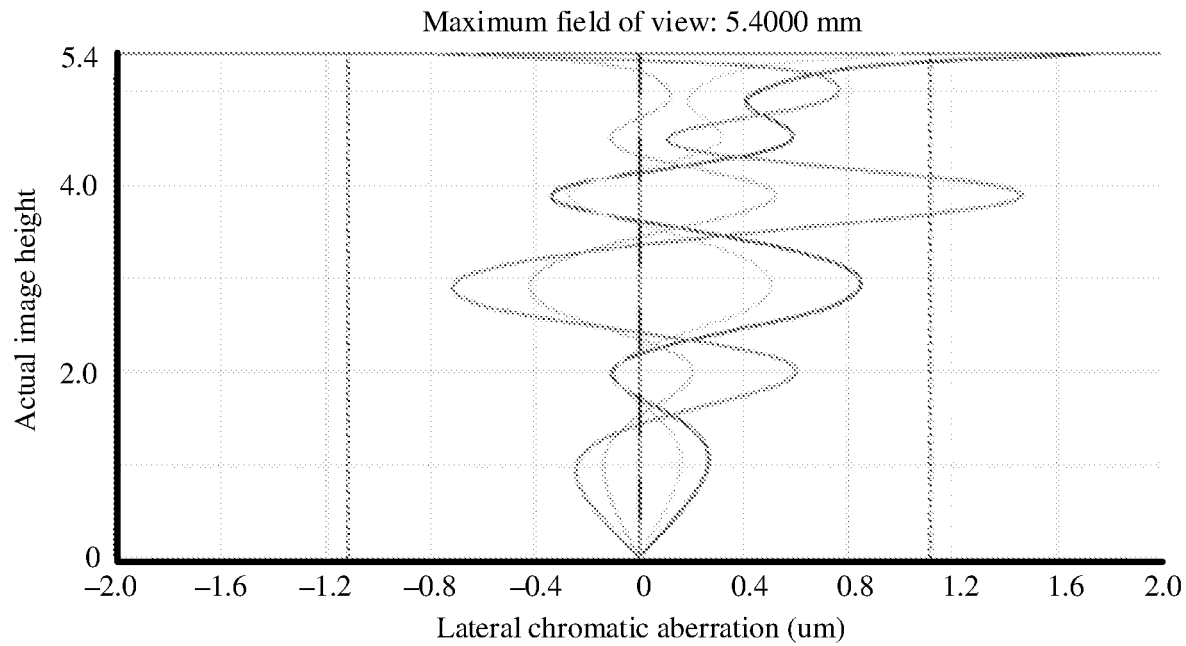

FIG. 17a is a curve diagram of a lateral chromatic aberration of a camera module in a first imaging mode. In the figure, five solid curves are respectively colorful light rays on wavelengths of 650 nm, 610 nm, 555 nm, 510 nm, and 470 nm, and dotted lines indicate that a diffraction limit range is from −1.1 μm to 1.1 μm, and it can be learned that lateral chromatic aberrations of the five light rays basically fall within the diffraction limit range.

Figure 17B:
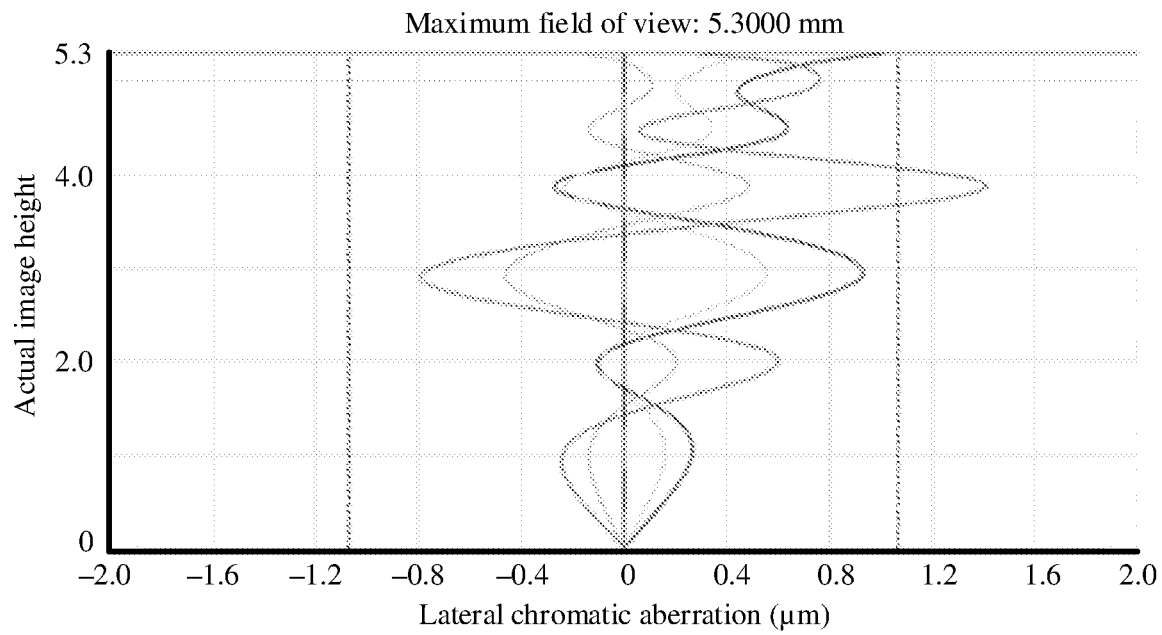
FIG. 17b is a curve diagram of a lateral chromatic aberration of a camera module in FIG. 15b.

FIG. 17b is a curve diagram of a lateral chromatic aberration of a camera module in a second imaging mode. In the figure, five solid curves are respectively colorful light rays on wavelengths of 650 nm, 610 nm, 555 nm, 510 nm, and 470 nm, and dotted lines indicate that a diffraction limit range is from −1.1 μm to 1.1 μm, and it can be learned that lateral chromatic aberrations of the five light rays basically fall within the diffraction limit range.

Figure 18A:
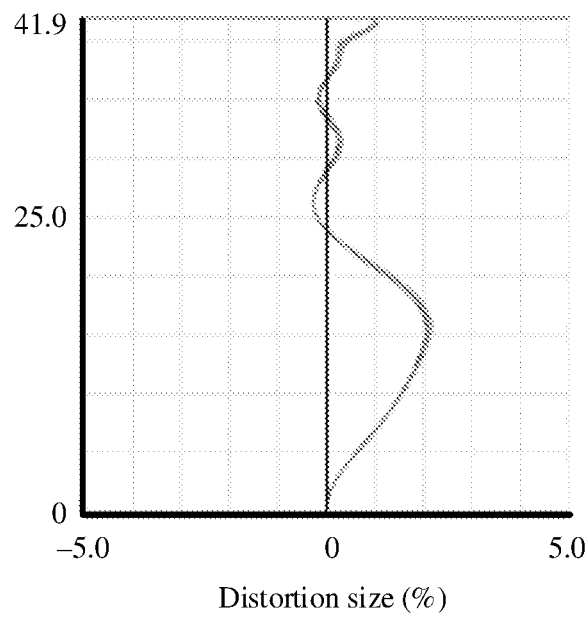

FIG. 18a is a curve diagram of optical distortion of a camera module in a first imaging mode, showing a difference between imaging deformation and an ideal shape. In the figure, five solid curves are respectively colorful light rays on wavelengths of 650 nm, 610 nm, 555 nm, 510 nm, and 470 nm. It can be learned that, in this mode, the optical distortion may be controlled to fall within a range less than 2%.

Figure 18B:
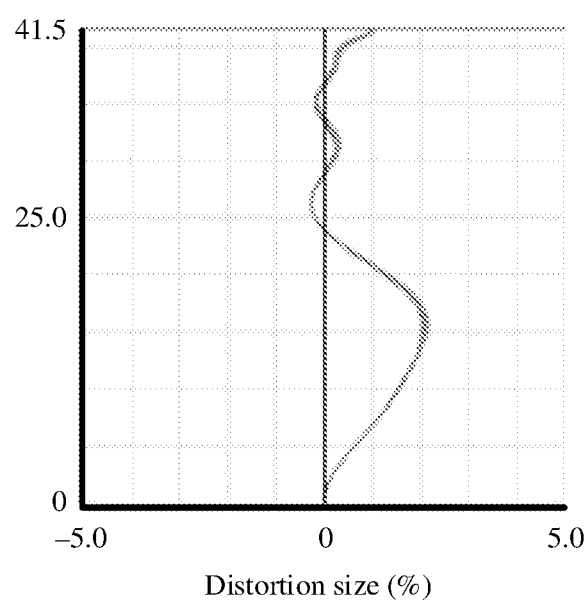
FIG. 18b is a curve diagram of optical distortion of a camera module in FIG. 15b.

FIG. 18b is a curve diagram of optical distortion of a camera module in a second imaging mode, showing a difference between imaging deformation and an ideal shape. In the figure, five solid curves are respectively colorful light rays on wavelengths of 650 nm, 610 nm, 555 nm, 510 nm, and 470 nm. It can be learned that, in this mode, the optical distortion may be controlled to fall within a range less than 2%.

Figure 19A:
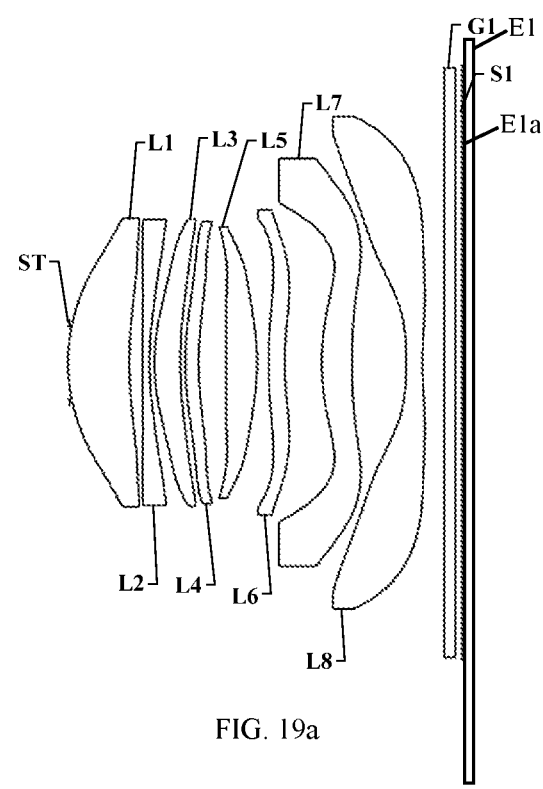
FIG. 19a is a schematic diagram of a structure of a fifth specific camera module in a first imaging mode.
Figure 19B:
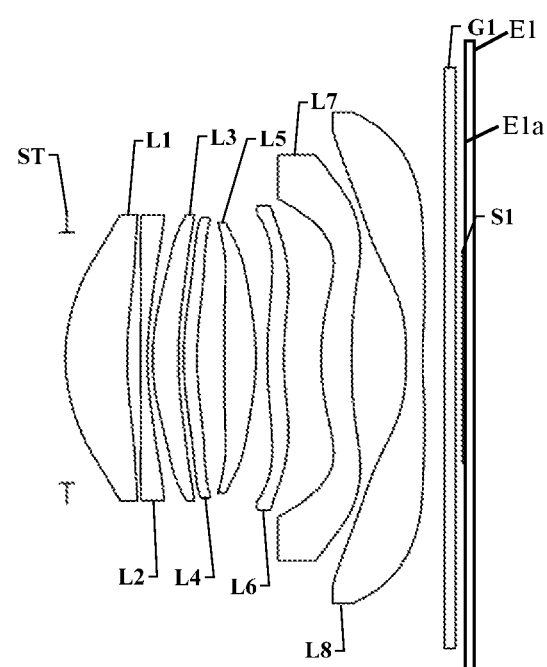
FIG. 19b is a schematic diagram of a structure of a fifth specific camera module in a second imaging mode.

FIG. 19a and FIG. 19b show a fifth specific camera module. FIG. 19a is a schematic diagram of a structure of the camera module in a first imaging mode. FIG. 19b is a schematic diagram of a structure of the camera module in a second imaging mode. A camera lens of the camera module includes eight lenses having focal power, and the eight lenses are sequentially a first lens L1, a second lens L2, a third lens L3, a fourth lens L4, a fifth lens L5, a sixth lens L6, a seventh lens L7, and an eighth lens L8 from an object side. A variable aperture ST may be specifically located on an object side of the first lens L1, and an optical filter G1 may be located on an image side of the eighth lens L8.

In this embodiment of this disclosure, each lens of the camera lens may be an aspheric lens. In other words, the camera lens includes 16 aspheric surfaces in total. Referring to both Table 9a and Table 9b, Table 9a shows a curvature radius, a thickness, a refractive index, and an Abbe number of each lens of the camera lens, and Table 9b shows an aspheric coefficient of each lens.

TABLE 9a

| | Description | Curvature radius | | Thickness | Refractive index | | Abbe number | |
|---|---|---|---|---|---|---|---|---|
| ST | Variable aperture | Infinite | d0 | −0.030 | — | | — | — |
| R1 | First lens | 3.486 | d1 | 1.187 | n1 | 1.55 | v1 | 71.7 |
| R2 | | 8.653 | a1 | 0.249 | | | | |
| R3 | Second | 30.536 | d2 | 0.140 | n2 | 1.68 | v2 | 18.4 |
| R4 | lens | 7.081 | a2 | 0.097 | | | | |
| R5 | Third lens | 4.410 | d3 | 0.498 | n3 | 1.54 | v3 | 56.0 |
| R6 | | 8.620 | a3 | 0.095 | | | | |
| R7 | Fourth lens | 5.355 | d4 | 0.260 | n4 | 1.54 | v4 | 56.0 |
| R8 | | 6.569 | a4 | 0.530 | | | | |
| R9 | Fifth lens | −106.016 | d5 | 0.600 | n5 | 1.51 | v5 | 56.5 |
| R10 | | −4.091 | a5 | 0.222 | | | | |
| R11 | Sixth lens | 15.744 | d6 | 0.311 | n6 | 1.54 | v6 | 55.9 |
| R12 | | 6.822 | a6 | 0.717 | | | | |
| R13 | Seventh | 5.318 | d7 | 0.584 | n7 | 1.54 | v7 | 56.0 |
| R14 | lens | 14.267 | a7 | 1.044 | | | | |
| R15 | Eighth lens | −11.879 | d8 | 0.315 | n8 | 1.54 | v8 | 55.7 |
| R16 | | 6.777 | a8 | 0.425 | | | | |
| R17 | Optical | Infinite | d9 | 0.210 | n9 | 1.52 | v9 | 64.2 |
| R18 | filter | Infinite | a9 | 0.131 | | | | |

TABLE 9b

|  | Type | K | R | A2 | A3 | A4 | A5 | A6 | A7 |
|---|---|---|---|---|---|---|---|---|---|
| R1 | Extended aspheric surface | −0.570 | 2.768 | −7.82E−02 | 1.41E+00 | −5.21E+00 | 1.30E+00 | 4.20E+01 | −1.29E+02 |
| R2 | Extended aspheric surface | −4.692 | 2.758 | 8.25E−02 | −1.03E+00 | −8.49E−01 | 9.63E+00 | −2.47E+01 | 3.53E+01 |
| R3 | Extended aspheric surface | 5.969 | 2.757 | 5.45E−02 | −2.53E+00 | 8.48E+00 | −2.03E+01 | 4.23E+01 | −6.01E+01 |
| R4 | Extended aspheric surface | −0.902 | 2.742 | 9.78E−01 | −1.30E+01 | 5.76E+01 | −1.42E+02 | 2.19E+02 | −2.17E+02 |
| R5 | Extended aspheric surface | −0.521 | 2.767 | 1.33E+00 | −1.55E+01 | 6.93E+01 | −1.90E+02 | 3.18E+02 | −3.20E+02 |
| R6 | Extended aspheric surface | 2.201 | 2.743 | −4.72E−01 | 5.67E+00 | −3.16E+01 | 8.64E+01 | −1.40E+02 | 1.41E+02 |
| R7 | Extended aspheric surface | 0.217 | 2.714 | −9.33E−01 | 1.19E+00 | −4.64E+00 | 2.54E+01 | −9.25E+01 | 1.93E+02 |
| R8 | Extended aspheric surface | 1.162 | 2.658 | −7.64E−01 | 3.47E+00 | −2.64E+01 | 1.19E+02 | −3.36E+02 | 5.81E+02 |
| R9 | Extended aspheric surface | −8.809 | 2.615 | 4.18E−01 | −1.78E+00 | 7.11E+00 | −1.32E+00 | −7.28E+01 | 2.09E+02 |
| R10 | Extended aspheric surface | −0.715 | 2.607 | 2.66E+00 | −1.71E+01 | 7.85E+01 | −2.16E+02 | 3.68E+02 | −4.11E+02 |
| R11 | Extended aspheric surface | −21.011 | 2.342 | 1.68E+00 | −1.04E+01 | 2.96E+01 | −4.94E+01 | 5.07E+01 | −3.22E+01 |
| R12 | Extended aspheric surface | 0.739 | 2.321 | 5.53E−01 | −6.20E+00 | 1.56E+01 | −2.21E+01 | 1.99E+01 | −1.17E+01 |
| R13 | Extended aspheric surface | −4.045 | 1.996 | 2.49E−01 | −4.82E−01 | 1.59E−01 | −7.79E−02 | 6.46E−02 | −3.01E−02 |
| R14 | Extended aspheric surface | 7.103 | 1.923 | 6.77E−02 | 3.05E−01 | −8.73E−01 | 8.99E−01 | −5.32E−01 | 2.01E−01 |
| R15 | Extended aspheric surface | −0.591 | 1.847 | −9.79E−01 | 1.08E+00 | −5.51E−01 | 1.50E−01 | −1.78E−02 | −1.55E−03 |
| R16 | Extended aspheric surface | −10.599 | 1.891 | −4.74E−01 | 4.37E−01 | −2.10E−01 | 5.80E−02 | −9.78E−03 | 1.02E−03 |

|  | Type | K | R | A8 | A9 | A10 | A11 | A12 | A13 |
|---|---|---|---|---|---|---|---|---|---|
| R1 | Extended aspheric surface | −0.570 | 2.768 | 1.78E+02 | −1.29E+02 | 4.84E+01 | −7.34E+00 | 0.00E+00 | 0.00E+00 |
| R2 | Extended aspheric surface | −4.692 | 2.758 | −2.88E+01 | 1.23E+01 | −2.13E+00 | 0.00E+00 | 0.00E+00 | 0.00E+00 |
| R3 | Extended aspheric surface | 5.969 | 2.757 | 4.97E+01 | −2.14E+01 | 3.73E+00 | 0.00E+00 | 0.00E+00 | 0.00E+00 |
| R4 | Extended aspheric surface | −0.902 | 2.742 | 1.36E+02 | −4.86E+01 | 7.55E+00 | 0.00E+00 | 0.00E+00 | 0.00E+00 |
| R5 | Extended aspheric surface | −0.521 | 2.767 | 1.86E+02 | −5.63E+01 | 6.65E+00 | 0.00E+00 | 0.00E+00 | 0.00E+00 |
| R6 | Extended aspheric surface | 2.201 | 2.743 | −8.63E+01 | 2.77E+01 | −3.22E+00 | 0.00E+00 | 0.00E+00 | 0.00E+00 |
| R7 | Extended aspheric surface | 0.217 | 2.714 | −2.23E+02 | 1.33E+02 | −3.21E+01 | 0.00E+00 | 0.00E+00 | 0.00E+00 |
| R8 | Extended aspheric surface | 1.162 | 2.658 | −5.88E+02 | 3.18E+02 | −7.07E+01 | 0.00E+00 | 0.00E+00 | 0.00E+00 |
| R9 | Extended aspheric surface | −8.809 | 2.615 | −2.70E+02 | 1.86E+02 | −6.71E+01 | 9.97E+00 | 0.00E+00 | 0.00E+00 |
| R10 | Extended aspheric surface | −0.715 | 2.607 | 3.13E+02 | −1.63E+02 | 5.61E+01 | −1.14E+01 | 1.04E+00 | 0.00E+00 |
| R11 | Extended aspheric surface | −21.011 | 2.342 | 1.22E+01 | −2.29E+00 | 1.08E−02 | 7.06E−02 | −8.45E−03 | 0.00E+00 |
| R12 | Extended aspheric surface | 0.739 | 2.321 | 4.58E+00 | −1.18E+00 | 1.91E−01 | −1.77E−02 | 7.17E−04 | 0.00E+00 |
| R13 | Extended aspheric surface | −4.045 | 1.996 | 7.55E−03 | −1.05E−03 | 7.52E−05 | −1.92E−06 | −2.44E−08 | 0.00E+00 |
| R14 | Extended aspheric surface | 7.103 | 1.923 | −5.07E−02 | 8.59E−03 | −9.65E−04 | 6.90E−05 | −2.84E−06 | 5.12E−08 |
| R15 | Extended aspheric surface | −0.591 | 1.847 | 9.25E−04 | −1.58E−04 | 1.48E−05 | −8.22E−07 | 2.52E−08 | −3.29E−10 |
| R16 | Extended aspheric surface | −10.599 | 1.891 | −6.36E−05 | 2.27E−06 | −3.93E−08 | 1.97E−10 | 0.00E+00 | 0.00E+00 |

In the 16 aspheric surfaces of the camera lens shown in Table 9b, surface types z of all the extended aspheric surfaces may be defined by using but not limited to the following aspheric surface formula:

$$z = \frac{cr^2}{1+\sqrt{1-Kc^2r^2}} + A_2r^4 + A_3r^6 + A_4r^8 + A_5r^{10} + A_6r^{12} +$$
$$A_7r^{14} + A_8r^{16} + A_9r^{18} + A_{10}r^{20} + A_{11}r^{22} + A_{12}r^{24} + A_{13}r^{26}$$

Herein, z represents a rise of an aspheric surface, r represents a normalized radial coordinate of the aspheric surface, r is equal to a result obtained by dividing an actual radial coordinate of the aspheric surface by a normalized radius R, c represents spherical curvature of a vertex of the aspheric surface, K represents a quadric surface constant, and A2, A3, A4, A5, A6, A7, A8, A9, A10, A11, A12, and A13 represent aspheric coefficients.

In this embodiment of this disclosure, the second lens L2 has negative focal power, and a ratio of a focal length f2 of the second lens L2 to a focal length EFL of the camera lens is |f2/EFL|=2.42. The fifth lens L5 has positive focal power, and a ratio of a focal length f5 of the fifth lens to the focal length EFL of the camera lens is |f5/EFL|=1.49. The sixth lens L6 has negative focal power, and a ratio of a focal length f6 of the sixth lens to the focal length EFL of the camera lens is |f6/EFL|=4.01. A ratio of the focal length EFL of the camera lens to a total length (TTL) of the camera lens is |EFL/TTL|=0.731.

With continued reference to FIG. 18a, when the camera module is in the first imaging mode, the camera lens performs imaging in a full area of a photosensitive area, a half-image height Y1 of the camera lens is 5.8 mm, an entrance pupil diameter EPD1 is 1.4 mm, and a quantity F of apertures is 3.97. Referring to FIG. 18b, when the camera module is switched to the second imaging mode, the camera lens performs imaging in a partial area of a photosensitive area, a half-image height Y2 of the camera lens is 1.95 mm, an entrance pupil diameter EPD2 is 4.84 mm, and a quantity F of apertures is 1.14. A ratio of EPD1 to EPD2 is |EPD1/EPD2|=0.289, and a ratio of Y1 to Y2 is |Y1/Y2|=2.97. In addition, when a camera module is in the first imaging mode, a ratio of the half-image height Y1 of the camera lens to the total length (TTL) of the camera lens is |Y1/TTL|=0.762, and a ratio of the entrance pupil diameter EPD1 to the total length (TTL) of the camera lens is |EPD1/TTL|=0.184. For each basic parameter of the camera lens, refer to Table 10.

TABLE 10

| | Object distance | Infinite far |
|---|---|---|
| | Focal length EFL (mm) | 5.57 |
| First imaging mode | Value of F | 3.97 |
| | Half-image height Y1 (mm) | 5.80 |
| | Half FOV (°) | 45.34 |
| Second imaging mode | Value of F | 1.14 |
| | Half-image height Y2 (mm) | 1.95 |
| | Half FOV (°) | 18.78 |
| | BFL (mm) | 0.766 |
| | TTL (mm) | 7.62 |
| | Designed wavelength | 650 nm, 610 nm, 555 nm, 510 nm, 470 nm |

The camera module shown in FIG. 19a and FIG. 19b is simulated. A simulation result of the camera module is described in detail below with reference to accompanying drawings.

Figure 20A:
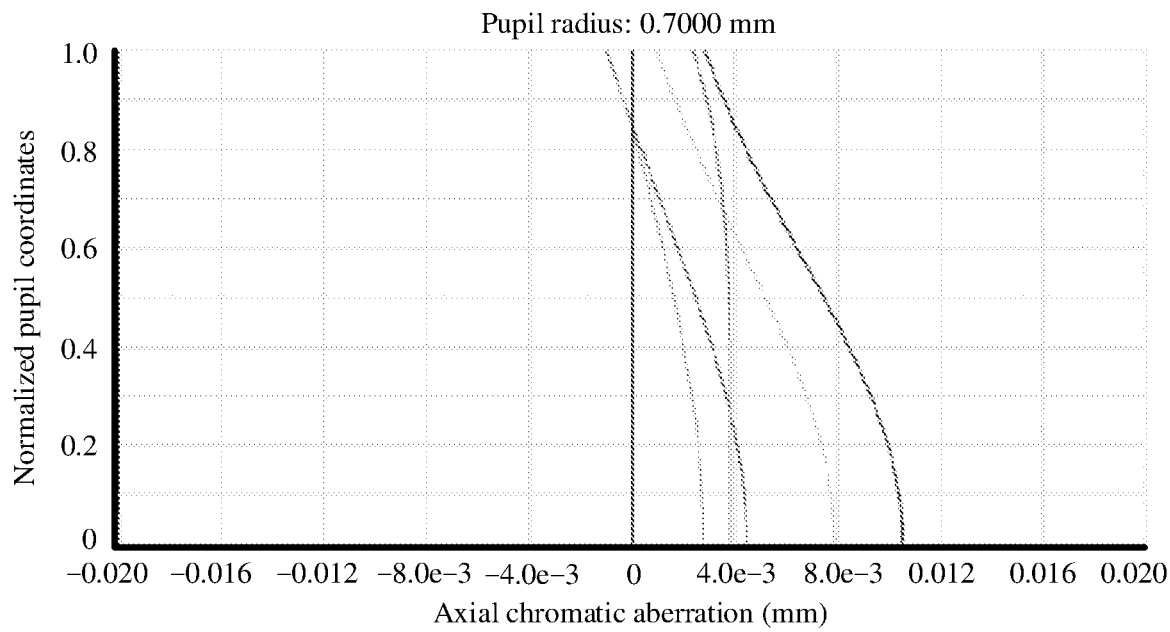

FIG. 20a is a curve diagram of an axial chromatic aberration of a camera module in a first imaging mode. Simulation results of a depth of focus location of colorful light rays on wavelengths of 650 nm, 610 nm, 555 nm, 510 nm, and 470 nm are separately shown in the figure. It can be learned that the axial chromatic aberration of a camera lens in the first imaging mode is controlled to fall within a very small range.

Figure 20B:
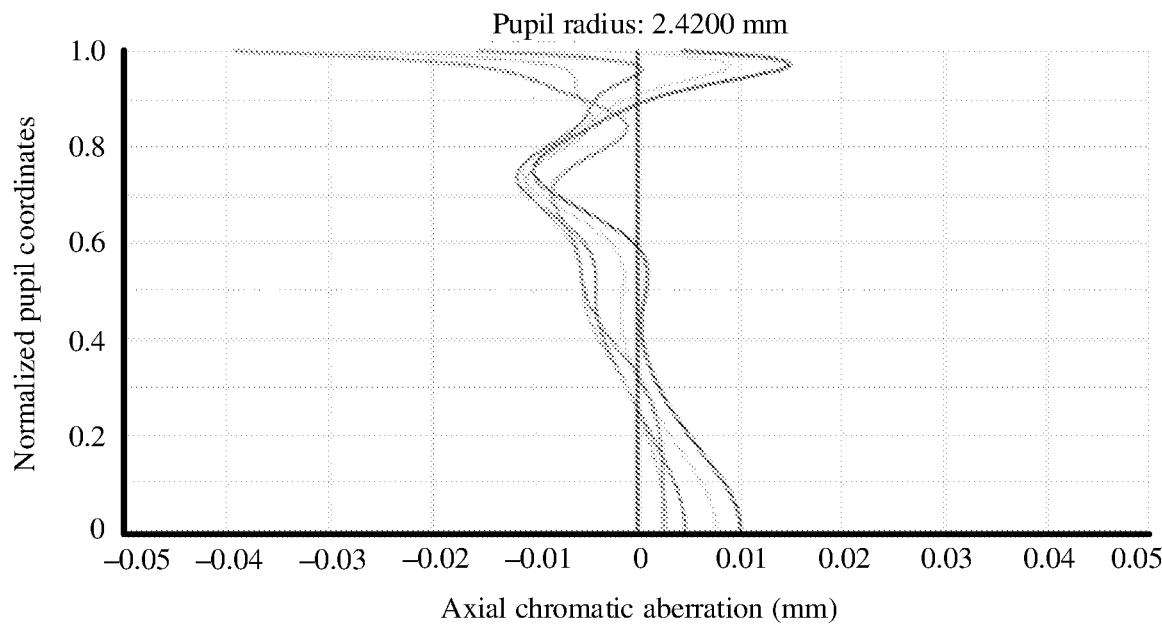
FIG. 20b is a curve diagram of an axial chromatic aberration of a camera module in FIG. 19b.

FIG. 20b is a curve diagram of an axial chromatic aberration of a camera module in a second imaging mode. Simulation results of a depth of focus location of colorful light rays on wavelengths of 650 nm, 610 nm, 555 nm, 510 nm, and 470 nm are separately shown in the figure. It can be learned that the axial chromatic aberration of a camera lens in the second imaging mode is controlled to fall within a very small range.

Figure 21A:
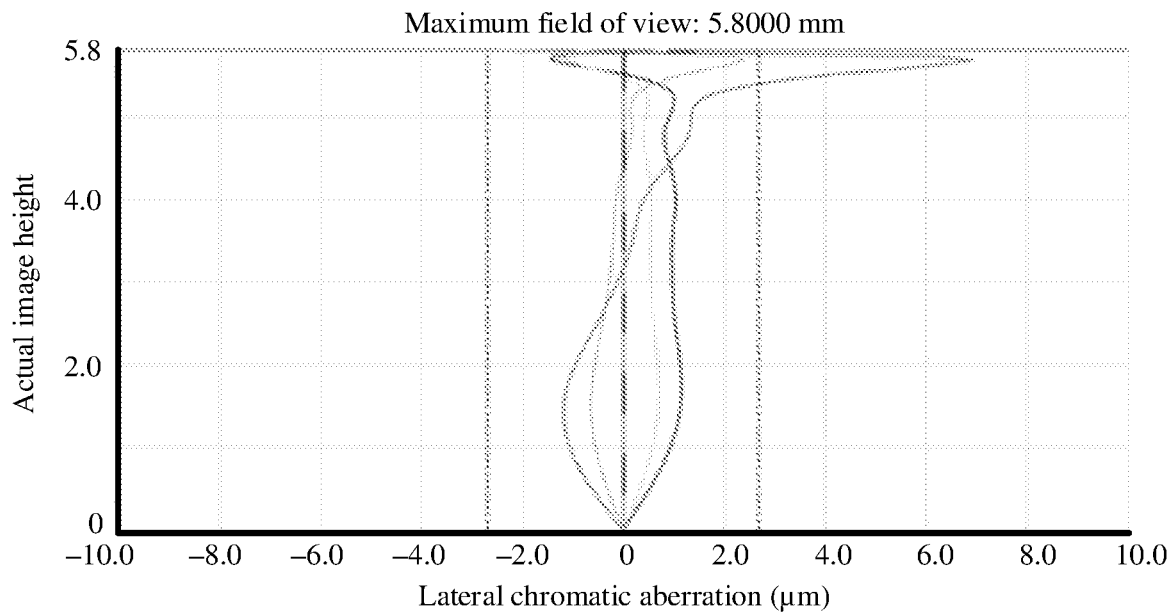

FIG. 21a is a curve diagram of a lateral chromatic aberration of a camera module in a first imaging mode. In the figure, five solid curves are respectively colorful light rays on wavelengths of 650 nm, 610 nm, 555 nm, 510 nm, and 470 nm, and dotted lines indicate that a diffraction limit range is from −2.7 μm to 2.7 μm, and it can be learned that lateral chromatic aberrations of the five light rays basically fall within the diffraction limit range.

Figure 21B:
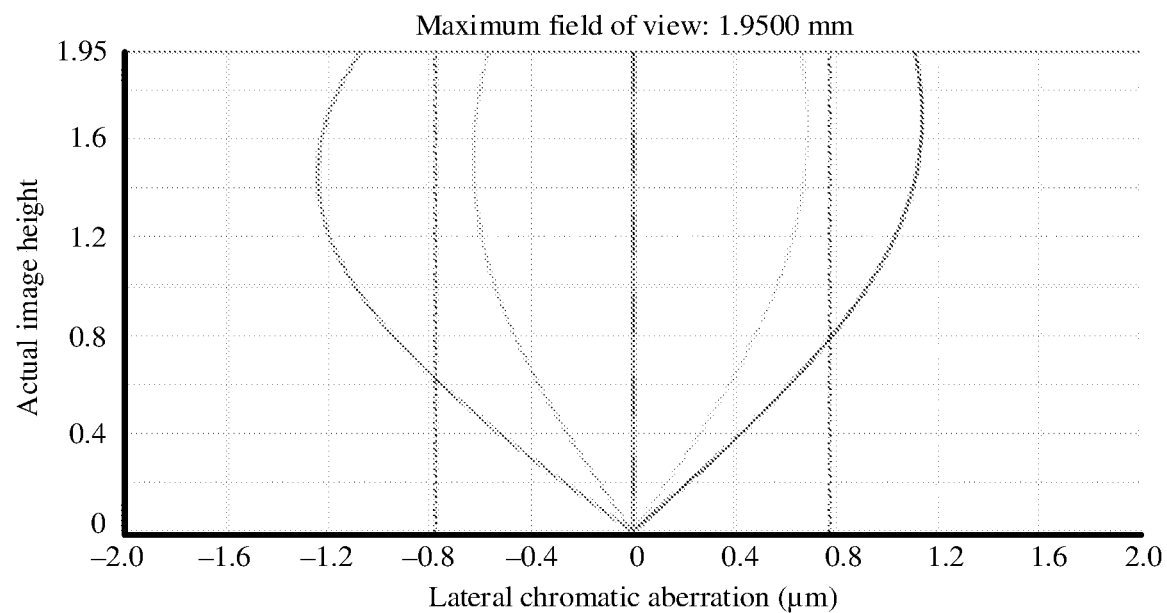
FIG. 21b is a curve diagram of a lateral chromatic aberration of a camera module in FIG. 19b.

FIG. 21b is a curve diagram of a lateral chromatic aberration of a camera module in a second imaging mode. In the figure, five solid curves are respectively colorful light rays on wavelengths of 650 nm, 610 nm, 555 nm, 510 nm, and 470 nm, and dotted lines indicate that a diffraction limit range is from −0.78 μm to 0.78 μm, and it can be learned that lateral chromatic aberrations of the five light rays basically fall within the diffraction limit range.

Figure 22A:
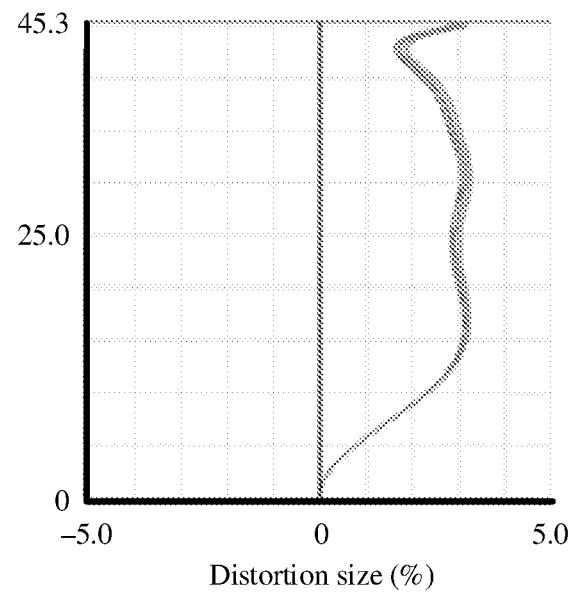

FIG. 22a is a curve diagram of optical distortion of a camera module in a first imaging mode, showing a difference between imaging deformation and an ideal shape. In the figure, five solid curves are respectively colorful light rays on wavelengths of 650 nm, 610 nm, 555 nm, 510 nm, and 470 nm. It can be learned that, in this mode, the optical distortion may be controlled to fall within a range less than 3%.

Figure 22B:
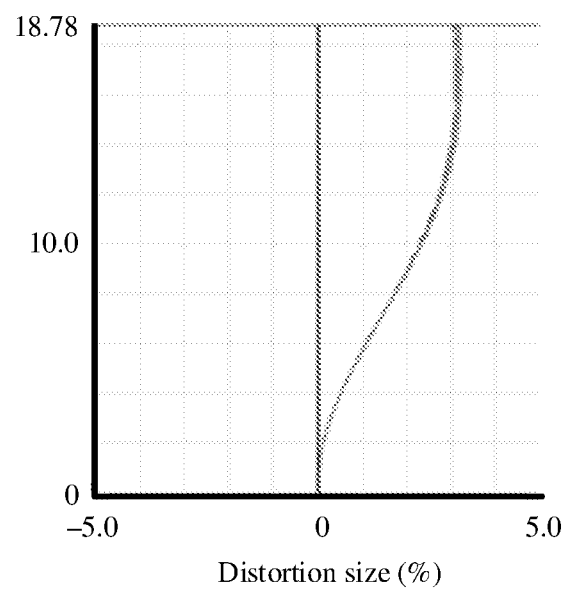
FIG. 22b is a curve diagram of optical distortion of a camera module in FIG. 19b.

FIG. 22b is a curve diagram of optical distortion of a camera module in a second imaging mode, showing a difference between imaging deformation and an ideal shape. In the figure, five solid curves are respectively colorful light rays on wavelengths of 650 nm, 610 nm, 555 nm, 510 nm, and 470 nm. It can be learned that, in this mode, the optical distortion may be controlled to fall within a range less than 2%.

Figure 23A:
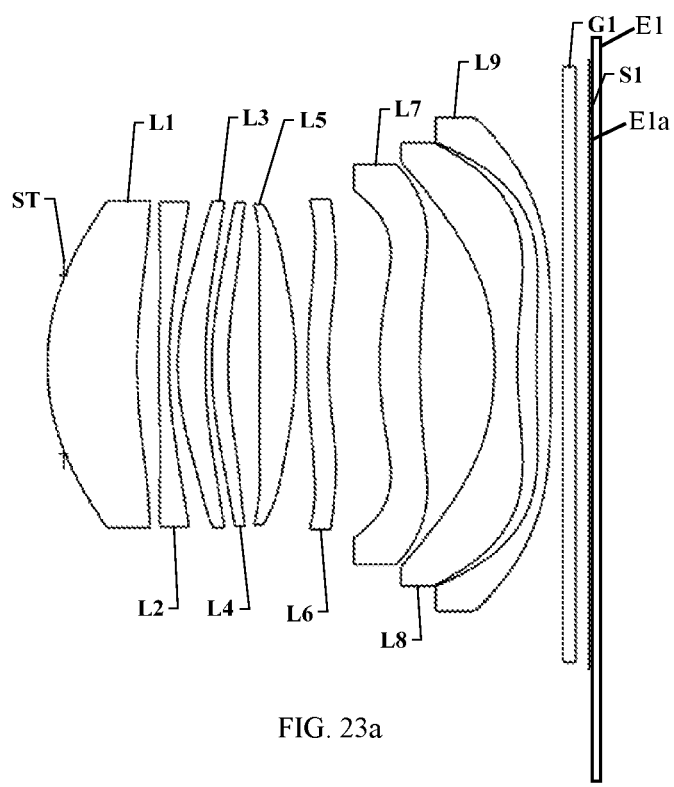
FIG. 23a is a schematic diagram of a structure of a sixth specific camera module in a first imaging mode.
Figure 23B:
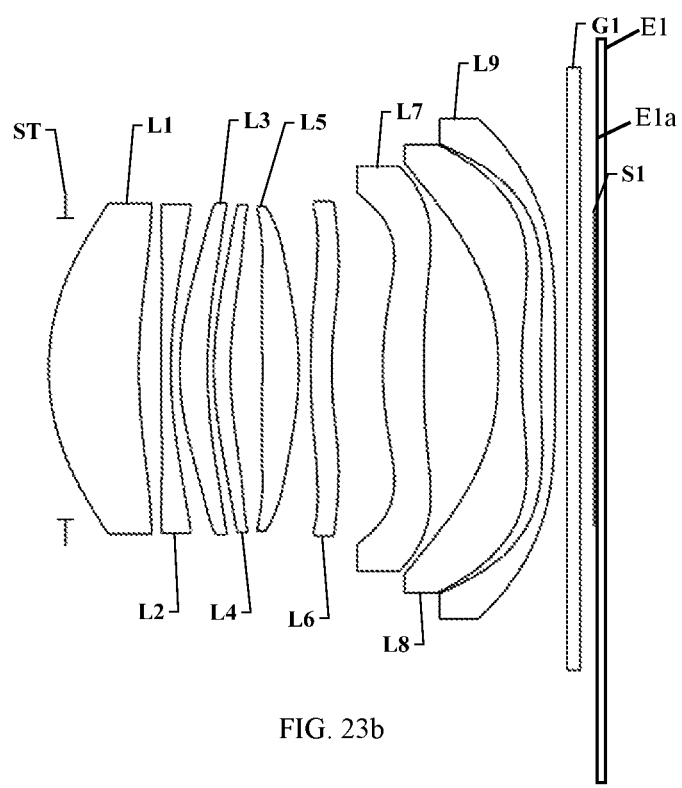
FIG. 23b is a schematic diagram of a structure of a sixth specific camera module in a second imaging mode.

FIG. 23a and FIG. 23b show a sixth specific camera module. FIG. 23a is a schematic diagram of a structure of the camera module in a first imaging mode. FIG. 23b is a schematic diagram of a structure of the camera module in a second imaging mode. A camera lens of the camera module includes nine lenses having focal power, and the nine lenses are sequentially a first lens L1, a second lens L2, a third lens L3, a fourth lens L4, a fifth lens L5, a sixth lens L6, a seventh lens L7, an eighth lens L8, and a ninth lens L9 from an object side. A variable aperture ST may be specifically located on an object side of the first lens L1, and an optical filter G1 may be located on an image side of the ninth lens L9.

In this embodiment of this disclosure, each lens of the camera lens may be an aspheric lens. In other words, the camera lens includes 18 aspheric surfaces in total. Referring to both Table 11a and Table 11b, Table 11a shows a curvature radius, a thickness, a refractive index, and an Abbe number of each lens of the camera lens, and Table 11b shows an aspheric coefficient of each lens.

TABLE 11a

|  | Description | Curvature radius | Thickness |  | Refractive index |  | Abbe number |  |
|---|---|---|---|---|---|---|---|---|
| ST | Variable aperture | Infinite | d0 | −0.271 | — | — | — | — |
| R1 | First lens | 3.931 | d1 | 1.482 | n1 | 1.55 | v1 | 71.7 |
| R2 |  | 9.659 | a1 | 0.362 |  |  |  |  |
| R3 | Second lens | 32.946 | d2 | 0.165 | n2 | 1.68 | v2 | 18.4 |
| R4 |  | 7.817 | a2 | 0.145 |  |  |  |  |
| R5 | Third lens | 4.828 | d3 | 0.458 | n3 | 1.54 | v3 | 56.0 |
| R6 |  | 8.952 | a3 | 0.105 |  |  |  |  |
| R7 | Fourth lens | 5.581 | d4 | 0.273 | n4 | 1.54 | v4 | 56.0 |
| R8 |  | 6.705 | a4 | 0.522 |  |  |  |  |
| R9 | Fifth lens | −60.009 | d5 | 0.602 | n5 | 1.51 | v5 | 56.5 |
| R10 |  | −4.598 | a5 | 0.196 |  |  |  |  |
| R11 | Sixth lens | 18.315 | d6 | 0.345 | n6 | 1.54 | v6 | 55.9 |
| R12 |  | 7.508 | a6 | 0.841 |  |  |  |  |
| R13 | Seventh lens | 6.413 | d7 | 0.671 | n7 | 1.54 | v7 | 56.0 |
| R14 |  | 16.211 | a7 | 1.230 |  |  |  |  |
| R15 | Eighth lens | −5.879 | d8 | 0.380 | n8 | 1.54 | v8 | 55.7 |
| R16 |  | 7.438 | a8 | 0.314 |  |  |  |  |
| R17 | Ninth lens | 17.424 | d9 | 0.237 | n9 | 1.50 | v9 | 81.6 |
| R18 |  | 192.884 | a9 | 0.200 |  |  |  |  |
| R19 | Optical filter | Infinite | d10 | 0.210 | n10 | 1.52 | v9 | 64.2 |
| R20 |  | Infinite | a10 | 0.234 |  |  |  |  |

TABLE 11b

|  | Type | K | R | A2 | A3 | A4 | A5 | A6 | A7 |
|---|---|---|---|---|---|---|---|---|---|
| R1 | Extended aspheric surface | −0.581 | 2.748 | 1.32E−01 | −5.92E−01 | 2.19E+00 | −6.38E+00 | 1.32E+01 | −1.81E+01 |
| R2 | Extended aspheric surface | −4.538 | 2.733 | 1.02E−01 | −6.96E−01 | 3.22E−01 | 1.35E+00 | −3.23E+00 | 3.60E+00 |
| R3 | Extended aspheric surface | 12.979 | 2.733 | 4.83E−02 | −1.26E+00 | 2.85E+00 | −4.17E+00 | 5.67E+00 | −5.79E+00 |
| R4 | Extended aspheric surface | −1.343 | 2.726 | 6.00E−01 | −5.73E+00 | 1.88E+01 | −3.47E+01 | 4.00E+01 | −2.96E+01 |
| R5 | Extended aspheric surface | −0.456 | 2.754 | 7.36E−01 | −5.74E+00 | 1.60E+01 | −2.69E+01 | 2.68E+01 | −1.44E+01 |
| R6 | Extended aspheric surface | 1.659 | 2.734 | −2.64E−01 | 2.13E+00 | −7.60E+00 | 1.14E+01 | −7.38E+00 | −8.99E−02 |
| R7 | Extended aspheric surface | 0.378 | 2.725 | −8.17E−01 | 2.36E+00 | −7.45E+00 | 1.73E+01 | −3.06E+01 | 3.78E+01 |
| R8 | Extended aspheric surface | 0.923 | 2.706 | −3.64E−01 | 2.30E−02 | −2.73E−01 | 1.26E+00 | −6.10E+00 | 1.43E+01 |
| R9 | Extended aspheric surface | 18.388 | 2.694 | 3.05E−01 | −1.71E+00 | 7.07E+00 | −1.11E+01 | −1.97E+00 | 2.52E+01 |
| R10 | Extended aspheric surface | −0.691 | 2.698 | 1.94E+00 | −1.03E+01 | 3.87E+01 | −8.53E+01 | 1.14E+02 | −9.91E+01 |
| R11 | Extended aspheric surface | −15.925 | 2.692 | 1.92E+00 | −1.12E+01 | 2.94E+01 | −4.46E+01 | 3.98E+01 | −2.00E+01 |
| R12 | Extended aspheric surface | 3.240 | 2.781 | 7.68E−01 | −9.45E+00 | 2.56E+01 | −3.83E+01 | 3.60E+01 | −2.22E+01 |
| R13 | Extended aspheric surface | −6.918 | 2.917 | 6.39E−01 | −3.29E+00 | 3.01E+00 | −2.59E+00 | 2.19E+00 | −1.29E+00 |
| R14 | Extended aspheric surface | −1.909 | 3.361 | 1.21E−01 | 3.45E+00 | −2.35E+01 | 5.38E+01 | −7.09E+01 | 5.99E+01 |
| R15 | Extended aspheric surface | −4.730 | 3.401 | −3.33E+00 | 8.98E+00 | −1.82E+01 | 2.58E+01 | −2.44E+01 | 1.54E+01 |
| R16 | Extended aspheric surface | −15.400 | 3.728 | −1.96E+00 | 1.07E+00 | −3.41E+00 | 4.13E+00 | −2.57E+00 | 9.43E−01 |
| R17 | Extended aspheric surface | 0.000 | 3.735 | −1.48E+00 | −4.82E−01 | −1.50E−01 | 5.64E−03 | 2.07E−02 | 1.14E−02 |
| R18 | Extended aspheric surface | 0.000 | 4.146 | −1.81E+00 | 5.13E−01 | 9.15E−02 | −2.23E−02 | −6.23E−02 | 5.68E−02 |

|  | Type | K | R | A8 | A9 | A10 | A11 | A12 | A13 |
|---|---|---|---|---|---|---|---|---|---|
| R1 | Extended aspheric surface | −0.581 | 2.748 | 1.53E+01 | −7.52E+00 | 1.97E+00 | −2.13E−01 | 0.00E+00 | 0.00E+00 |
| R2 | Extended aspheric surface | −4.538 | 2.733 | −2.20E+00 | 6.93E−01 | −8.78E−02 | 0.00E+00 | 0.00E+00 | 0.00E+00 |
| R3 | Extended aspheric surface | 12.979 | 2.733 | 3.53E+00 | −1.12E+00 | 1.44E−01 | 0.00E+00 | 0.00E+00 | 0.00E+00 |
| R4 | Extended aspheric surface | −1.343 | 2.726 | 1.37E+01 | −3.61E+00 | 4.09E−01 | 0.00E+00 | 0.00E+00 | 0.00E+00 |

TABLE 11b-continued

| | | | | | | | | | |
|---|---|---|---|---|---|---|---|---|---|
| R5 | Extended aspheric surface | −0.456 | 2.754 | 3.09E+00 | 3.14E−01 | −1.74E−01 | 0.00E+00 | 0.00E+00 | 0.00E+00 |
| R6 | Extended aspheric surface | 1.659 | 2.734 | 3.08E+00 | −1.77E+00 | 3.37E−01 | 0.00E+00 | 0.00E+00 | 0.00E+00 |
| R7 | Extended aspheric surface | 0.378 | 2.725 | −2.90E+01 | 1.21E+01 | −2.09E+00 | 0.00E+00 | 0.00E+00 | 0.00E+00 |
| R8 | Extended aspheric surface | 0.923 | 2.706 | −1.56E+01 | 7.96E+00 | −1.56E+00 | 0.00E+00 | 0.00E+00 | 0.00E+00 |
| R9 | Extended aspheric surface | 18.388 | 2.694 | −3.16E+01 | 1.86E+01 | −5.50E+00 | 6.62E−01 | 0.00E+00 | 0.00E+00 |
| R10 | Extended aspheric surface | −0.691 | 2.698 | 5.76E+01 | −2.25E+01 | 5.75E+00 | −8.68E−01 | 5.89E−02 | 0.00E+00 |
| R11 | Extended aspheric surface | −15.925 | 2.692 | 4.18E+00 | 9.05E−01 | −7.53E−01 | 1.70E−01 | −1.38E−02 | 0.00E+00 |
| R12 | Extended aspheric surface | 3.240 | 2.781 | 9.04E+00 | −2.43E+00 | 4.12E−01 | −4.01E−02 | 1.70E−03 | 0.00E+00 |
| R13 | Extended aspheric surface | −6.918 | 2.917 | 4.73E−01 | −1.05E−01 | 1.31E−02 | −7.94E−04 | 1.34E−05 | 0.00E+00 |
| R14 | Extended aspheric surface | −1.909 | 3.361 | −3.38E+01 | 1.28E+01 | −3.22E+00 | 5.16E−01 | −4.76E−02 | 1.92E−03 |
| R15 | Extended aspheric surface | −4.730 | 3.401 | −6.56E+00 | 1.90E+00 | −3.66E−01 | 4.53E−02 | −3.25E−03 | 1.03E−04 |
| R16 | Extended aspheric surface | −15.400 | 3.728 | −2.10E−01 | 2.79E−02 | −2.00E−03 | 5.86E−05 | 0.00E+00 | 0.00E+00 |
| R17 | Extended aspheric surface | 0.000 | 3.735 | 9.21E−03 | 0.00E+00 | 0.00E+00 | 0.00E+00 | 0.00E+00 | 0.00E+00 |
| R18 | Extended aspheric surface | 0.000 | 4.146 | −7.40E−02 | 0.00E+00 | 0.00E+00 | 0.00E+00 | 0.00E+00 | 0.00E+00 |

In the 18 aspheric surfaces of the camera lens shown in Table 11b, surface types z of all the extended aspheric surfaces may be defined by using but not limited to the following aspheric surface formula:

$$z = \frac{cr^2}{1+\sqrt{1-Kc^2r^2}} + A_2 r^4 + A_3 r^6 + A_4 r^8 + A_5 r^{10} + A_6 r^{12} + A_7 r^{14} + A_8 r^{16} + A_9 r^{18} + A_{10} r^{20} + A_{11} r^{22} + A_{12} r^{24} + A_{13} r^{26}$$

Herein, z represents a rise of an aspheric surface, r represents a normalized radial coordinate of the aspheric surface, r is equal to a result obtained by dividing an actual radial coordinate of the aspheric surface by a normalized radius R, c represents spherical curvature of a vertex of the aspheric surface, K represents a quadric surface constant, and $A_2$, $A_3$, $A_4$, $A_5$, $A_6$, $A_7$, $A_8$, $A_9$, $A_{10}$, $A_{11}$, $A_{12}$, and $A_{13}$ represent aspheric coefficients.

In this embodiment of this disclosure, the second lens L2 has negative focal power, and a ratio of a focal length f2 of the second lens L2 to a focal length EFL of the camera lens is |f2/EFL|=2.11. The fifth lens L5 has positive focal power, and a ratio of a focal length f5 of the fifth lens to the focal length EFL of the camera lens is |f5/EFL|=1.37. The sixth lens L6 has negative focal power, and a ratio of a focal length f6 of the sixth lens to the focal length EFL of the camera lens is |f6/EFL|=3.33. A ratio of the focal length EFL of the camera lens to a total length (TTL) of the camera lens is |EFL/TTL|=0.788.

With continued reference to FIG. 23a, when the camera module is in the first imaging mode, the camera lens performs imaging in a full area of a photosensitive area, a half-image height Y1 of the camera lens is 5.1 mm, an entrance pupil diameter EPD1 is 3.0 mm, and a quantity F of apertures is 2.36. Referring to FIG. 23b, when the camera module is switched to the second imaging mode, the camera lens performs imaging in a partial area of a photosensitive area, a half-image height Y2 of the camera lens is 2.5 mm, an entrance pupil diameter EPD2 is 5.0 mm, and a quantity F of apertures is 1.42. A ratio of EPD1 to EPD2 is |EPD1/EPD2|=0.6, and a ratio of Y1 to Y2 is |Y1/Y2|=2.04. In addition, when a camera module is in the first imaging mode, a ratio of the half-image height Y1 of the camera lens to the total length (TTL) of the camera lens is |Y1/TTL|=0.57, and a ratio of the entrance pupil diameter EPD1 to the total length (TTL) of the camera lens is |EPD1/TTL|=0.33. For each basic parameter of the camera lens, refer to Table 12.

TABLE 12

| | Object distance | Infinite far |
|---|---|---|
| | Focal length EFL (mm) | 7.07 |
| First imaging mode | Value of F | 2.36 |
| | Half-image height Y1 (mm) | 5.10 |
| | Half FOV (°) | 35.801 |
| Second imaging mode | Value of F | 1.42 |
| | Half-image height Y2 (mm) | 2.50 |
| | Half FOV (°) | 19.33 |
| | BFL (mm) | 0.644 |
| | TTL (mm) | 8.97 |
| | Designed wavelength | 650 nm, 610 nm, 555 nm, 510 nm, 470 nm |

The camera module shown in FIG. 23a and FIG. 23b is simulated. A simulation result of the camera module is described in detail below with reference to accompanying drawings.

Figure 24A:
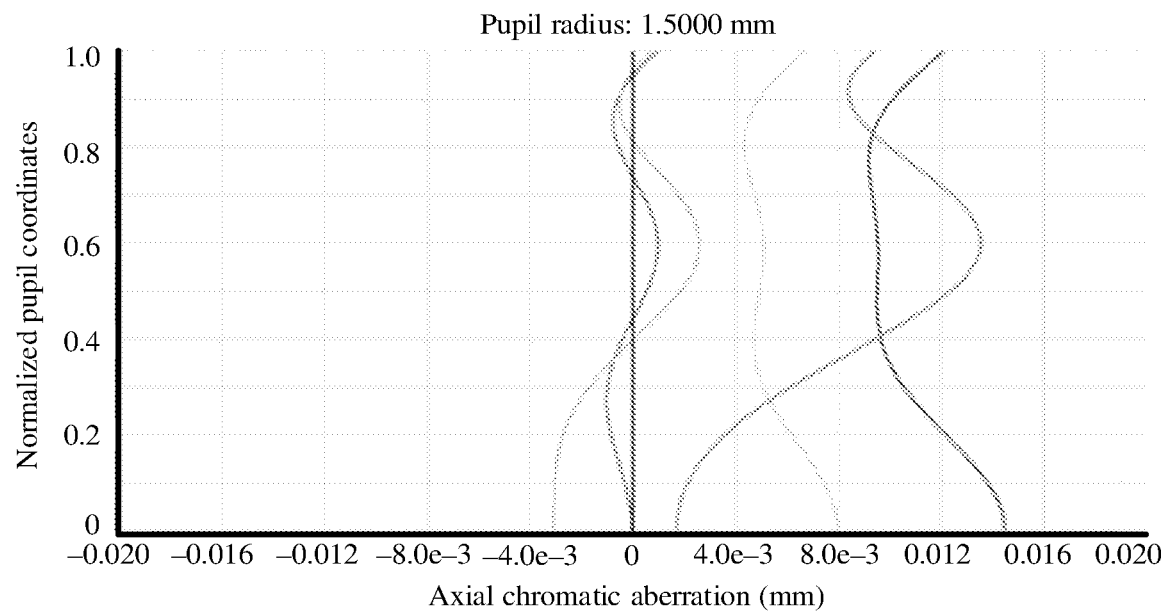

FIG. 24a is a curve diagram of an axial chromatic aberration of a camera module in a first imaging mode. Simulation results of a depth of focus location of colorful light rays on wavelengths of 650 nm, 610 nm, 555 nm, 510 nm, and 470 nm are separately shown in the figure. It can be learned that the axial chromatic aberration of a camera lens in the first imaging mode is controlled to fall within a very small range.

Figure 24B:
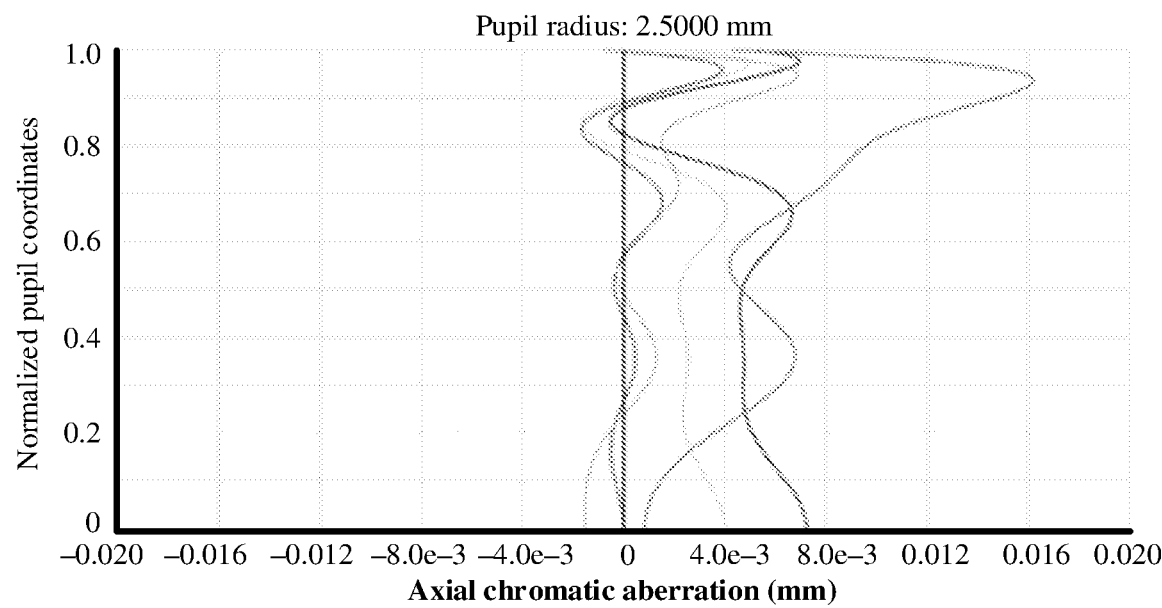
FIG. 24b is a curve diagram of an axial chromatic aberration of a camera module in FIG. 23b.

FIG. 24b is a curve diagram of an axial chromatic aberration of a camera module in a second imaging mode. Simulation results of a depth of focus location of colorful light rays on wavelengths of 650 nm, 610 nm, 555 nm, 510 nm, and 470 nm are separately shown in the figure. It can be learned that the axial chromatic aberration of a camera lens in the second imaging mode is controlled to fall within a very small range.

Figure 25A:
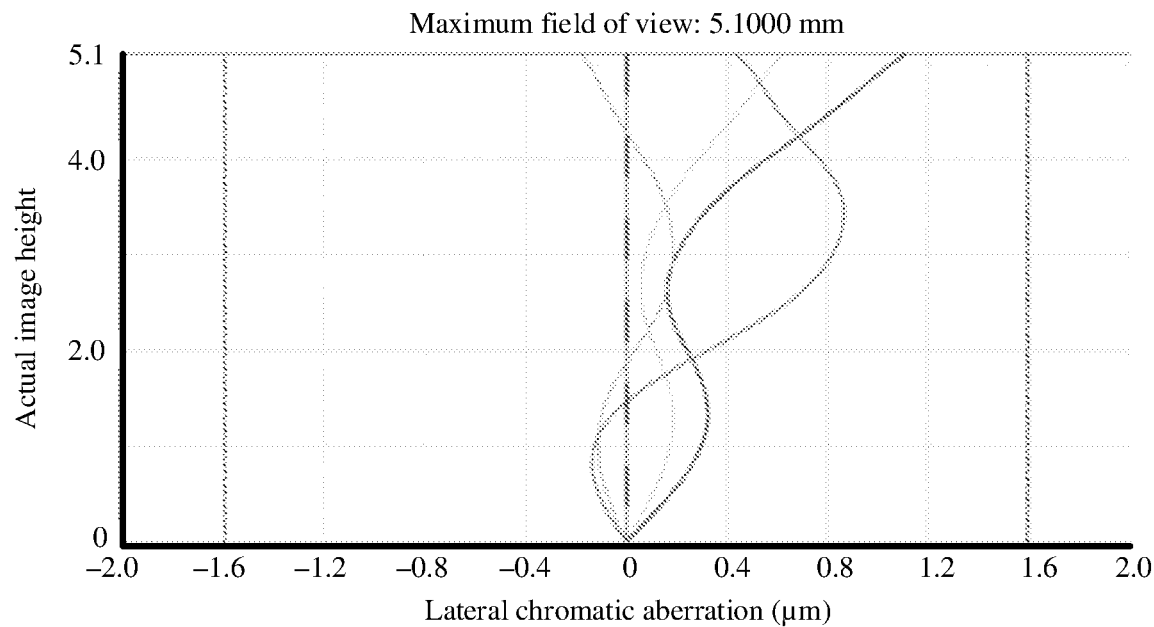

FIG. 25a is a curve diagram of a lateral chromatic aberration of a camera module in a first imaging mode. In the figure, five solid curves are respectively colorful light rays on wavelengths of 650 nm, 610 nm, 555 nm, 510 nm, and 470 nm, and dotted lines indicate that a diffraction limit range is from −1.6 μm to 1.6 μm, and it can be learned that all lateral chromatic aberrations of the five light rays fall within the diffraction limit range.

Figure 25B:
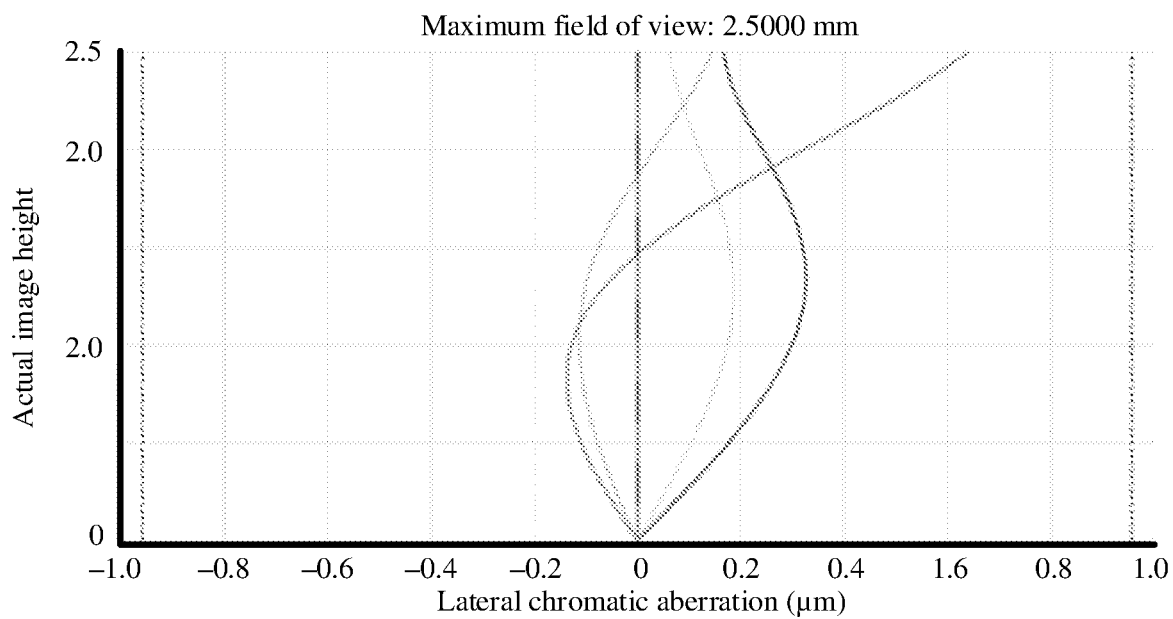
FIG. 25b is a curve diagram of a lateral chromatic aberration of a camera module in FIG. 23b.

FIG. 25b is a curve diagram of a lateral chromatic aberration of a camera module in a second imaging mode. In the figure, five solid curves are respectively colorful light rays on wavelengths of 650 nm, 610 nm, 555 nm, 510 nm, and 470 nm, and dotted lines indicate that a diffraction limit range is from −0.95 μm to 0.95 μm, and it can be learned that all lateral chromatic aberrations of the five light rays fall within the diffraction limit range.

Figure 26A:
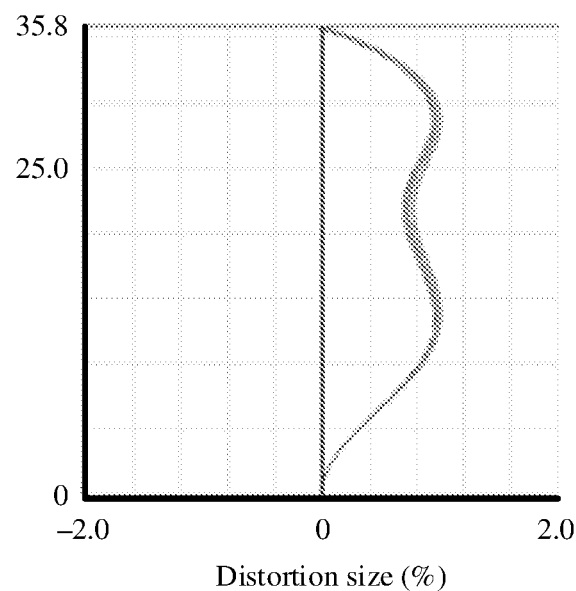

FIG. 26a is a curve diagram of optical distortion of a camera module in a first imaging mode, showing a difference between imaging deformation and an ideal shape. In the figure, five solid curves are respectively colorful light rays on wavelengths of 650 nm, 610 nm, 555 nm, 510 nm, and 470 nm. It can be learned that, in this mode, the optical distortion may be controlled to fall within a range less than 1%.

Figure 26B:
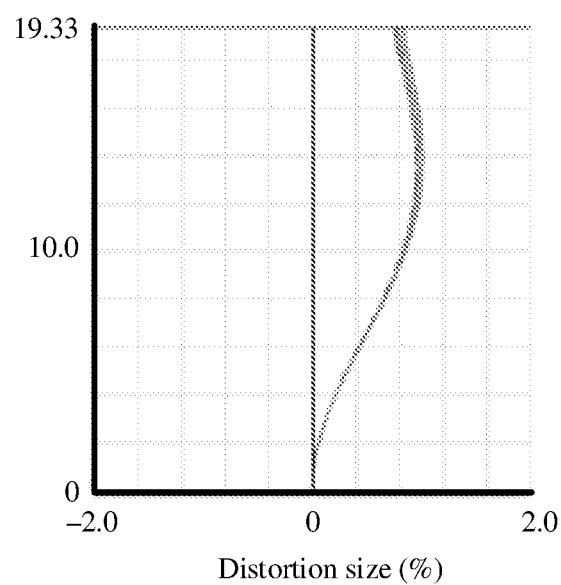
FIG. 26b is a curve diagram of optical distortion of a camera module in FIG. 23b.

FIG. 26b is a curve diagram of optical distortion of a camera module in a second imaging mode, showing a difference between imaging deformation and an ideal shape. In the figure, five solid curves are respectively colorful light rays on wavelengths of 650 nm, 610 nm, 555 nm, 510 nm, and 470 nm. It can be learned that, in this mode, the optical distortion may be controlled to fall within a range less than 1%.

Figure 27A:
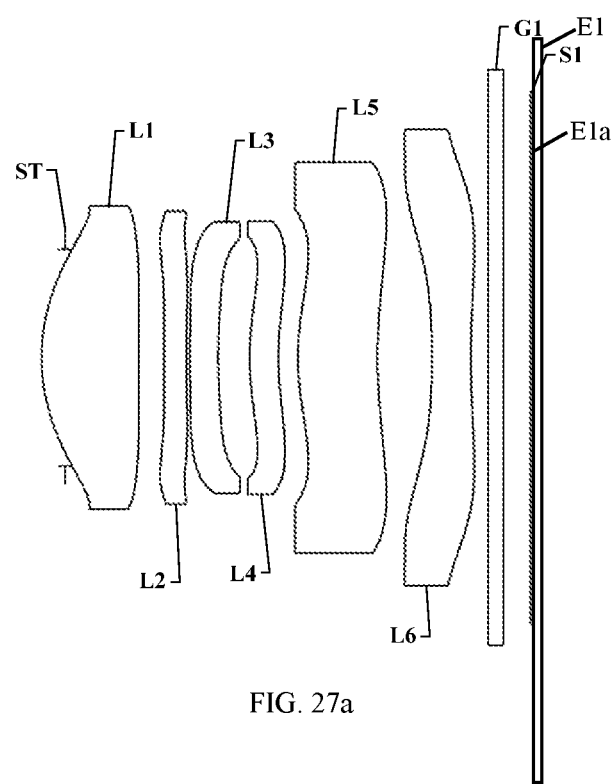
FIG. 27a is a schematic diagram of a structure of a seventh specific camera module in a first imaging mode.
Figure 27B:
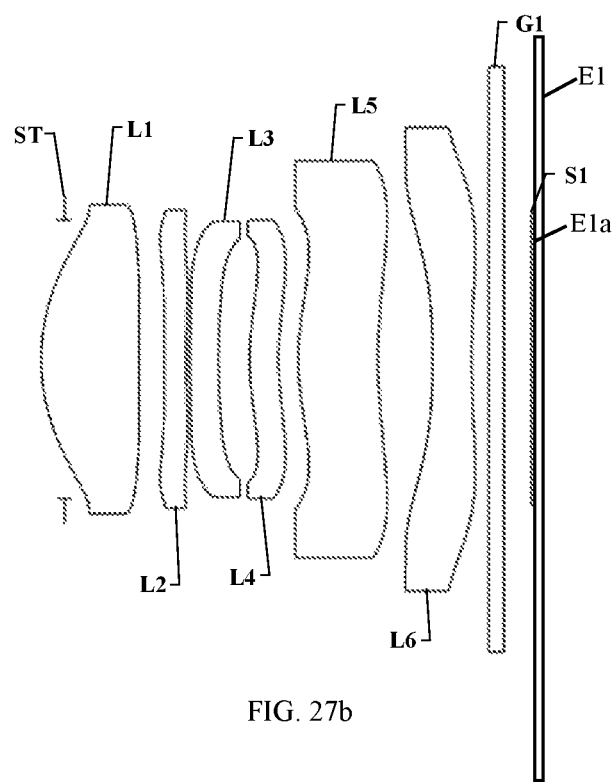
FIG. 27b is a schematic diagram of a structure of a seventh specific camera module in a second imaging mode.

FIG. 27a and FIG. 27b show a seventh specific camera module. FIG. 27a is a schematic diagram of a structure of the camera module in a first imaging mode. FIG. 27b is a schematic diagram of a structure of the camera module in a second imaging mode. A camera lens of the camera module includes six lenses having focal power, and the six lenses are sequentially a first lens L1, a second lens L2, a third lens L3, a fourth lens L4, a fifth lens L5, and a sixth lens L6 from an object side. A variable aperture ST may be specifically located on an object side of the first lens L1, and an optical filter G1 may be located on an image side of the sixth lens L6.

In this embodiment of this disclosure, each lens of the camera lens may be an aspheric lens. In other words, the camera lens includes 12 aspheric surfaces in total. Referring to both Table 13a and Table 13b, Table 13a shows a curvature radius, a thickness, a refractive index, and an Abbe number of each lens of the camera lens, and Table 13b shows an aspheric coefficient of each lens.

TABLE 13a

| | Description | Curvature radius | | Thickness | Refractive index | | Abbe number | |
|---|---|---|---|---|---|---|---|---|
| ST | Variable aperture | Infinite | d0 | −0.320 | — | | — | — |
| R1 | First lens | 2.676 | d1 | 1.342 | n1 | 1.55 | v1 | 71.7 |
| R2 | | 38.043 | a1 | 0.350 | | | | |
| R3 | Second | 59.210 | d2 | 0.304 | n2 | 1.68 | v2 | 18.4 |
| R4 | lens | 14.710 | a2 | 0.050 | | | | |
| R5 | Third lens | 18.654 | d3 | 0.390 | n3 | 1.68 | v3 | 18.4 |
| R6 | | 6.768 | a3 | 0.433 | | | | |
| R7 | Fourth | 3.686 | d4 | 0.397 | n4 | 1.54 | v4 | 55.9 |
| R8 | lens | 3.950 | a4 | 0.270 | | | | |
| R9 | Fifth lens | 3.445 | d5 | 1.097 | n5 | 1.54 | v5 | 56.0 |
| R10 | | 7.184 | a5 | 0.751 | | | | |
| R11 | Sixth lens | −12.095 | d6 | 0.537 | n6 | 1.54 | v6 | 55.7 |
| R12 | | 13.235 | a6 | 0.239 | | | | |
| R13 | Optical | Infinite | d7 | 0.210 | n7 | 1.52 | v7 | 64.2 |
| R14 | filter | Infinite | a10 | 0.376 | | | | |

TABLE 13b

| | Type | K | R | A2 | A3 | A4 | A5 | A6 | A7 | A8 | A9 | A10 |
|---|---|---|---|---|---|---|---|---|---|---|---|---|
| R1 | Extended aspheric surface | −0.508 | 2.056 | −3.73E−02 | −2.99E−02 | −2.42E−02 | −2.06E−02 | −3.88E−02 | −3.57E−02 | −2.29E−02 | 2.42E−02 | −6.77E−03 |
| R2 | Extended aspheric surface | 10.392 | 1.982 | −2.45E−01 | 3.16E−01 | −3.62E−01 | 1.34E−01 | 2.32E−02 | 2.06E−02 | 3.14E−03 | −1.25E−02 | −2.28E−02 |
| R3 | Extended aspheric surface | 1.971 | 1.978 | −3.80E−01 | 2.40E−01 | 2.68E−02 | 5.50E−02 | 6.25E−02 | 5.32E−02 | −8.20E−03 | −3.22E−02 | −4.59E−02 |
| R4 | Extended aspheric surface | −2.898 | 1.995 | −3.42E−01 | 5.02E−02 | 8.21E−02 | 5.30E−02 | 2.40E−02 | 9.00E−02 | −7.85E−04 | −1.37E−02 | −8.19E−02 |
| R5 | Extended aspheric surface | 48.044 | 1.955 | −5.16E−01 | 1.58E+00 | −1.32E+00 | 4.51E−01 | −1.05E−02 | 2.81E−02 | −4.29E−03 | −1.08E−03 | 1.39E−01 |

TABLE 13b-continued

| | Type | K | R | A2 | A3 | A4 | A5 | A6 | A7 | A8 | A9 | A10 |
|---|---|---|---|---|---|---|---|---|---|---|---|---|
| R6 | Extended aspheric surface | 4.671 | 1.821 | −6.36E−01 | 1.32E+00 | −6.87E−01 | 1.96E−01 | 5.23E−02 | −1.62E−01 | −2.70E−01 | −2.59E−02 | 6.93E−01 |
| R7 | Extended aspheric surface | −8.063 | 1.824 | −3.28E−01 | 4.96E−02 | −1.21E−01 | 3.90E−02 | 1.09E−01 | −2.62E−02 | −2.50E−01 | −5.45E−03 | −1.92E−01 |
| R8 | Extended aspheric surface | −1.067 | 1.853 | −6.76E−01 | 3.29E−01 | 1.61E−01 | −1.26E−01 | −2.03E−01 | −8.91E−02 | 3.67E−02 | 8.27E−02 | 1.05E−02 |
| R9 | Extended aspheric surface | −11.593 | 1.854 | −1.60E−01 | −2.00E−01 | 3.17E−01 | −7.40E−02 | −2.94E−01 | 7.90E−03 | 1.54E−01 | 5.43E−02 | −6.26E−02 |
| R10 | Extended aspheric surface | −32.272 | 1.803 | −3.72E−02 | −3.17E−03 | −5.99E−04 | −3.80E−03 | −3.08E−04 | 5.13E−04 | 1.17E−04 | 5.33E−06 | −3.21E−05 |
| R11 | Extended aspheric surface | −9.720 | 1.797 | −2.48E−01 | 1.70E−01 | −3.58E−02 | 2.85E−03 | −2.33E−04 | 2.47E−06 | −1.48E−06 | −4.34E−07 | −8.14E−07 |
| R12 | Extended aspheric surface | −100.000 | 1.947 | −7.28E−03 | −9.73E−02 | 2.15E−02 | 3.19E−03 | 1.55E−04 | −1.58E−05 | −3.20E−05 | −9.22E−06 | −2.75E−06 |

In the 12 aspheric surfaces of the camera lens shown in Table 13b, surface types z of all the extended aspheric surfaces may be defined by using but not limited to the following aspheric surface formula:

$$z = \frac{cr^2}{1+\sqrt{1-Kc^2r^2}} + A_2 r^4 + A_3 r^6 + A_4 r^8 + A_5 r^{10} + A_6 r^{12} + A_7 r^{14} + A_8 r^{16} + A_9 r^{18} + A_{10} r^{20}$$

Herein, z represents a rise of an aspheric surface, r represents a normalized radial coordinate of the aspheric surface, r is equal to a result obtained by dividing an actual radial coordinate of the aspheric surface by a normalized radius R, c represents spherical curvature of a vertex of the aspheric surface, K represents a quadric surface constant, and A2, A3, A4, A5, A6, A7, A8, A9, and A10 represent aspheric coefficients.

In this embodiment of this disclosure, the second lens L2 has negative focal power, and a ratio of a focal length f2 of the second lens L2 to a focal length EFL of the camera lens is |f2/EFL|=5.23. The third lens L3 has negative focal power, and a ratio of a focal length f3 of the third lens to the focal length EFL of the camera lens is |f3/EFL|=2.87. The fourth lens L4 has positive focal power, and a ratio of a focal length f4 of the fourth lens to the focal length EFL of the camera lens is |f4/EFL|=12.04. A ratio of the focal length EFL of the camera lens to a total length (TTL) of the camera lens is |EFL/TTL|=0.81.

With continued reference to FIG. 27a, when the camera module is in the first imaging mode, the camera lens performs imaging in a full area of a photosensitive area, a half-image height Y1 of the camera lens is 3.8 mm, an entrance pupil diameter EPD1 is 3.0 mm, and a quantity F of apertures is 1.79. Referring to FIG. 27b, when the camera module is switched to the second imaging mode, the camera lens performs imaging in a partial area of a photosensitive area, a half-image height Y2 of the camera lens is 2.0 mm, an entrance pupil diameter EPD2 is 3.8 mm, and a quantity F of apertures is 1.41. A ratio of EPD1 to EPD2 is |EPD1/EPD2|=0.789, and a ratio of Y1 to Y2 is |Y1/Y2|=1.9. In addition, when a camera module is in the first imaging mode, a ratio of the half-image height Y1 of the camera lens to the total length (TTL) of the camera lens is |Y1/TTL|=0.56, and a ratio of the entrance pupil diameter EPD1 to the total length (TTL) of the camera lens is |EPD1/TTL|=0.445. For each basic parameter of the camera lens, refer to Table 12.

TABLE 14

| | Object distance | Infinite far |
|---|---|---|
| | Focal length EFL (mm) | 5.47 |
| First imaging mode | Value of F | 1.79 |
| | Half-image height Y1 (mm) | 3.80 |
| | Half FOV (°) | 34.467 |
| Second imaging mode | Value of F | 1.41 |
| | Half-image height Y2 (mm) | 2.00 |
| | Half FOV (°) | 19.943 |
| | BFL (mm) | 0.825 |
| | TTL (mm) | 6.74 |
| | Designed wavelength | 650 nm, 610 nm, 555 nm, 510 nm, 470 nm |

The camera module shown in FIG. 27a and FIG. 27b is simulated. A simulation result of the camera module is described in detail below with reference to accompanying drawings.

Figure 28A:
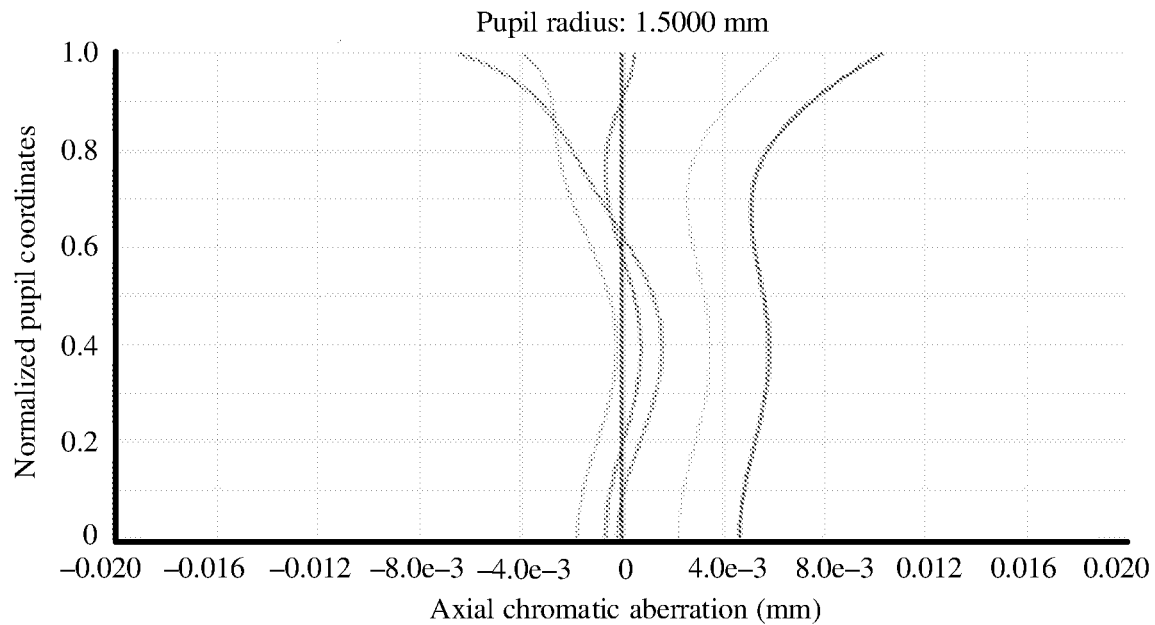

FIG. 28a is a curve diagram of an axial chromatic aberration of a camera module in a first imaging mode. Simulation results of a depth of focus location of colorful light rays on wavelengths of 650 nm, 610 nm, 555 nm, 510 nm, and 470 nm are separately shown in the figure. It can be learned that the axial chromatic aberration of a camera lens in the first imaging mode is controlled to fall within a very small range.

Figure 28B:
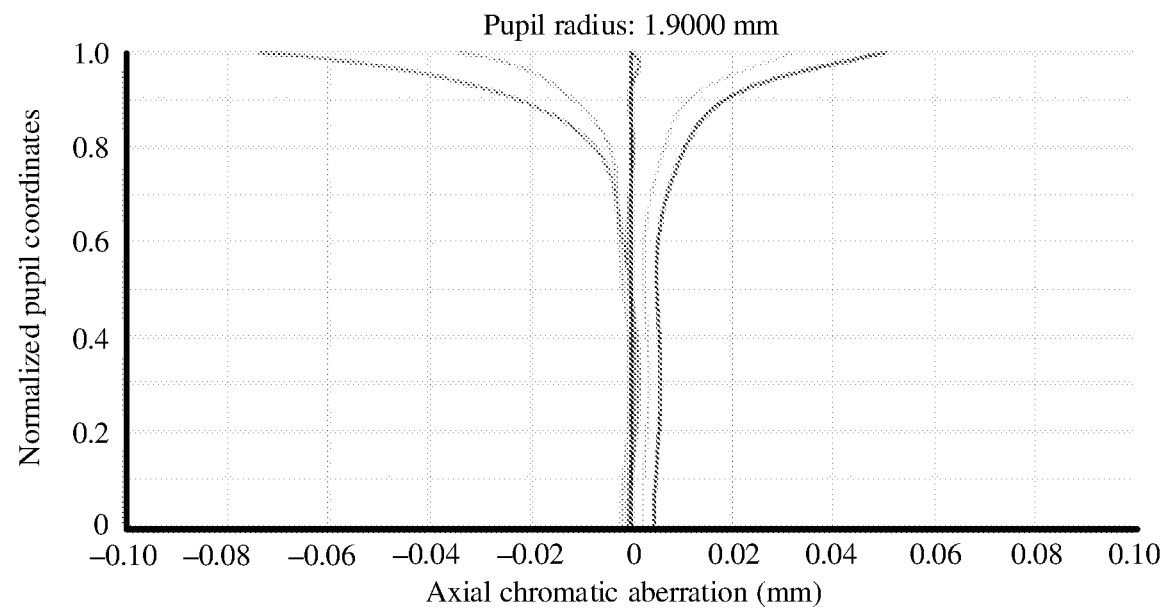
FIG. 28b is a curve diagram of an axial chromatic aberration of a camera module in FIG. 27b.

FIG. 28b is a curve diagram of an axial chromatic aberration of a camera module in a second imaging mode. Simulation results of a depth of focus location of colorful light rays on wavelengths of 650 nm, 610 nm, 555 nm, 510 nm, and 470 nm are separately shown in the figure. It can be learned that the axial chromatic aberration of a camera lens in the second imaging mode is controlled to fall within a very small range.

Figure 29A:
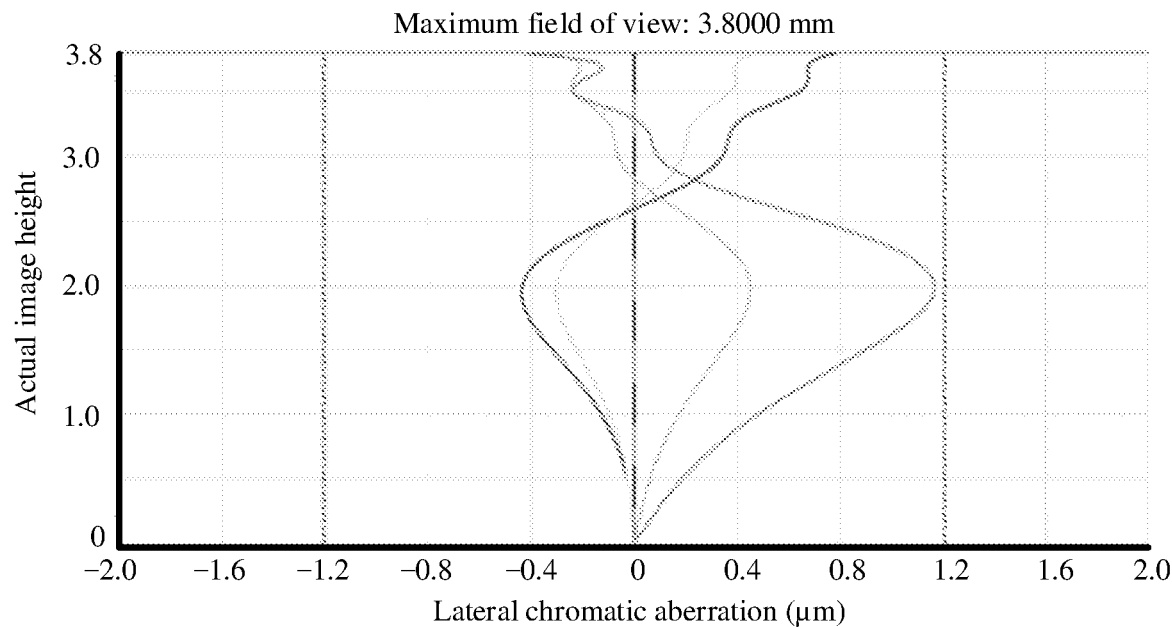

FIG. 29a is a curve diagram of a lateral chromatic aberration of a camera module in a first imaging mode. In the figure, five solid curves are respectively colorful light rays on wavelengths of 650 nm, 610 nm, 555 nm, 510 nm, and 470 nm, and dotted lines indicate that a diffraction limit range is from −1.2 μm to 1.2 μm, and it can be learned that all lateral chromatic aberrations of the five light rays fall within the diffraction limit range.

Figure 29B:
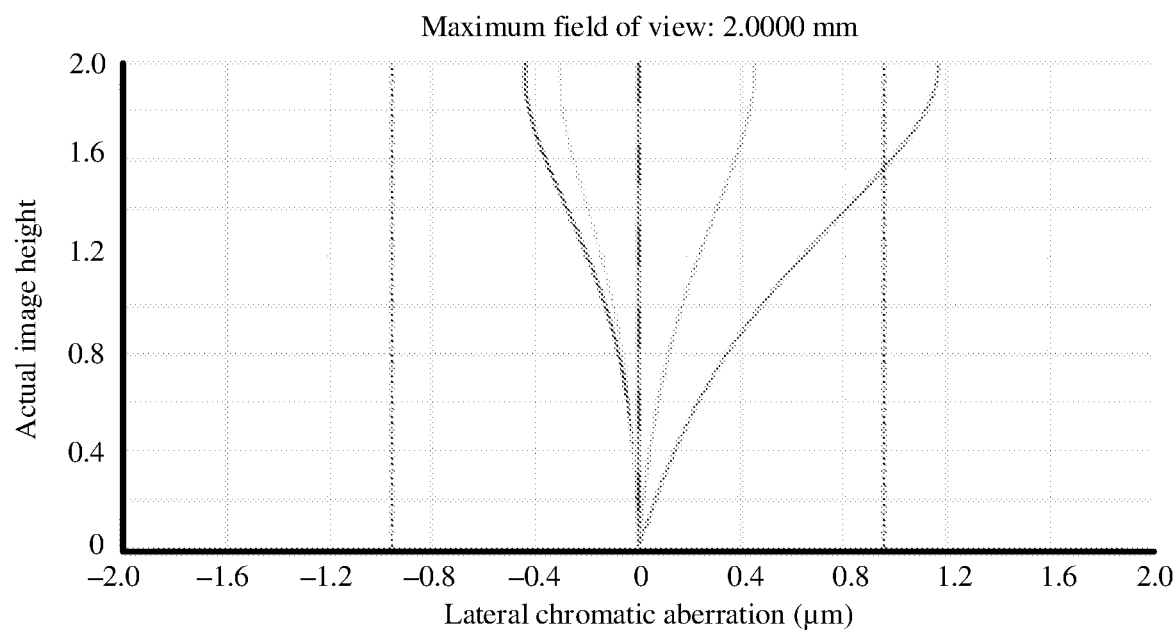
FIG. 29b is a curve diagram of a lateral chromatic aberration of a camera module in FIG. 27b.

FIG. 29b is a curve diagram of a lateral chromatic aberration of a camera module in a second imaging mode. In the figure, five solid curves are respectively colorful light rays on wavelengths of 650 nm, 610 nm, 555 nm, 510 nm, and 470 nm, and dotted lines indicate that a diffraction limit range is from −0.95 μm to 0.95 μm, and it can be learned that lateral chromatic aberrations of the five light rays basically fall within the diffraction limit range.

Figure 30A:
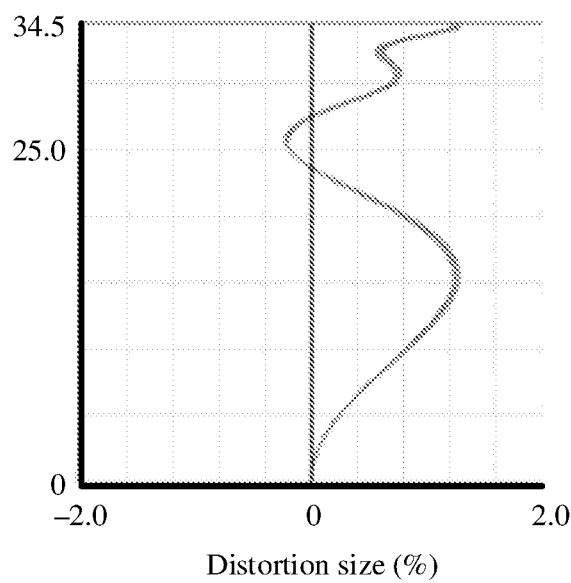

FIG. 30a is a curve diagram of optical distortion of a camera module in a first imaging mode, showing a difference between imaging deformation and an ideal shape. In the figure, five solid curves are respectively colorful light rays on wavelengths of 650 nm, 610 nm, 555 nm, 510 nm, and 470 nm. It can be learned that, in this mode, the optical distortion may be controlled to fall within a range less than 1.2%.

Figure 30B:
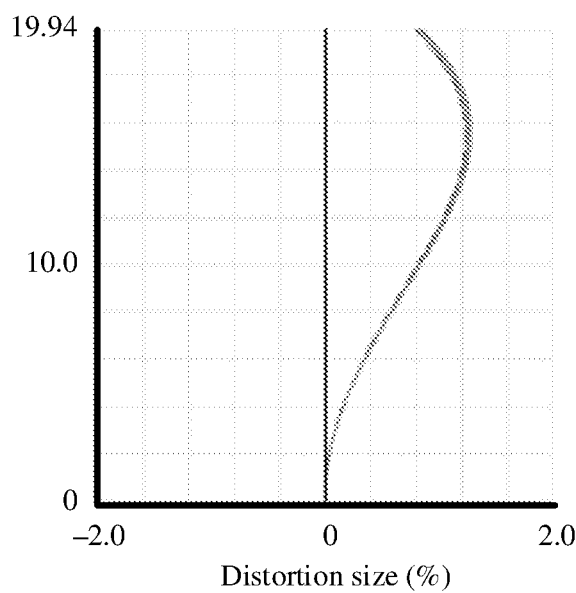
FIG. 30b is a curve diagram of optical distortion of a camera module in FIG. 27b.

FIG. 30b is a curve diagram of optical distortion of a camera module in a second imaging mode, showing a difference between imaging deformation and an ideal shape. In the figure, five solid curves are respectively colorful light rays on wavelengths of 650 nm, 610 nm, 555 nm, 510 nm, and 470 nm. It can be learned that, in this mode, the optical distortion may be controlled to fall within a range less than 1.2%.

Figure 31A:
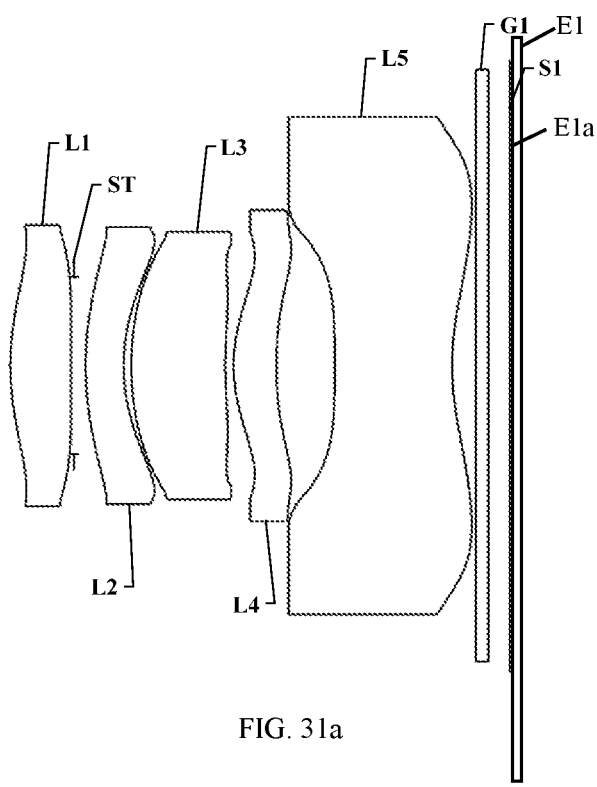
FIG. 31a is a schematic diagram of a structure of an eighth specific camera module in a first imaging mode.
Figure 31B:
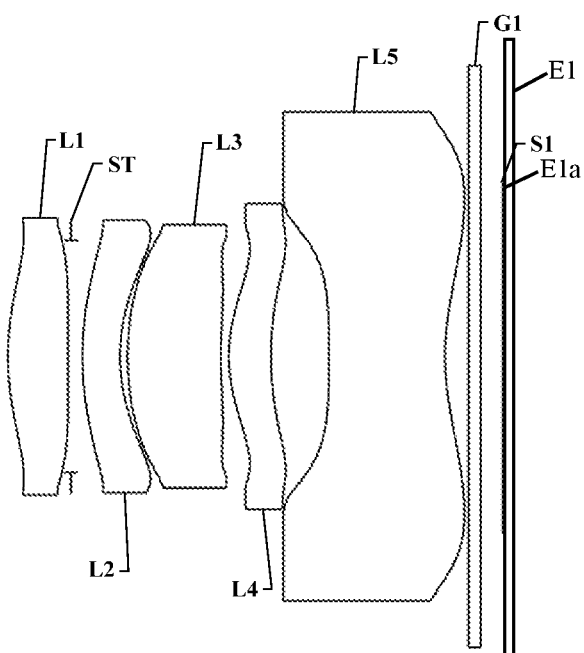
FIG. 31b is a schematic diagram of a structure of an eighth specific camera module in a second imaging mode.

FIG. 31a and FIG. 31b show an eighth specific camera module. FIG. 31a is a schematic diagram of a structure of the camera module in a first imaging mode. FIG. 31b is a schematic diagram of a structure of the camera module in a second imaging mode. A camera lens of the camera module includes five lenses having focal power, and the five lenses are sequentially a first lens L1, a second lens L2, a third lens L3, a fourth lens L4, and a fifth lens L5 from an object side. A variable aperture ST may be specifically located between the first lens L1 and the second lens L2, and an optical filter G1 may be located on an image side of the fifth lens #l5.

In this embodiment of this disclosure, each lens of the camera lens may be an aspheric lens. In other words, the camera lens includes 10 aspheric surfaces in total. Referring to both Table 15a and Table 15b, Table 15a shows a curvature radius, a thickness, a refractive index, and an Abbe number of each lens of the camera lens, and Table 15b shows an aspheric coefficient of each lens.

TABLE 15a

| | Description | Curvature radius | | Thickness | | Refractive index | | Abbe number |
|---|---|---|---|---|---|---|---|---|
| R1 | First lens | 4.803 | d1 | 1.027 | n1 | 1.55 | v1 | 71.7 |
| R2 | | 96.016 | a1 | 0.049 | | | | |
| ST | Variable aperture | Infinite | d0 | −0.320 | — | — | — | — |
| R3 | Second | 5.429 | d2 | 0.645 | n2 | 1.68 | v2 | 18.4 |
| R4 | lens | 3.161 | a2 | 0.130 | | | | |
| R5 | Third lens | 4.916 | d3 | 1.597 | n3 | 1.54 | v3 | 55.9 |
| R6 | | 7.486 | a3 | 0.139 | | | | |
| R7 | Fourth lens | 2.661 | d4 | 0.726 | n4 | 1.54 | v4 | 56.0 |
| R8 | | 6.771 | a4 | 0.989 | | | | |
| R9 | Fifth lens | −103.866 | d5 | 1.993 | n5 | 1.54 | v5 | 55.7 |
| R11 | | 4.415 | a5 | 0.403 | | | | |
| R11 | Optical | Infinite | d6 | 0.210 | n6 | 1.52 | v6 | 64.2 |
| R12 | filter | Infinite | a6 | 0.361 | | | | |

TABLE 15b

| | Type | K | R | A2 | A3 | A4 | A5 | A6 | A7 |
|---|---|---|---|---|---|---|---|---|---|
| R1 | Extended aspheric surface | 0.000 | 1.890 | −7.86E−02 | −3.45E−02 | −1.45E−02 | −2.46E−03 | 8.79E−04 | 1.50E−03 |
| R2 | Extended aspheric surface | 0.000 | 1.578 | −3.29E−02 | −1.25E−02 | −4.95E−04 | 7.90E−04 | 3.99E−04 | 9.75E−05 |
| R3 | Extended aspheric surface | 0.000 | 1.843 | −4.38E−02 | −3.94E−03 | −2.67E−03 | 6.99E−04 | 2.26E−03 | 1.28E−03 |
| R4 | Extended aspheric surface | 0.000 | 1.995 | −1.20E−01 | −2.07E−02 | −1.59E−02 | −1.35E−02 | −9.65E−03 | −1.10E−02 |
| R5 | Extended aspheric surface | 0.000 | 2.373 | 5.64E−02 | 8.78E−02 | 9.22E−02 | 4.93E−02 | −1.10E−01 | −2.32E−01 |
| R6 | Extended aspheric surface | 0.000 | 2.572 | −1.52E+00 | 1.09E+00 | 1.02E+00 | −7.93E−01 | −1.11E+00 | 8.93E−01 |
| R7 | Extended aspheric surface | 0.000 | 2.987 | −2.07E+00 | −6.87E−01 | −1.83E+00 | −4.08E−01 | −1.20E+00 | −6.86E+00 |
| R8 | Extended aspheric surface | 0.000 | 3.389 | 2.30E+00 | −8.99E+00 | −4.00E−01 | 8.98E+00 | 1.10E+01 | −3.81E+00 |
| R9 | Extended aspheric surface | 0.000 | 4.309 | −8.54E+00 | 2.57E+00 | 1.67E+01 | 6.63E+00 | −1.65E+02 | −4.77E+02 |
| R10 | Extended aspheric surface | 0.000 | 4.930 | −9.42E+00 | 1.51E+01 | −2.09E+01 | 1.08E+01 | 5.02E−01 | −2.24E+01 |

TABLE 15b-continued

| | Type | K | R | A8 | A9 | A10 | A11 | A12 | A13 |
|---|---|---|---|---|---|---|---|---|---|
| R1 | Extended aspheric surface | 0.000 | 1.890 | 8.85E−04 | 3.82E−04 | −1.13E−04 | −1.72E−04 | 0.00E+00 | 0.00E+00 |
| R2 | Extended aspheric surface | 0.000 | 1.578 | −2.65E−05 | −2.39E−05 | 2.36E−06 | 0.00E+00 | 0.00E+00 | 0.00E+00 |
| R3 | Extended aspheric surface | 0.000 | 1.843 | −2.54E−04 | −7.68E−04 | −5.21E−04 | 0.00E+00 | 0.00E+00 | 0.00E+00 |
| R4 | Extended aspheric surface | 0.000 | 1.995 | −1.03E−02 | −3.95E−03 | 7.80E−03 | 0.00E+00 | 0.00E+00 | 0.00E+00 |
| R5 | Extended aspheric surface | 0.000 | 2.373 | −1.31E−01 | 1.53E−01 | 4.31E−01 | 2.28E−01 | −7.03E−01 | 0.00E+00 |
| R6 | Extended aspheric surface | 0.000 | 2.572 | 1.95E+00 | 8.65E−01 | 7.99E+00 | 2.21E+01 | −4.70E+01 | 0.00E+00 |
| R7 | Extended aspheric surface | 0.000 | 2.987 | −7.35E+00 | 4.24E+01 | 1.01E+02 | 5.70E+01 | −3.83E+02 | 0.00E+00 |
| R8 | Extended aspheric surface | 0.000 | 3.389 | −4.53E+01 | −5.69E+01 | 2.40E+01 | 4.63E+02 | 6.63E+02 | −1.71E+03 |
| R9 | Extended aspheric surface | 0.000 | 4.309 | −1.07E+03 | 2.78E+03 | 1.98E+04 | 9.83E+04 | −1.31E+05 | −4.09E+05 |
| R10 | Extended aspheric surface | 0.000 | 4.930 | 3.00E+00 | 1.72E+01 | 1.04E+02 | −1.21E+02 | 0.00E+00 | 0.00E+00 |

In the 10 aspheric surfaces of the camera lens shown in Table 15b, surface types z of all the extended aspheric surfaces may be defined by using but not limited to the following aspheric surface formula:

$$z = \frac{cr^2}{1 + \sqrt{1 - Kc^2 r^2}} + A_2 r^4 + A_3 r^6 + A_4 r^8 + A_5 r^{10} + A_6 r^{12} + A_7 r^{14} + A_8 r^{16} + A_9 r^{18} + A_{10} r^{20} + A_{11} r^{22} + A_{12} r^{24} + A_{13} r^{26}$$

Herein, z represents a rise of an aspheric surface, r represents a normalized radial coordinate of the aspheric surface, r is equal to a result obtained by dividing an actual radial coordinate of the aspheric surface by a normalized radius R, c represents spherical curvature of a vertex of the aspheric surface, K represents a quadric surface constant, and A2, A3, A4, A5, A6, A7, A8, A9, A10, A11, A12, and A13 represent aspheric coefficients.

In this embodiment of this disclosure, the second lens L2 has negative focal power, and a ratio of a focal length f2 of the second lens L2 to a focal length EFL of the camera lens is |f2/EFL|=1.97. The third lens L3 has positive focal power, and a ratio of a focal length f3 of the third lens to the focal length EFL of the camera lens is |f3/EFL|=3.41. The fourth lens L4 has positive focal power, and a ratio of a focal length f4 of the fourth lens to the focal length EFL of the camera lens is |f4/EFL|=1.20. A ratio of the focal length EFL of the camera lens to a total length (TTL) of the camera lens is |EFL/TTL|=0.74.

With continued reference to FIG. 31a, when the camera module is in the first imaging mode, the camera lens performs imaging in a full area of a photosensitive area, a half-image height Y1 of the camera lens is 5.0 mm, an entrance pupil diameter EPD1 is 3.27 mm, and a quantity F of apertures is 1.94. Referring to FIG. 31b, the camera module is switched to the second imaging mode, the camera lens performs imaging in a partial area of a photosensitive area, a half-image height Y2 of the camera lens is 2.5 mm, an entrance pupil diameter EPD2 is 4.36 mm, and a quantity F of apertures is 1.45. A ratio of EPD1 to EPD2 is |EPD1/EPD2|=0.75, and a ratio of Y1 to Y2 is |Y1/Y2|=2. In addition, when a camera module is in the first imaging mode, a ratio of the half-image height Y1 of the camera lens to the total length (TTL) of the camera lens is |Y1/TTL|=0.59, and a ratio of the entrance pupil diameter EPD1 to the total length (TTL) of the camera lens is |EPD1/TTL|=0.39. For each basic parameter of the camera lens, refer to Table 16.

TABLE 16

| | Object distance | Infinite far |
|---|---|---|
| | Focal length EFL (mm) | 6.3 |
| First imaging mode | Value of F | 1.94 |
| | Half-image height Y1 (mm) | 5.00 |
| | Half FOV (°) | 38.162 |
| Second imaging mode | Value of F | 1.45 |
| | Half-image height Y2 (mm) | 2.50 |
| | Half FOV (°) | 21.202 |
| | BFL (mm) | 0.975 |
| | TTL (mm) | 8.47 |
| | Designed wavelength | 650 nm, 610 nm, 555 nm, 510 nm, 470 nm |

The camera module shown in FIG. 31a and FIG. 31b is simulated. A simulation result of the camera module is described in detail below with reference to accompanying drawings.

Figure 32A:
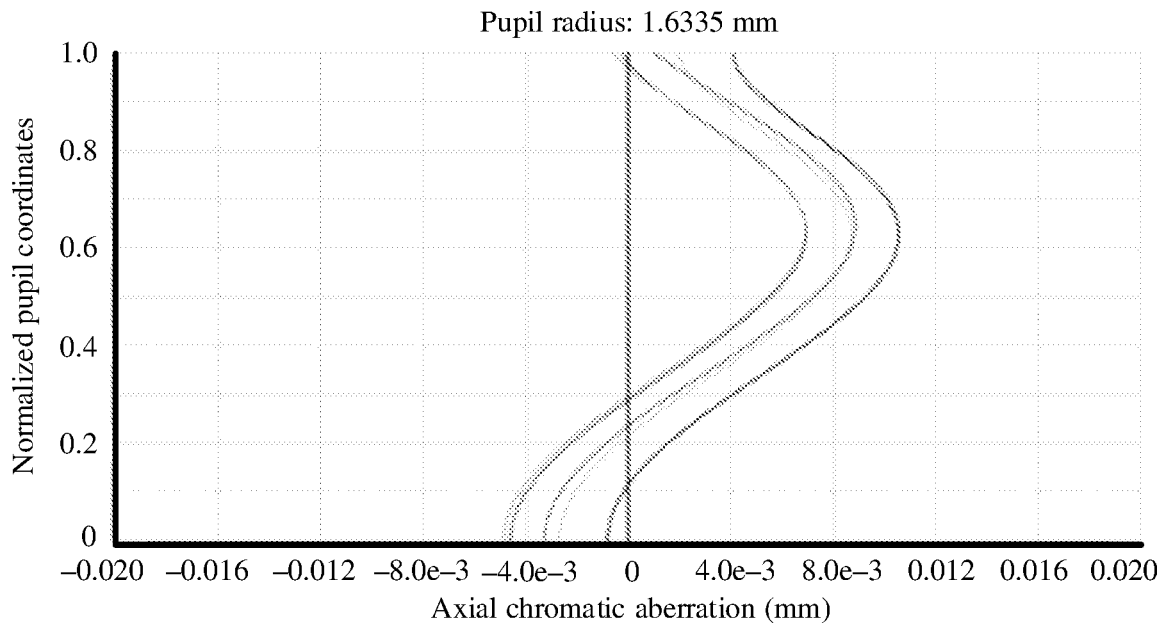

FIG. 32a is a curve diagram of an axial chromatic aberration of a camera module in a first imaging mode. Simulation results of a depth of focus location of colorful light rays on wavelengths of 650 nm, 610 nm, 555 nm, 510 nm, and 470 nm are separately shown in the figure. It can be learned that the axial chromatic aberration of a camera lens in the first imaging mode is controlled to fall within a very small range.

Figure 32B:
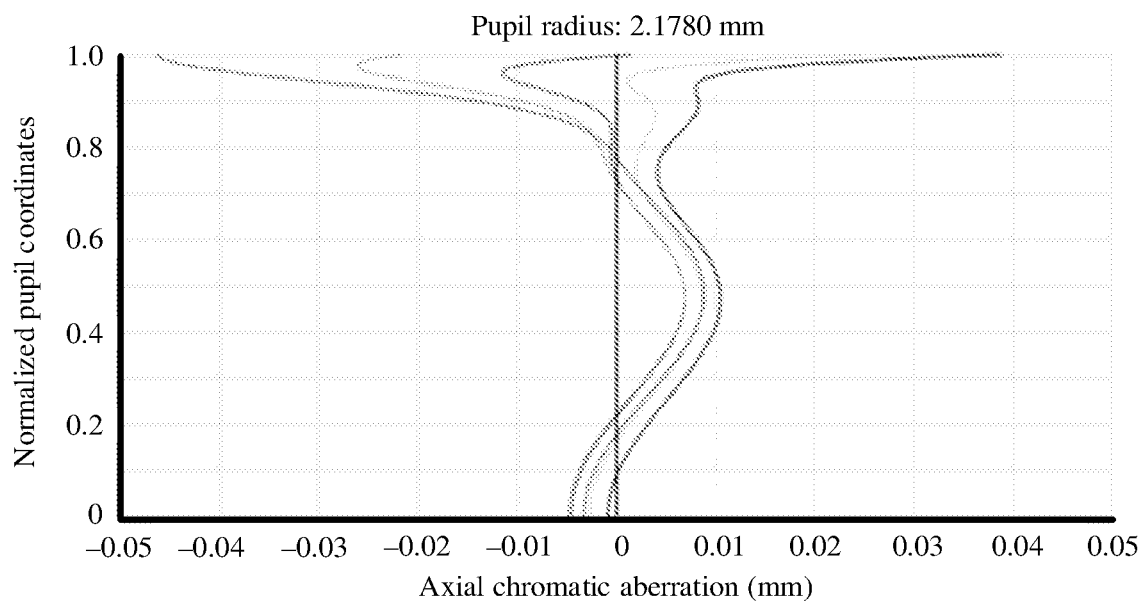
FIG. 32b is a curve diagram of an axial chromatic aberration of a camera module in FIG. 31b.

FIG. 32b is a curve diagram of an axial chromatic aberration of a camera module in a second imaging mode. Simulation results of a depth of focus location of colorful light rays on wavelengths of 650 nm, 610 nm, 555 nm, 510 nm, and 470 nm are separately shown in the figure. It can be learned that the axial chromatic aberration of a camera lens in the second imaging mode is controlled to fall within a very small range.

Figure 33A:
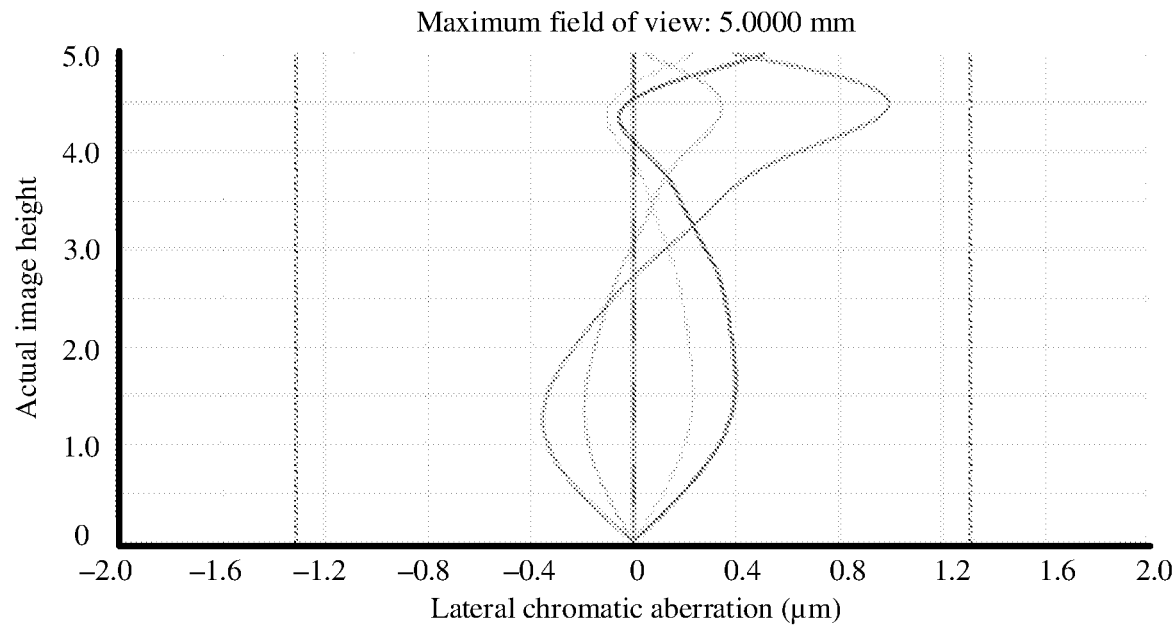

FIG. 33a is a curve diagram of a lateral chromatic aberration of a camera module in a first imaging mode. In the figure, five solid curves are respectively colorful light rays on wavelengths of 650 nm, 610 nm, 555 nm, 510 nm, and 470 nm, and dotted lines indicate that a diffraction limit range is from −1.3 μm to 1.3 μm, and it can be learned that all lateral chromatic aberrations of the five light rays fall within the diffraction limit range.

Figure 33B:
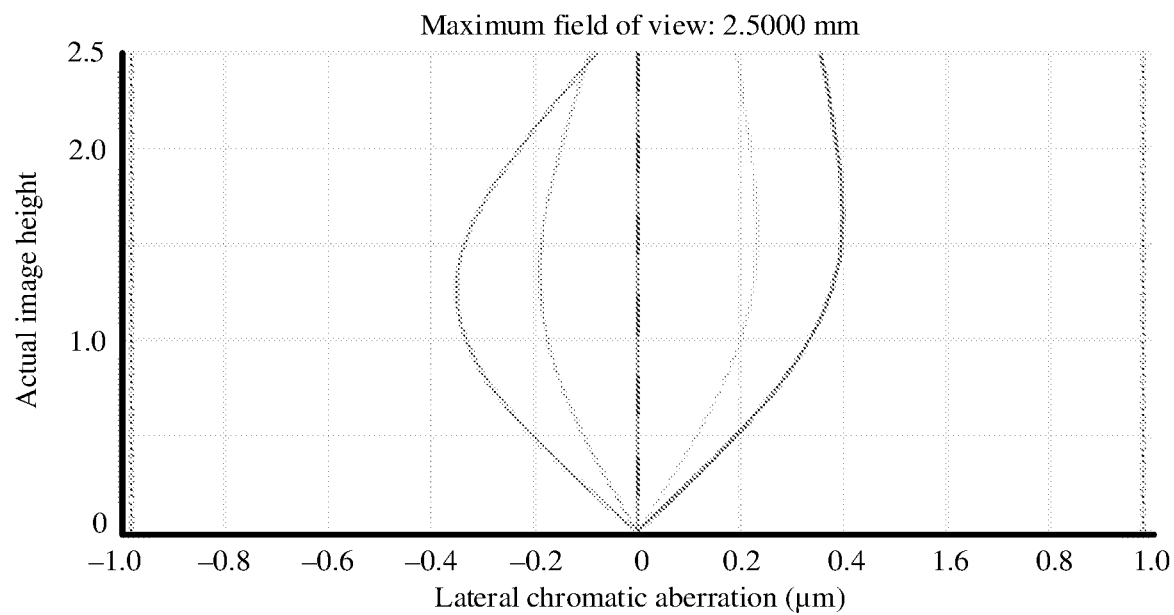
FIG. 33b is a curve diagram of a lateral chromatic aberration of a camera module in FIG. 31b.

FIG. 33b is a curve diagram of a lateral chromatic aberration of a camera module in a second imaging mode. In the figure, five solid curves are respectively colorful light rays on wavelengths of 650 nm, 610 nm, 555 nm, 510 nm, and 470 nm, and dotted lines indicate that a diffraction limit range is from −0.98 μm to 0.98 μm, and it can be learned that all lateral chromatic aberrations of the five light rays fall within the diffraction limit range.

Figure 34A:
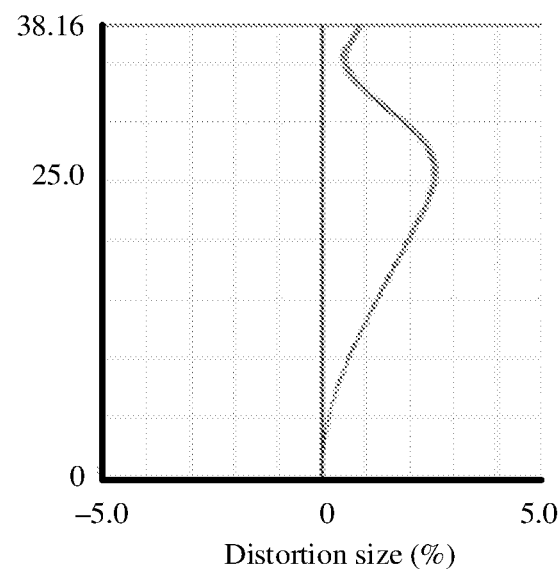

FIG. 34a is a curve diagram of optical distortion of a camera module in a first imaging mode, showing a difference between imaging deformation and an ideal shape. In the figure, five solid curves are respectively colorful light rays on wavelengths of 650 nm, 610 nm, 555 nm, 510 nm, and 470 nm. It can be learned that, in this mode, the optical distortion may be controlled to fall within a range less than 2.5%.

Figure 34B:
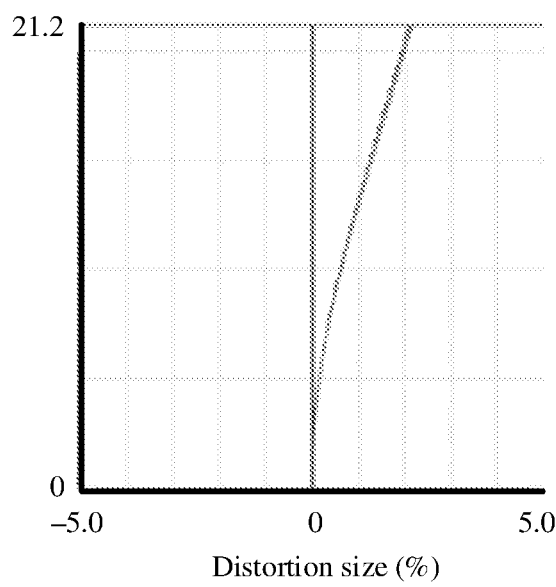
FIG. 34b is a curve diagram of optical distortion of a camera module in FIG. 31b.

FIG. 34b is a curve diagram of optical distortion of a camera module in a second imaging mode, showing a difference between imaging deformation and an ideal shape. In the figure, five solid curves are respectively colorful light rays on wavelengths of 650 nm, 610 nm, 555 nm, 510 nm, and 470 nm. It can be learned that, in this mode, the optical distortion may be controlled to fall within a range less than 2.5%.

Figure 35A:
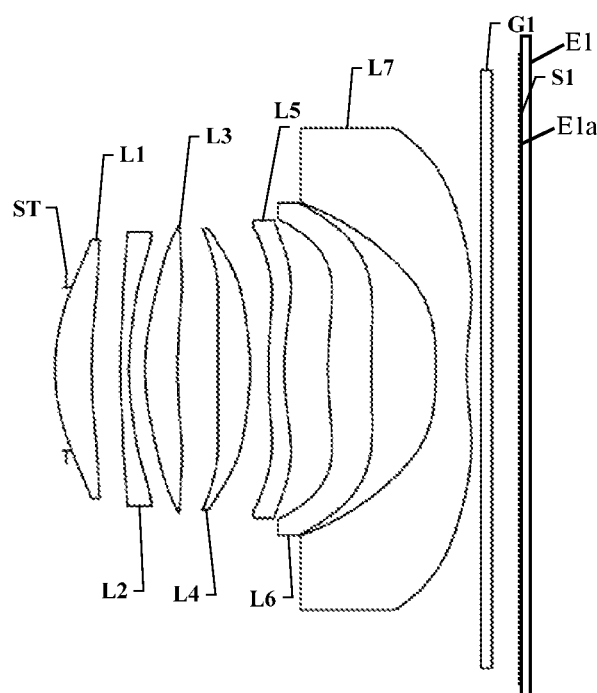
FIG. 35a is a schematic diagram of a structure of a ninth specific camera module in a first imaging mode.
Figure 35B:
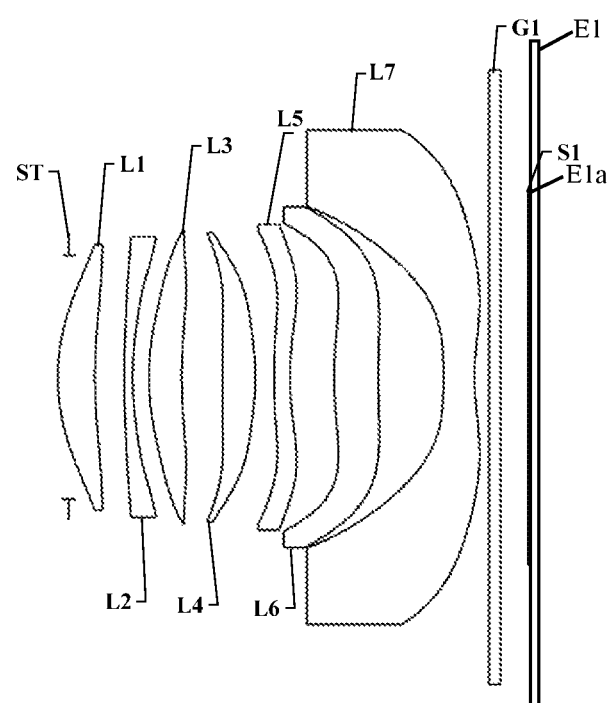
FIG. 35b is a schematic diagram of a structure of a ninth specific camera module in a second imaging mode.

FIG. 35a and FIG. 35b show a ninth specific camera module. FIG. 35a is a schematic diagram of a structure of the camera module in a first imaging mode. FIG. 35b is a schematic diagram of a structure of the camera module in a second imaging mode. A camera lens of the camera module includes seven lenses having focal power, and the seven lenses are sequentially a first lens L1, a second lens L2, a third lens L3, a fourth lens L4, a fifth lens L5, a sixth lens L6, and a seventh lens L7 from an object side. A variable aperture ST may be specifically located on an object side of the first lens L1, and an optical filter G1 may be located on an image side of the seventh lens L7.

In this embodiment of this disclosure, each lens of the camera lens may be an aspheric lens. In other words, the camera lens includes 14 aspheric surfaces in total. Referring to both Table 17a and Table 17b, Table 17a shows a curvature radius, a thickness, a refractive index, and an Abbe number of each lens of the camera lens, and Table 17b shows an aspheric coefficient of each lens.

TABLE 17a

|     | Description      | Curvature radius | Thickness |        | Refractive index |     | Abbe number |      |
| --- | ---------------- | ---------------- | --------- | ------ | ---------------- | --- | ----------- | ---- |
| ST  | Variable aperture | Infinite        | d0        | −0.200 | —                | —   | —           | –    |
| R1  | First lens       | 3.634            | d1        | 0.671  | n1               | 1.55 | v1          | 71.7 |
| R2  |                  | 9.478            | a1        | 0.525  |                  |     |             |      |
| R3  | Second           | 13.881           | d2        | 0.158  | n2               | 1.68 | v2          | 18.4 |
| R4  | lens             | 6.331            | a2        | 0.294  |                  |     |             |      |
| R5  | Third lens       | 4.653            | d3        | 0.596  | n3               | 1.54 | v3          | 56.0 |
| R6  |                  | 10.400           | a3        | 0.739  |                  |     |             |      |
| R7  | Fourth           | −48.384          | d4        | 0.589  | n4               | 1.54 | v4          | 56.0 |
| R8  | lens             | −4.170           | a4        | 0.343  |                  |     |             |      |
| R9  | Fifth lens       | 18.758           | d5        | 0.287  | n5               | 1.51 | v5          | 56.5 |
| R11 |                  | 5.615            | a5        | 0.798  |                  |     |             |      |
| R11 | Sixth lens       | 6.841            | d6        | 0.801  | n6               | 1.54 | v6          | 55.9 |
| R12 |                  | 18.362           | a6        | 1.177  |                  |     |             |      |
| R13 | Seventh          | −10.994          | d7        | 0.561  | n7               | 1.54 | v7          | 56.0 |
| R14 | lens             | 4.053            | a7        | 0.260  |                  |     |             |      |
| R15 | Optical          | Infinity         | d8        | 0.210  | n8               | 1.54 | v8          | 55.7 |
| R16 | filter           | Infinity         | a8        | 0.498  |                  |     |             |      |

TABLE 17b

|     | Type                      | K       | R     | A2       | A3        | A4       | A5        | A6       | A7        |
| --- | ------------------------- | ------- | ----- | -------- | --------- | -------- | --------- | -------- | --------- |
| R1  | Extended aspheric surface | −1.027  | 1.626 | 2.08E−02 | −6.00E−02 | 8.76E−02 | −1.09E−01 | 9.06E−02 | −5.04E−02 |
| R2  | Extended aspheric surface | −1.524  | 1.722 | 2.16E−02 | −2.11E−01 | 2.90E−01 | −2.40E−01 | 1.27E−01 | −4.15E−02 |
| R3  | Extended aspheric surface | −17.630 | 1.926 | 3.77E−01 | −2.79E+00 | 6.89E+00 | −8.84E+00 | 6.67E+00 | −3.08E+00 |
| R4  | Extended aspheric surface | 0.113   | 1.998 | 5.88E−01 | −4.30E+00 | 1.14E+01 | −1.57E+01 | 1.28E+01 | −6.43E+00 |
| R5  | Extended aspheric surface | 0.055   | 2.289 | 3.52E−01 | −2.89E+00 | 5.86E+00 | −5.50E+00 | 1.99E+00 | 5.71E−01  |
| R6  | Extended aspheric surface | −6.837  | 2.326 | 1.93E−01 | −1.09E+00 | −1.06E+00 | 7.90E+00 | −1.45E+01 | 1.48E+01 |
| R7  | Extended aspheric surface | 88.851  | 2.454 | 7.38E−01 | −1.89E+00 | 1.34E+00 | −3.52E+00 | 1.07E+01 | −1.60E+01 |
| R8  | Extended aspheric surface | −0.227  | 2.490 | 2.15E+00 | −7.35E+00 | 1.57E+01 | −3.23E+01 | 5.68E+01 | −7.14E+01 |
| R9  | Extended aspheric surface | −46.344 | 2.618 | 1.81E+00 | −1.01E+01 | 2.41E+01 | −5.52E+01 | 1.14E+02 | −1.64E+02 |
| R10 | Extended aspheric surface | −0.265  | 2.741 | −1.46E−01 | −3.56E+00 | 1.82E+00 | 8.39E+00 | −1.56E+01 | 1.26E+01 |
| R11 | Extended aspheric surface | −8.626  | 2.763 | −5.20E−01 | −1.68E+00 | 2.95E+00 | −6.56E+00 | 8.70E+00 | −6.39E+00 |

TABLE 17b-continued

| | | | | | | | | | |
|---|---|---|---|---|---|---|---|---|---|
| R12 | Extended aspheric surface | −109.953 | 3.050 | −5.91E−01 | −3.12E+00 | 5.59E+00 | −7.78E+00 | 8.47E+00 | −6.53E+00 |
| R13 | Extended aspheric surface | 8.800 | 3.060 | −5.72E+00 | 1.04E+01 | −1.90E+01 | 3.61E+01 | −4.96E+01 | 4.22E+01 |
| R14 | Extended aspheric surface | −18.479 | 4.425 | −1.16E+01 | 3.75E+01 | −7.12E+01 | 8.73E+01 | −7.69E+01 | 5.02E+01 |

| | Type | K | R | A8 | A9 | A10 | A11 | A12 | A13 |
|---|---|---|---|---|---|---|---|---|---|
| R1 | Extended aspheric surface | −1.027 | 1.626 | 1.82E−02 | −4.01E−03 | 4.81E−04 | −2.41E−05 | 0.00E+00 | 0.00E+00 |
| R2 | Extended aspheric surface | −1.524 | 1.722 | 7.99E−03 | −8.27E−04 | 3.53E−05 | 0.00E+00 | 0.00E+00 | 0.00E+00 |
| R3 | Extended aspheric surface | −17.630 | 1.926 | 8.60E−01 | −1.33E−01 | 8.76E−03 | 0.00E+00 | 0.00E+00 | 0.00E+00 |
| R4 | Extended aspheric surface | 0.113 | 1.998 | 1.98E+00 | −3.43E−01 | 2.56E−02 | 0.00E+00 | 0.00E+00 | 0.00E+00 |
| R5 | Extended aspheric surface | 0.055 | 2.289 | −7.47E−01 | 2.35E−01 | −2.54E−02 | 0.00E+00 | 0.00E+00 | 0.00E+00 |
| R6 | Extended aspheric surface | −6.837 | 2.326 | −8.85E+00 | 2.90E+00 | −3.95E−01 | 0.00E+00 | 0.00E+00 | 0.00E+00 |
| R7 | Extended aspheric surface | 88.851 | 2.454 | 1.47E+01 | −8.92E+00 | 3.23E+00 | −5.05E−01 | 0.00E+00 | 0.00E+00 |
| R8 | Extended aspheric surface | −0.227 | 2.490 | 6.09E+01 | −3.46E+01 | 1.25E+01 | −2.62E+00 | 2.39E−01 | 0.00E+00 |
| R9 | Extended aspheric surface | −46.344 | 2.618 | 1.49E+02 | −8.48E+01 | 2.94E+01 | −5.70E+00 | 4.72E−01 | 0.00E+00 |
| R11 | Extended aspheric surface | −0.265 | 2.741 | −5.75E+00 | 1.55E+00 | −2.37E−01 | 1.78E−02 | −4.09E−04 | 0.00E+00 |
| R11 | Extended aspheric surface | −8.626 | 2.763 | 2.76E+00 | −7.11E−01 | 1.05E−01 | −7.61E−03 | 1.74E−04 | 0.00E+00 |
| R12 | Extended aspheric surface | −109.953 | 3.050 | 3.42E+00 | −1.20E+00 | 2.77E−01 | −3.97E−02 | 3.20E−03 | −1.09E−04 |
| R13 | Extended aspheric surface | 8.800 | 3.060 | −2.25E+01 | 7.71E+00 | −1.70E+00 | 2.34E−01 | −1.82E−02 | 6.19E−04 |
| R14 | Extended aspheric surface | −18.479 | 4.425 | −2.39E+01 | 7.70E+00 | −1.46E+00 | 1.20E−01 | 0.00E+00 | 0.00E+00 |

In the 14 aspheric surfaces of the camera lens shown in Table 17b, surface types z of all the extended aspheric surfaces may be defined by using but not limited to the following aspheric surface formula:

$$z = \frac{cr^2}{1 + \sqrt{1 - Kc^2r^2}} + A_2r^4 + A_3r^6 + A_4r^8 + A_5r^{10} + A_6r^{12} + A_7r^{14} + A_8r^{16} + A_9r^{18} + A_{10}r^{20} + A_{11}r^{22} + A_{12}r^{24} + A_{13}r^{26}$$

Herein, z represents a rise of an aspheric surface, r represents a normalized radial coordinate of the aspheric surface, r is equal to a result obtained by dividing an actual radial coordinate of the aspheric surface by a normalized radius R, c represents spherical curvature of a vertex of the aspheric surface, K represents a quadric surface constant, and A2, A3, A4, A5, A6, A7, A8, A9, A10, A11, A12, and A13 represent aspheric coefficients.

In this embodiment of this disclosure, the second lens L2 has negative focal power, and a ratio of a focal length f2 of the second lens L2 to a focal length EFL of the camera lens is |f2/EFL|=2.51. The fifth lens L5 has negative focal power, and a ratio of a focal length f5 of the fifth lens to the focal length EFL of the camera lens is |f5/EFL|=1.81. The sixth lens L6 has negative focal power, and a ratio of a focal length f6 of the sixth lens to the focal length EFL of the camera lens is |f6/EFL|=2.31. A ratio of the focal length EFL of the camera lens to a total length (TTL) of the camera lens is |EFL/TTL|=0.814.

With continued reference to FIG. 35a, when the camera module is in the first imaging mode, the camera lens performs imaging in a full area of a photosensitive area, a half-image height Y1 of the camera lens is 5.8 mm, an entrance pupil diameter EPD1 is 3.0 mm, and a quantity F of apertures is 2.31. Referring to FIG. 35b, when the camera module is switched to the second imaging mode, the camera lens performs imaging in a partial area of a photosensitive area, a half-image height Y2 of the camera lens is 2.9 mm, an entrance pupil diameter EPD2 is 4.35 mm, and a quantity F of apertures is 1.59. A ratio of EPD1 to EPD2 is |EPD1/EPD2|=0.69, and a ratio of Y1 to Y2 is |Y1/Y2|=2.0. In addition, when a camera module is in the first imaging mode, a ratio of the half-image height Y1 of the camera lens to the total length (TTL) of the camera lens is |Y1/TTL|=0.682, and a ratio of the entrance pupil diameter EPD1 to the total length (TTL) of the camera lens is |EPD1/TTL|=0.353. For each basic parameter of the camera lens, refer to Table 18.

TABLE 18

| Object distance | | Infinite far |
|---|---|---|
| | Focal length EFL (mm) | 6.92 |
| First imaging mode | Value of F | 2.31 |
| | Half-image height Y1 (mm) | 5.80 |
| | Half FOV (°) | 39.848 |
| Second imaging mode | Value of F | 1.59 |
| | Half-image height Y2 (mm) | 2.90 |
| | Half FOV (°) | 22.348 |
| | BFL (mm) | 0.967 |
| | TTL (mm) | 8.50 |
| | Designed wavelength | 650 nm, 610 nm, 555 nm, 510 nm, 470 nm |

The camera module shown in FIG. 35a and FIG. 35b is simulated. A simulation result of the camera module is described in detail below with reference to accompanying drawings.

Figure 36A:
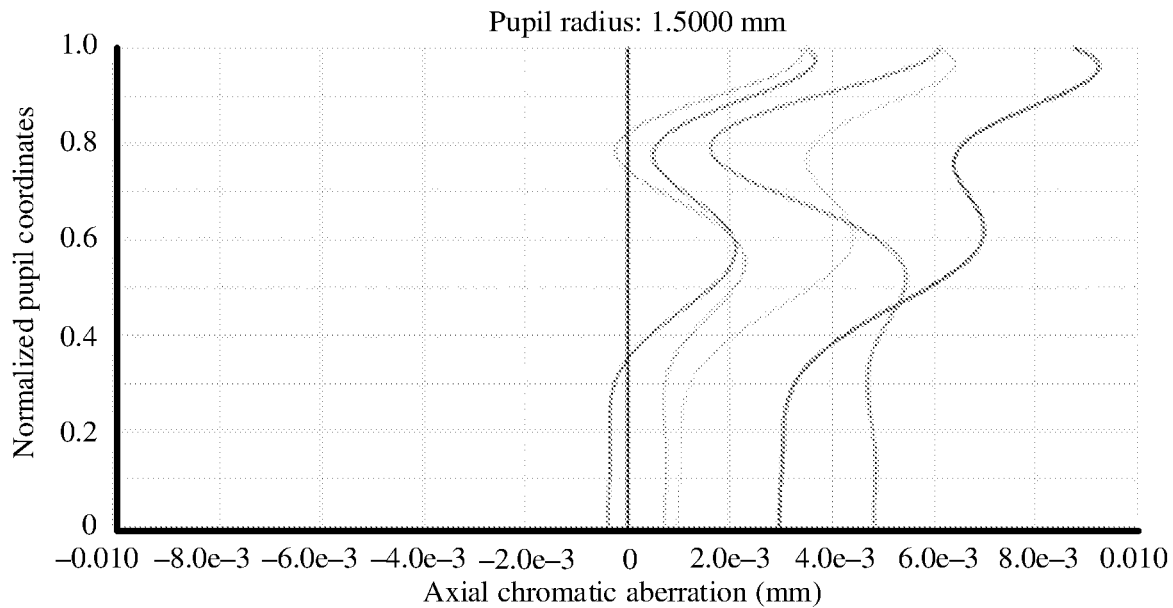

FIG. 36a is a curve diagram of an axial chromatic aberration of a camera module in a first imaging mode. Simulation results of a depth of focus location of colorful light rays on wavelengths of 650 nm, 610 nm, 555 nm, 510 nm, and 470 nm are separately shown in the figure. It can be learned that the axial chromatic aberration of a camera lens in the first imaging mode is controlled to fall within a very small range.

Figure 36B:
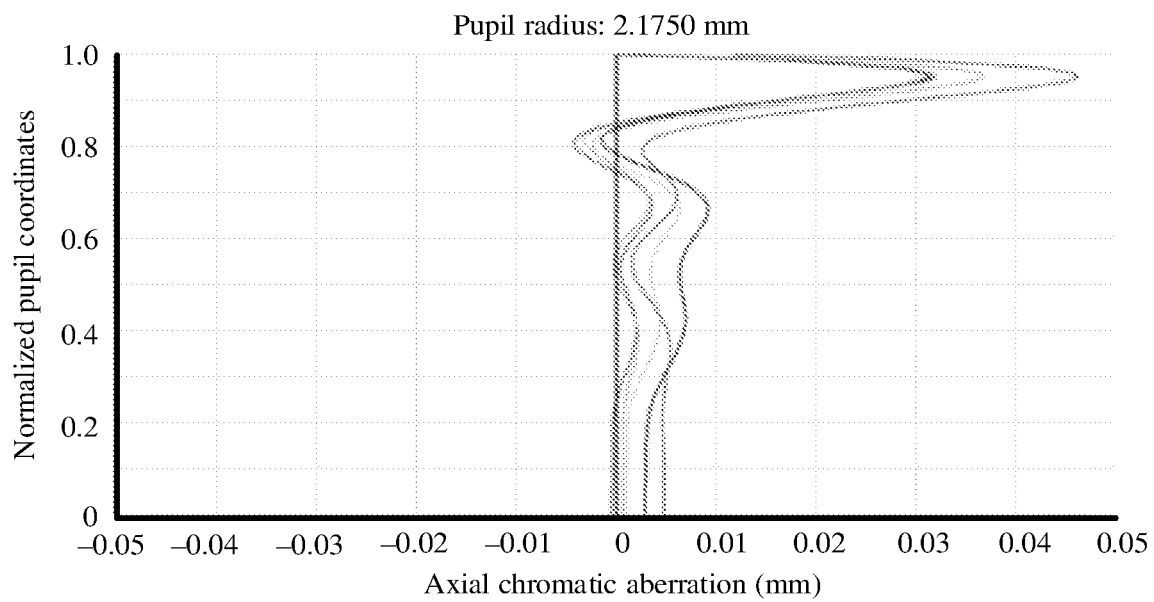
FIG. 36b is a curve diagram of an axial chromatic aberration of a camera module in FIG. 35b.

FIG. 36b is a curve diagram of an axial chromatic aberration of a camera module in a second imaging mode. Simulation results of a depth of focus location of colorful light rays on wavelengths of 650 nm, 610 nm, 555 nm, 510 nm, and 470 nm are separately shown in the figure. It can be learned that the axial chromatic aberration of a camera lens in the second imaging mode is controlled to fall within a very small range.

Figure 37A:
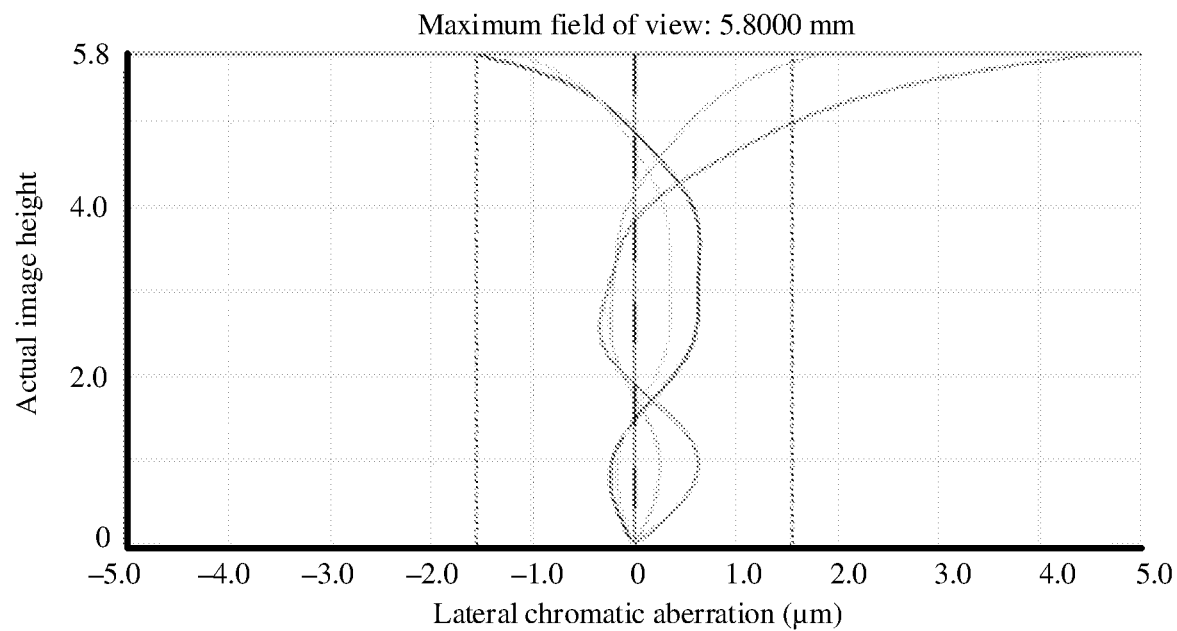

FIG. 37a is a curve diagram of a lateral chromatic aberration of a camera module in a first imaging mode. In the figure, five solid curves are respectively colorful light rays on wavelengths of 650 nm, 610 nm, 555 nm, 510 nm, and 470 nm, and dotted lines indicate that a diffraction limit range is from −1.55 μm to 1.55 μm, and it can be learned that lateral chromatic aberrations of the five light rays basically fall within the diffraction limit range.

Figure 37B:
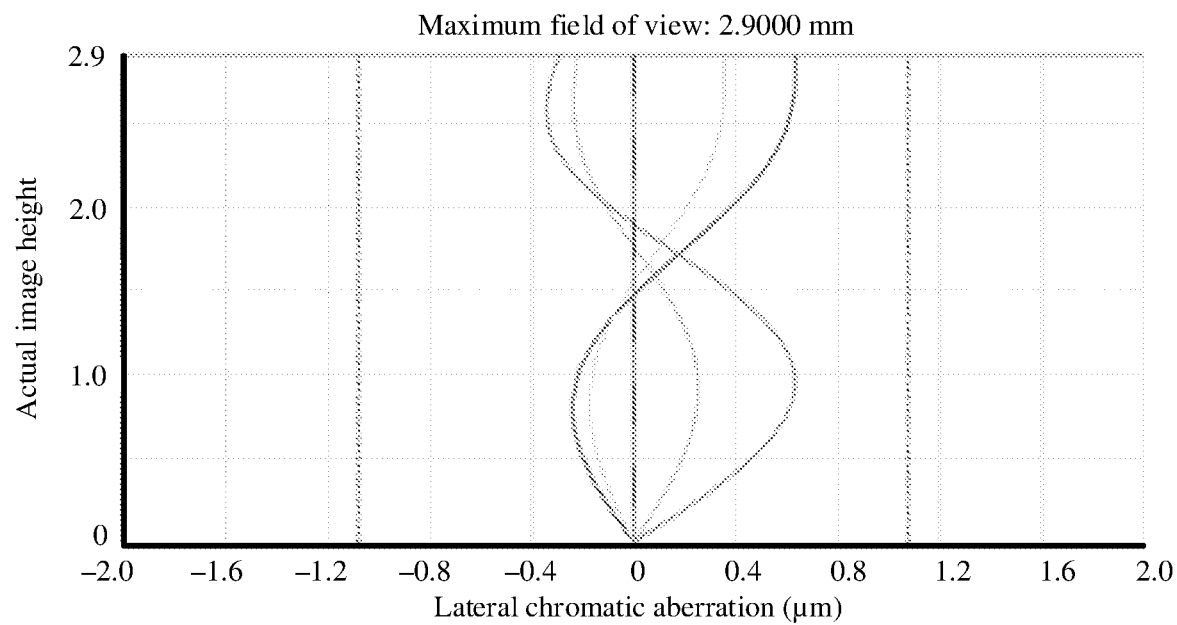
FIG. 37b is a curve diagram of a lateral chromatic aberration of a camera module in FIG. 35b.

FIG. 37b is a curve diagram of a lateral chromatic aberration of a camera module in a second imaging mode. In the figure, five solid curves are respectively colorful light rays on wavelengths of 650 nm, 610 nm, 555 nm, 510 nm, and 470 nm, and dotted lines indicate that a diffraction limit range is from −1.1 μm to 1.1 μm, and it can be learned that all lateral chromatic aberrations of the five light rays fall within the diffraction limit range.

Figure 38A:
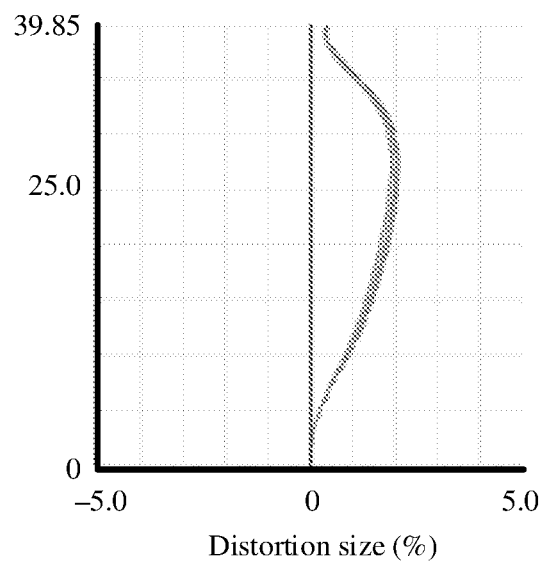

FIG. 38a is a curve diagram of optical distortion of a camera module in a first imaging mode, showing a difference between imaging deformation and an ideal shape. In the figure, five solid curves are respectively colorful light rays on wavelengths of 650 nm, 610 nm, 555 nm, 510 nm, and 470 nm. It can be learned that, in this mode, the optical distortion may be controlled to fall within a range less than 2%.

Figure 38B:
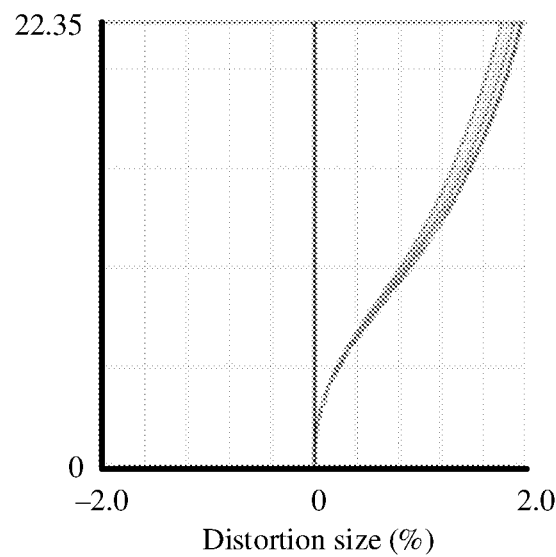
FIG. 38b is a curve diagram of optical distortion of a camera module in FIG. 35b.

FIG. 38b is a curve diagram of optical distortion of a camera module in a second imaging mode, showing a difference between imaging deformation and an ideal shape. In the figure, five solid curves are respectively colorful light rays on wavelengths of 650 nm, 610 nm, 555 nm, 510 nm, and 470 nm. It can be learned that, in this mode, the optical distortion may be controlled to fall within a range less than 2%.

It can be learned from structures and simulation effects of the first specific zoom lens, the second specific zoom lens, the third specific zoom lens, the fourth specific zoom lens, the fifth specific zoom lens, the sixth specific zoom lens, the seventh specific zoom lens, the eighth specific zoom lens, and the ninth specific zoom lens that the camera module provided in the embodiments of this disclosure can achieve good imaging effects in each of the two different imaging modes.

Figure 39:
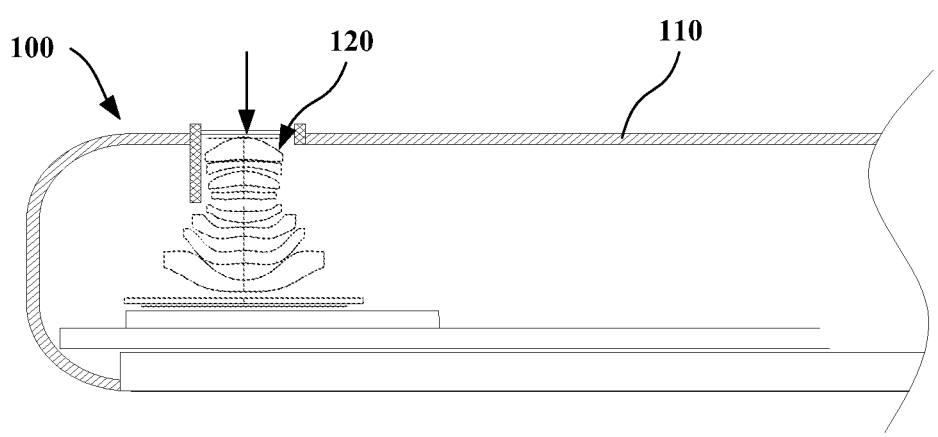
FIG. 39 is a schematic diagram of a structure of an electronic device according to an embodiment of this disclosure.

Referring to FIG. 39, an embodiment of this disclosure further provides an electronic device 100. The electronic device 100 may be a common terminal such as a mobile phone, a tablet computer, or a notebook computer in the conventional technology. The electronic device 100 includes a housing 110 and a camera module 120 in any one of the foregoing embodiments. The camera module 120 may be disposed inside the housing 110. The camera module 120 of the electronic device 100 may simultaneously implement full-pixel 1× imaging and central-pixel 2× or 3× imaging by using one camera lens, so that the camera module occupies less space in the electronic device 100 and appearance quality of the electronic device 100 is improved.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A camera module comprising a camera lens, a variable aperture, and a photosensitive element, wherein
the camera lens comprises a plurality of lenses arranged along a direction from an object side to an image side;
the variable aperture is located on an object side of at least one of the lenses, and a clear aperture of the variable aperture is adjustable;
a f-number of the camera lens is F1 when the clear aperture of the variable aperture is adjusted to a first clear aperture, or a f-number of the camera lens is F2 when the clear aperture of the variable aperture is adjusted to a second clear aperture, wherein F1 and F2 meet a condition F1>F2;
the photosensitive element is disposed on an imaging surface of the camera lens, and a surface that is of the photosensitive element and that faces the camera lens comprises a photosensitive area;
the camera module is configurable to a first imaging mode and a second imaging mode;
in the first imaging mode, the f-number of the camera lens is F1, and the photosensitive element is configured to: enable the camera lens to perform imaging in a full area of the photosensitive area, and adjust angular resolution of the full area of the photosensitive area to δ; and
in the second imaging mode, the f-number of the camera lens is F2, and the photosensitive element is configured to: enable the camera lens to perform imaging in a partial area of the photosensitive area, and adjust the angular resolution of the partial area of the photosensitive area to nδ, wherein n is a natural number greater than 1 and less than or equal to 3.

2. The camera module according to claim 1, wherein:
a first diffraction limit of performing imaging by the camera lens in the full area of the photosensitive area is MTF1L at 100 lp/mm,
a second diffraction limit of performing imaging by the camera lens in the partial area of the photosensitive area is MTF2L at 100 lp/mm, and
MTF1L and MTF2L meet a condition 1≤|MTF2L/MTF1L|≤3.

3. The camera module according to claim 1, wherein a quantity N of the plurality of lenses meets a condition 5≤N≤9.

4. The camera module according to claim 1 wherein when the clear aperture of the variable aperture is the first clear aperture, F1 meets a condition 1.2≤F1≤8.

5. The camera module according to claim 1, wherein when the clear aperture of the variable aperture is the second clear aperture, F2 meets a condition 1.1≤F2≤4.

6. The camera module according to claim 1, wherein:
a first half-image height of the camera lens is Y1 when the camera lens performs imaging in the full area of the photosensitive area,
a second half-image height of the camera lens is Y2 when the camera lens performs imaging in the partial area of the photosensitive area, and
Y1 and Y2 meet a condition $1 \leq |Y1/Y2| \leq 3$.

7. The camera module according to claim 1, wherein:
a first size of a cell output by the photosensitive element is P1 when the camera lens performs imaging in the full area of the photosensitive area,
a second size of a cell output by the photosensitive element is P2 when the camera lens performs imaging in the partial area of the photosensitive area; and
when n=1, P1 and P2 meet a condition P1/P2=1;
when n=2, P1 and P2 meet a condition P1/P2=4; or
when n=3, P1 and P2 meet a condition P1/P2=9.

8. The camera module according to claim 1, wherein when the camera lens performs imaging in the full area of the photosensitive area, a half-image height Y1 of the camera lens and a total length (TTL) of the camera lens meet a condition $0.5 \leq |Y1/TTL| \leq 1.5$.

9. The camera module according to claim 1, wherein a distance 1 between the variable aperture and the imaging surface of the camera lens and a total length (TTL) of the camera lens meet a condition $0.5 \leq |l/TTL| \leq 1.2$.

10. The camera module according to claim 1, wherein a number of pixels of an image output when the camera lens performs imaging with the angular resolution of nδ in the partial area of the photosensitive area is 8M to 32M pixels.

11. The camera module according to claim 1, wherein:
a first entrance pupil diameter is EPD1 when the camera lens performs imaging in the full area of the photosensitive area,
a second entrance pupil diameter is EPD2 when the camera lens performs imaging in the partial area of the photosensitive area, and
EPD1 and EPD2 meet a condition $0.25 \leq |EPD1/EPD2| \leq 1$.

12. The camera module according to claim 1, wherein a focal length EFL of the camera lens and a total length (TTL) of the camera lens meet a condition $0.5 \leq |EFL/TTL| \leq 1.2$.

13. The camera module according to claim 1, wherein the plurality of lenses of the camera lens comprises eight lenses arranged along a direction from the object side to the image side, and the eight lenses are respectively a first lens, a second lens, a third lens, a fourth lens, a fifth lens, a sixth lens, a seventh lens, and an eighth lens.

14. The camera module according to claim 13, wherein the second lens has negative focal power.

15. The camera module according to claim 13, wherein an area that is on an object-side surface of the eighth lens and that is close to an optical axis is a concave surface, and an area that is on an image-side surface of the eighth lens and that is close to the optical axis is a concave surface.

16. The camera module according to claim 13, wherein the fifth lens has positive focal power, and a focal length f5 of the fifth lens and the focal length EFL of the camera lens meet a condition $0.5 \leq |f5/EFL| \leq 1.2$.

17. The camera module according to claim 13, wherein the sixth lens has negative focal power, and a focal length f6 of the sixth lens and the focal length EFL of the camera lens meet a condition $1 \leq |f6/EFL| \leq 100$.

18. An electronic device comprising a housing and a camera module, wherein the camera module is disposed inside the housing and comprises a camera lens, a variable aperture, and a photosensitive element, wherein the camera lens comprises a plurality of lenses arranged along a direction from an object side to an image side;
the variable aperture is located on an object side of at least one of the lenses, and a clear aperture of the variable aperture is adjustable;
a f-number of the camera lens is F1 when the clear aperture of the variable aperture is adjusted to a first clear aperture, or a f-number of the camera lens is F2 when the clear aperture of the variable aperture is adjusted to a second clear aperture, wherein F1 and F2 meet a condition F1<F2;
the photosensitive element is disposed on an imaging surface of the camera lens, and a surface that is of the photosensitive element and that faces the camera lens comprises a photosensitive area;
the camera module is configurable to a first imaging mode and a second imaging mode;
in the first imaging mode, the f-number of the camera lens is F1, and the photosensitive element is configured to: enable the camera lens to perform imaging in a full area of the photosensitive area, and adjust angular resolution of the full area of the photosensitive area to δ; and
in the second imaging mode, the f-number of the camera lens is F2, and the photosensitive element is configured to: enable the camera lens to perform imaging in a partial area of the photosensitive area, and adjust the angular resolution of the partial area of the photosensitive area to nδ, wherein n is a natural number greater than 1 and less than or equal to 3.

19. The electronic device according to claim 18, wherein:
a first diffraction limit of performing imaging by the camera lens in the full area of the photosensitive area is MTF1L at 100 lp/mm,
a second diffraction limit of performing imaging by the camera lens in the partial area of the photosensitive area is MTF2L at 100 lp/mm, and
MTF1L and MTF2L meet a condition $1 \leq |MTF2L/MTF1L| \leq 3$.

20. The electronic device according to claim 18, wherein a quantity N of the plurality of lenses meets a condition $5 \leq N \leq 9$.

21. The electronic device according to claim 18, wherein when the clear aperture of the variable aperture is the first clear aperture, the quantity F1 of apertures of the camera lens meets a condition $1.2 \leq F1 \leq 8$.

22. The electronic device according to claim 18, wherein when the clear aperture of the variable aperture is the second clear aperture, the quantity F2 of apertures of the camera lens meets a condition $1.1 \leq F2 \leq 4$.

23. The electronic device according to claim 18, wherein:
a first half-image height of the camera lens is Y1 when the camera lens performs imaging in the full area of the photosensitive area,
a second half-image height of the camera lens is Y2 when the camera lens performs imaging in the partial area of the photosensitive area, and
Y1 and Y2 meet a condition $1 \leq |Y1/Y2| \leq 3$.

24. The electronic device according to claim 18, wherein:
a first size of a cell output by the photosensitive element is P1 when the camera lens performs imaging in the full area of the photosensitive area,
a second size of a cell output by the photosensitive element is P2 when the camera lens performs imaging in the partial area of the photosensitive area; and
when n=1, P1 and P2 meet a condition P1/P2=1;
when n=2, P1 and P2 meet a condition P1/P2=4; or
when n=3, P1 and P2 meet a condition P1/P2=9.

25. The electronic device according to claim 18, wherein when the camera lens performs imaging in the full area of the photosensitive area, a half-image height Y1 of the camera lens and a total length (TTL) of the camera lens meet a condition 0.5≤|Y1/TTL|≤1.5.

* * * * *